(12) United States Patent
Gu

(10) Patent No.: US 9,841,874 B2
(45) Date of Patent: Dec. 12, 2017

(54) EXPANDABLE APPLICATION REPRESENTATION

(71) Applicant: Microsoft Corporation, Redmond, WA (US)

(72) Inventor: Jiawei Gu, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 326 days.

(21) Appl. No.: 14/522,857

(22) Filed: Oct. 24, 2014

(65) Prior Publication Data

US 2015/0286352 A1    Oct. 8, 2015

(30) Foreign Application Priority Data

Apr. 4, 2014    (WO) ................ PCT/CN2014/074793

(51) Int. Cl.
*G06F 15/177*    (2006.01)
*G06F 3/0482*    (2013.01)
(Continued)

(52) U.S. Cl.
CPC ........ *G06F 3/0482* (2013.01); *G06F 3/04842* (2013.01); *G06F 3/04883* (2013.01); *G06F 9/4443* (2013.01); *G06F 2203/04803* (2013.01)

(58) Field of Classification Search
CPC .................................................. G06F 3/0482
(Continued)

(56) References Cited

U.S. PATENT DOCUMENTS

| | | |
|---|---|---|
| 4,823,283 A | 4/1989 | Diehm et al. |
| 5,045,997 A | 9/1991 | Watanabe |

(Continued)

FOREIGN PATENT DOCUMENTS

| | | |
|---|---|---|
| CN | 1512301 | 7/2004 |
| CN | 1735856 | 2/2006 |

(Continued)

OTHER PUBLICATIONS

"Notice of Allowance", U.S. Appl. No. 14/659,442, Aug. 19, 2015, 4 pages.

(Continued)

*Primary Examiner* — William Titcomb
(74) *Attorney, Agent, or Firm* — Ogilvie Law Firm

(57) ABSTRACT

Expandable application representation techniques are described. The techniques may include support of an expandable tile that may function as an intermediary within a root level (e.g., start menu or screen) of a file system. The expandable tile, for instance, may be output via a gesture to gain additional information that was not included in an unexpanded version of the tile, may be utilized to provide inputs to an application such that a user, and so on. Thus, this may support non-modal interaction by a user. Techniques are also described in which the expanded representation is included in a taskbar, which may also be used for non-modal interaction, sending of content represented in the representation to a device or application, continuation of interaction initiated with the representation by a mobile computing device, and so on. Expandable tile techniques may also be utilized to support interaction between shells of an operating system, such as a desktop and immersive shell. Further description of these and other examples involving and not involving an expandable tile are also contemplated.

20 Claims, 27 Drawing Sheets

(51) Int. Cl.
*G06F 3/0484* (2013.01)
*G06F 9/44* (2006.01)
*G06F 3/0488* (2013.01)

(58) Field of Classification Search
USPC .......................................................... 715/736
See application file for complete search history.

(56) References Cited

U.S. PATENT DOCUMENTS

| | | | |
|---|---|---|---|
| 5,046,001 A | 9/1991 | Barker et al. | |
| 5,189,732 A | 2/1993 | Kondo | |
| 5,258,748 A | 11/1993 | Jones | |
| 5,297,032 A | 3/1994 | Trojan et al. | |
| 5,321,750 A | 6/1994 | Nadan | |
| 5,339,392 A | 8/1994 | Risberg et al. | |
| 5,406,307 A | 4/1995 | Hirayama et al. | |
| 5,432,932 A | 7/1995 | Chen et al. | |
| 5,463,725 A | 10/1995 | Henckel et al. | |
| 5,485,197 A | 1/1996 | Hoarty | |
| 5,487,143 A | 1/1996 | Southgate | |
| 5,495,566 A | 2/1996 | Kwatinetz | |
| 5,515,495 A | 5/1996 | Ikemoto | |
| 5,574,836 A | 11/1996 | Broemmelsiek | |
| 5,598,523 A | 1/1997 | Fujita | |
| 5,603,053 A | 2/1997 | Gough et al. | |
| 5,611,060 A | 3/1997 | Belfiore et al. | |
| 5,623,613 A | 4/1997 | Rowe et al. | |
| 5,640,176 A | 6/1997 | Mundt et al. | |
| 5,650,827 A | 7/1997 | Tsumori et al. | |
| 5,657,049 A | 8/1997 | Ludolph et al. | |
| 5,659,693 A | 8/1997 | Hansen | |
| 5,675,329 A | 10/1997 | Barker | |
| 5,687,331 A | 11/1997 | Volk et al. | |
| 5,712,995 A | 1/1998 | Cohn | |
| 5,771,042 A | 6/1998 | Santos-Gomez | |
| 5,793,415 A | 8/1998 | Gregory et al. | |
| 5,819,284 A | 10/1998 | Farber et al. | |
| 5,844,547 A | 12/1998 | Minakuchi et al. | |
| 5,859,636 A | 1/1999 | Pandit | |
| 5,860,073 A | 1/1999 | Ferrel et al. | |
| 5,889,517 A | 3/1999 | Ueda et al. | |
| 5,905,492 A | 5/1999 | Straub et al. | |
| 5,914,720 A | 6/1999 | Maples et al. | |
| 5,940,076 A | 8/1999 | Sommers et al. | |
| 5,959,621 A | 9/1999 | Nawaz et al. | |
| 5,963,204 A | 10/1999 | Ikeda et al. | |
| 6,006,231 A * | 12/1999 | Popa ................ | G06F 17/30905 |
| 6,008,809 A | 12/1999 | Brooks | |
| 6,008,816 A | 12/1999 | Eisler et al. | |
| 6,009,519 A | 12/1999 | Jones et al. | |
| 6,011,542 A | 1/2000 | Durrani et al. | |
| 6,028,600 A | 2/2000 | Rosin et al. | |
| 6,057,839 A | 5/2000 | Advani et al. | |
| 6,064,383 A | 5/2000 | Skelly | |
| 6,104,418 A | 8/2000 | Tanaka et al. | |
| 6,108,003 A | 8/2000 | Hall, Jr. et al. | |
| 6,111,585 A | 8/2000 | Choi | |
| 6,115,040 A | 9/2000 | Bladow et al. | |
| 6,166,736 A | 12/2000 | Hugh | |
| 6,188,405 B1 | 2/2001 | Czerwinski et al. | |
| 6,211,921 B1 | 4/2001 | Cherian et al. | |
| 6,212,564 B1 | 4/2001 | Harter et al. | |
| 6,216,141 B1 | 4/2001 | Straub et al. | |
| 6,266,098 B1 | 7/2001 | Cove et al. | |
| 6,278,448 B1 | 8/2001 | Brown et al. | |
| 6,279,015 B1 * | 8/2001 | Fong ................. | G06F 17/30607 715/239 |
| 6,281,940 B1 | 8/2001 | Sciammarella | |
| 6,311,058 B1 | 10/2001 | Wecker et al. | |
| 6,346,935 B1 | 2/2002 | Nakajima et al. | |
| 6,369,837 B1 | 4/2002 | Schirmer | |
| 6,385,630 B1 | 5/2002 | Ejerhed | |
| 6,396,963 B2 | 5/2002 | Shaffer et al. | |
| 6,411,307 B1 | 6/2002 | Rosin et al. | |
| 6,424,338 B1 | 7/2002 | Anderson | |
| 6,426,753 B1 | 7/2002 | Migdal | |
| 6,433,789 B1 | 8/2002 | Rosman | |
| 6,448,987 B1 | 9/2002 | Easty et al. | |
| 6,449,638 B1 | 9/2002 | Wecker et al. | |
| 6,456,334 B1 | 9/2002 | Duhault | |
| 6,489,977 B2 | 12/2002 | Sone | |
| 6,505,243 B1 | 1/2003 | Lortz | |
| 6,507,643 B1 | 1/2003 | Groner | |
| 6,510,144 B1 | 1/2003 | Dommety et al. | |
| 6,510,466 B1 | 1/2003 | Cox et al. | |
| 6,510,553 B1 | 1/2003 | Hazra | |
| 6,538,635 B1 | 3/2003 | Ringot | |
| 6,570,582 B1 | 5/2003 | Sciammarella et al. | |
| 6,570,597 B1 | 5/2003 | Seki et al. | |
| 6,577,323 B1 | 6/2003 | Jamieson et al. | |
| 6,577,350 B1 | 6/2003 | Proehl et al. | |
| 6,591,244 B2 | 7/2003 | Jim et al. | |
| 6,597,374 B1 | 7/2003 | Baker et al. | |
| 6,628,309 B1 | 9/2003 | Dodson et al. | |
| 6,636,246 B1 | 10/2003 | Gallo et al. | |
| 6,662,023 B1 | 12/2003 | Helle | |
| 6,675,387 B1 | 1/2004 | Boucher et al. | |
| 6,690,387 B2 | 2/2004 | Zimmerman et al. | |
| 6,697,825 B1 | 2/2004 | Underwood et al. | |
| 6,707,449 B2 | 3/2004 | Hinckley et al. | |
| 6,710,771 B1 | 3/2004 | Yamaguchi et al. | |
| 6,721,958 B1 | 4/2004 | Dureau | |
| 6,724,403 B1 | 4/2004 | Santoro et al. | |
| 6,784,925 B1 | 8/2004 | Tomat et al. | |
| 6,798,421 B2 | 9/2004 | Baldwin | |
| 6,798,649 B1 | 9/2004 | Olodort | |
| 6,801,203 B1 | 10/2004 | Hussain | |
| 6,807,558 B1 | 10/2004 | Hassett et al. | |
| 6,832,355 B1 | 12/2004 | Duperrouzel et al. | |
| 6,857,104 B1 | 2/2005 | Cahn | |
| 6,865,297 B2 | 3/2005 | Loui et al. | |
| 6,873,329 B2 | 3/2005 | Cohen et al. | |
| 6,876,312 B2 | 4/2005 | Yu | |
| 6,885,974 B2 | 4/2005 | Holle | |
| 6,904,597 B2 | 6/2005 | Jin | |
| 6,920,445 B2 | 7/2005 | Bae | |
| 6,938,101 B2 | 8/2005 | Hayes et al. | |
| 6,961,731 B2 | 11/2005 | Holbrook | |
| 6,971,067 B1 | 11/2005 | Karson et al. | |
| 6,972,776 B2 | 12/2005 | Davis et al. | |
| 6,975,306 B2 | 12/2005 | Hinckley | |
| 6,976,210 B1 | 12/2005 | Silva et al. | |
| 6,978,303 B1 | 12/2005 | McCreesh et al. | |
| 6,983,310 B2 | 1/2006 | Rouse | |
| 6,987,991 B2 | 1/2006 | Nelson | |
| 7,013,041 B2 | 3/2006 | Miyamoto | |
| 7,017,119 B1 | 3/2006 | Johnston et al. | |
| 7,019,757 B2 | 3/2006 | Brown et al. | |
| 7,028,264 B2 | 4/2006 | Santoro et al. | |
| 7,032,187 B2 | 4/2006 | Keely, Jr. et al. | |
| 7,036,090 B1 | 4/2006 | Nguyen | |
| 7,036,091 B1 | 4/2006 | Nguyen | |
| 7,042,460 B2 | 5/2006 | Hussain et al. | |
| 7,051,291 B2 | 5/2006 | Sciammarella et al. | |
| 7,058,955 B2 | 6/2006 | Porkka | |
| 7,065,385 B2 | 6/2006 | Jarrad et al. | |
| 7,065,386 B1 | 6/2006 | Smethers | |
| 7,075,535 B2 | 7/2006 | Aguera y Arcas | |
| 7,089,507 B2 | 8/2006 | Lection et al. | |
| 7,091,998 B2 | 8/2006 | Miller-Smith | |
| 7,093,201 B2 | 8/2006 | Duarte | |
| 7,106,349 B2 | 9/2006 | Baar et al. | |
| 7,111,044 B2 | 9/2006 | Lee | |
| 7,133,707 B1 | 11/2006 | Rak | |
| 7,133,859 B1 | 11/2006 | Wong | |
| 7,139,800 B2 | 11/2006 | Bellotti et al. | |
| 7,146,573 B2 | 12/2006 | Brown et al. | |
| 7,155,729 B1 | 12/2006 | Andrew et al. | |
| 7,158,123 B2 | 1/2007 | Myers et al. | |
| 7,158,135 B2 | 1/2007 | Santodomingo et al. | |
| 7,178,111 B2 | 2/2007 | Glein et al. | |
| 7,194,506 B1 | 3/2007 | White et al. | |
| 7,197,702 B2 | 3/2007 | Niyogi et al. | |
| 7,210,099 B2 | 4/2007 | Rohrabaugh et al. | |

(56) References Cited

U.S. PATENT DOCUMENTS

| | | |
|---|---|---|
| 7,216,588 B2 | 5/2007 | Suess |
| 7,249,326 B2 | 7/2007 | Stoakley et al. |
| 7,251,782 B1 | 7/2007 | Albers |
| 7,262,775 B2 | 8/2007 | Calkins et al. |
| 7,263,668 B1 | 8/2007 | Lentz |
| 7,277,924 B1 | 10/2007 | Wichmann et al. |
| 7,280,097 B2 | 10/2007 | Chen |
| 7,283,620 B2 | 10/2007 | Adamczyk |
| 7,289,806 B2 | 10/2007 | Morris et al. |
| 7,296,184 B2 | 11/2007 | Derks et al. |
| 7,296,242 B2 | 11/2007 | Agata et al. |
| 7,304,638 B2 | 12/2007 | Murphy |
| 7,310,100 B2 | 12/2007 | Hussain |
| 7,333,092 B2 | 2/2008 | Zadesky et al. |
| 7,333,120 B2 | 2/2008 | Venolia |
| 7,336,263 B2 | 2/2008 | Valikangas |
| 7,343,567 B2 | 3/2008 | Mann et al. |
| 7,369,647 B2 | 5/2008 | Gao et al. |
| 7,376,907 B2 | 5/2008 | Santoro et al. |
| 7,386,807 B2 | 6/2008 | Cummins et al. |
| 7,388,578 B2 | 6/2008 | Tao |
| 7,403,191 B2 | 7/2008 | Sinclair |
| 7,408,538 B2 | 8/2008 | Hinckley et al. |
| 7,412,663 B2 | 8/2008 | Lindsay et al. |
| 7,433,920 B2 | 10/2008 | Blagsvedt et al. |
| 7,447,520 B2 | 11/2008 | Scott |
| 7,461,151 B2 | 12/2008 | Colson et al. |
| 7,469,380 B2 | 12/2008 | Wessling et al. |
| 7,469,381 B2 | 12/2008 | Ording |
| 7,478,326 B2 | 1/2009 | Holecek et al. |
| 7,479,949 B2 | 1/2009 | Jobs |
| 7,480,870 B2 | 1/2009 | Anzures |
| 7,483,418 B2 | 1/2009 | Maurer |
| 7,484,182 B1 | 1/2009 | Smith |
| 7,487,467 B1 | 2/2009 | Kawahara et al. |
| 7,496,830 B2 | 2/2009 | Rubin |
| 7,500,175 B2 | 3/2009 | Colle et al. |
| 7,512,966 B2 | 3/2009 | Lyons, Jr. et al. |
| 7,577,918 B2 | 8/2009 | Lindsay |
| 7,581,034 B2 | 8/2009 | Polivy et al. |
| 7,593,995 B1 | 9/2009 | He et al. |
| 7,595,810 B2 | 9/2009 | Louch |
| 7,599,790 B2 | 10/2009 | Rasmussen et al. |
| 7,600,189 B2 | 10/2009 | Fujisawa |
| 7,600,234 B2 | 10/2009 | Dobrowski et al. |
| 7,606,714 B2 | 10/2009 | Williams et al. |
| 7,607,096 B2 | 10/2009 | Oreizy et al. |
| 7,607,106 B2 | 10/2009 | Ernst et al. |
| 7,610,563 B2 | 10/2009 | Nelson et al. |
| 7,614,018 B1 | 11/2009 | Ohazama et al. |
| 7,619,615 B1 | 11/2009 | Donoghue |
| 7,640,518 B2 | 12/2009 | Forlines et al. |
| 7,644,361 B2 | 1/2010 | Wu et al. |
| 7,653,883 B2 | 1/2010 | Hotelling et al. |
| 7,657,849 B2 | 2/2010 | Chaudhri et al. |
| 7,663,607 B2 | 2/2010 | Hotelling et al. |
| 7,664,067 B2 | 2/2010 | Pointer |
| 7,669,140 B2 | 2/2010 | Matthews et al. |
| 7,671,756 B2 | 3/2010 | Herz et al. |
| 7,676,907 B2 | 3/2010 | Santoro et al. |
| 7,681,138 B2 | 3/2010 | Grasser et al. |
| 7,702,683 B1 | 4/2010 | Kirshenbaum |
| 7,730,425 B2 | 6/2010 | de los Reyes et al. |
| 7,746,388 B2 | 6/2010 | Jeon |
| 7,755,674 B2 | 7/2010 | Kaminaga |
| 7,765,490 B2 | 7/2010 | Lai et al. |
| 7,834,861 B2 | 11/2010 | Lee |
| 7,840,979 B2 | 11/2010 | Poling et al. |
| 7,877,707 B2 | 1/2011 | Westerman et al. |
| 7,880,728 B2 | 2/2011 | De Los Reyes et al. |
| 7,889,180 B2 | 2/2011 | Byun et al. |
| 7,895,309 B2 | 2/2011 | Belali et al. |
| 7,898,529 B2 | 3/2011 | Fitzmaurice et al. |
| 7,924,271 B2 | 4/2011 | Christie et al. |
| 7,933,632 B2 | 4/2011 | Flynt et al. |
| 7,962,281 B2 | 6/2011 | Rasmussen et al. |
| 7,983,718 B1 | 7/2011 | Roka |
| 7,987,431 B2 | 7/2011 | Santoro et al. |
| 8,006,276 B2 | 8/2011 | Nakagawa et al. |
| 8,050,030 B2 | 11/2011 | Wu et al. |
| 8,065,628 B2 | 11/2011 | Oshiro et al. |
| 8,086,275 B2 | 12/2011 | Wykes |
| 8,108,781 B2 | 1/2012 | Laansoo et al. |
| 8,131,808 B2 | 3/2012 | Aoki et al. |
| 8,134,727 B1 | 3/2012 | Shmunis et al. |
| 8,150,924 B2 | 4/2012 | Buchheit et al. |
| 8,175,653 B2 | 5/2012 | Smuga et al. |
| 8,176,438 B2 | 5/2012 | Zaman et al. |
| 8,190,707 B2 | 5/2012 | Trivedi et al. |
| 8,209,623 B2 | 6/2012 | Barletta et al. |
| 8,225,193 B1 | 7/2012 | Kleinschnitz et al. |
| 8,238,876 B2 | 8/2012 | Teng |
| 8,245,152 B2 | 8/2012 | Brunner et al. |
| 8,245,156 B2 | 8/2012 | Mouilleseaux et al. |
| 8,250,494 B2 | 8/2012 | Butcher et al. |
| 8,255,473 B2 | 8/2012 | Eren et al. |
| 8,255,812 B1 | 8/2012 | Parparita et al. |
| 8,255,818 B2 | 8/2012 | Bales et al. |
| 8,259,437 B2 | 9/2012 | Vesely |
| 8,269,736 B2 | 9/2012 | Wilairat |
| 8,272,104 B2 | 9/2012 | Chen et al. |
| 8,280,901 B2 | 10/2012 | McDonald |
| 8,289,688 B2 | 10/2012 | Behar et al. |
| 8,300,392 B2 | 10/2012 | Weng |
| 8,312,383 B2 | 11/2012 | Gilfix |
| 8,334,871 B2 | 12/2012 | Hamilton et al. |
| 8,355,698 B2 | 1/2013 | Teng et al. |
| 8,384,726 B1 | 2/2013 | Grabowski et al. |
| 8,385,952 B2 | 2/2013 | Friedman et al. |
| 8,387,115 B2 | 2/2013 | Park |
| 8,411,046 B2 | 4/2013 | Kruzeniski et al. |
| 8,429,565 B2 | 4/2013 | Agarawala et al. |
| 8,443,189 B2 | 5/2013 | Li et al. |
| 8,448,083 B1 | 5/2013 | Migos et al. |
| 8,473,870 B2 | 6/2013 | Hinckley et al. |
| 8,525,808 B1 | 9/2013 | Buening |
| 8,527,892 B2 | 9/2013 | Sirpal et al. |
| 8,539,384 B2 | 9/2013 | Hinckley et al. |
| 8,548,431 B2 | 10/2013 | Teng et al. |
| 8,549,430 B2 | 10/2013 | Russell et al. |
| 8,560,959 B2 | 10/2013 | Zaman et al. |
| 8,584,150 B2 | 11/2013 | Wallace |
| 8,589,815 B2 | 11/2013 | Fong et al. |
| 8,612,874 B2 | 12/2013 | Zaman et al. |
| 8,615,707 B2 | 12/2013 | Fortuna et al. |
| 8,615,713 B2 | 12/2013 | Sun et al. |
| 8,627,227 B2 | 1/2014 | Matthews et al. |
| 8,639,819 B2 | 1/2014 | Pohja et al. |
| 8,640,165 B2 | 1/2014 | Ellis et al. |
| 8,687,023 B2 | 4/2014 | Markiewicz et al. |
| 8,689,123 B2 | 4/2014 | Zaman |
| 9,015,606 B2 | 4/2015 | Zaman et al. |
| 9,052,820 B2 | 6/2015 | Jarrett et al. |
| 9,405,845 B2 * | 8/2016 | Obasanjo ............ G06F 17/3089 |
| 9,430,130 B2 * | 8/2016 | Matthews ......... G06F 17/30899 |
| 9,489,119 B1 * | 11/2016 | Smith, Jr. ............. G06F 3/0486 |
| 9,665,384 B2 * | 5/2017 | Zielinski ............... G06F 9/4451 |
| 2001/0022621 A1 | 9/2001 | Squibbs |
| 2002/0000963 A1 | 1/2002 | Yoshida et al. |
| 2002/0018051 A1 | 2/2002 | Singh |
| 2002/0035607 A1 | 3/2002 | Checkoway et al. |
| 2002/0054117 A1 | 5/2002 | van Dantzich et al. |
| 2002/0060701 A1 | 5/2002 | Naughton et al. |
| 2002/0070961 A1 | 6/2002 | Xu et al. |
| 2002/0077156 A1 | 6/2002 | Smethers |
| 2002/0091755 A1 | 7/2002 | Narin |
| 2002/0097264 A1 | 7/2002 | Dutta et al. |
| 2002/0105531 A1 | 8/2002 | Niemi |
| 2002/0105553 A1 | 8/2002 | Segre |
| 2002/0115476 A1 | 8/2002 | Padawer et al. |
| 2002/0128036 A1 | 9/2002 | Yach et al. |
| 2002/0129061 A1 | 9/2002 | Swart et al. |
| 2002/0138248 A1 | 9/2002 | Corston-Oliver et al. |
| 2002/0142762 A1 | 10/2002 | Chmaytelli et al. |

(56) References Cited

U.S. PATENT DOCUMENTS

| | | |
|---|---|---|
| 2002/0145631 A1 | 10/2002 | Arbab et al. |
| 2002/0152305 A1 | 10/2002 | Jackson et al. |
| 2002/0154176 A1 | 10/2002 | Barksdale et al. |
| 2002/0161634 A1 | 10/2002 | Kaars |
| 2002/0186251 A1 | 12/2002 | Himmel et al. |
| 2002/0194385 A1 | 12/2002 | Linder et al. |
| 2003/0003899 A1 | 1/2003 | Tashiro et al. |
| 2003/0008686 A1 | 1/2003 | Park et al. |
| 2003/0011643 A1 | 1/2003 | Nishihihata |
| 2003/0019996 A1 | 1/2003 | Shields |
| 2003/0020671 A1 | 1/2003 | Santoro et al. |
| 2003/0040300 A1 | 2/2003 | Bodic |
| 2003/0046396 A1 | 3/2003 | Richter et al. |
| 2003/0073414 A1 | 4/2003 | Capps |
| 2003/0096604 A1 | 5/2003 | Vollandt |
| 2003/0105827 A1 | 6/2003 | Tan et al. |
| 2003/0135582 A1 | 7/2003 | Allen et al. |
| 2003/0187996 A1 | 10/2003 | Cardina et al. |
| 2003/0222907 A1 | 12/2003 | Heikes et al. |
| 2003/0225846 A1 | 12/2003 | Heikes et al. |
| 2003/0227491 A1* | 12/2003 | Moehrle ............ G06F 17/30126 715/854 |
| 2003/0234799 A1 | 12/2003 | Lee |
| 2004/0015553 A1 | 1/2004 | Griffin et al. |
| 2004/0066414 A1 | 4/2004 | Czerwinski et al. |
| 2004/0066418 A1 | 4/2004 | Tosey |
| 2004/0068543 A1 | 4/2004 | Seifert |
| 2004/0078299 A1 | 4/2004 | Down-Logan et al. |
| 2004/0111673 A1 | 6/2004 | Bowman et al. |
| 2004/0114315 A1 | 6/2004 | Anlauff |
| 2004/0155908 A1 | 8/2004 | Wagner |
| 2004/0165010 A1 | 8/2004 | Robertson et al. |
| 2004/0185883 A1 | 9/2004 | Rukman |
| 2004/0212586 A1 | 10/2004 | Denny |
| 2004/0212617 A1 | 10/2004 | Fitzmaurice et al. |
| 2004/0212640 A1 | 10/2004 | Mann et al. |
| 2004/0217954 A1 | 11/2004 | O'Gorman et al. |
| 2004/0217980 A1 | 11/2004 | Radburn et al. |
| 2004/0237048 A1 | 11/2004 | Tojo et al. |
| 2004/0246666 A1 | 12/2004 | Maskatia et al. |
| 2004/0250217 A1 | 12/2004 | Tojo et al. |
| 2005/0005241 A1 | 1/2005 | Hunleth et al. |
| 2005/0028208 A1 | 2/2005 | Ellis |
| 2005/0044058 A1 | 2/2005 | Matthews et al. |
| 2005/0050462 A1 | 3/2005 | Whittle et al. |
| 2005/0054384 A1 | 3/2005 | Pasquale et al. |
| 2005/0060647 A1 | 3/2005 | Doan et al. |
| 2005/0060658 A1 | 3/2005 | Tsukiori |
| 2005/0060663 A1 | 3/2005 | Arkeketa et al. |
| 2005/0060665 A1 | 3/2005 | Rekimoto |
| 2005/0079896 A1 | 4/2005 | Kokko et al. |
| 2005/0085215 A1 | 4/2005 | Kokko |
| 2005/0085272 A1 | 4/2005 | Anderson et al. |
| 2005/0108655 A1 | 5/2005 | Andrea et al. |
| 2005/0114788 A1 | 5/2005 | Fabritius |
| 2005/0120306 A1 | 6/2005 | Klassen et al. |
| 2005/0125739 A1 | 6/2005 | Thompson et al. |
| 2005/0136953 A1 | 6/2005 | Jo |
| 2005/0143138 A1 | 6/2005 | Lee et al. |
| 2005/0149879 A1 | 7/2005 | Jobs et al. |
| 2005/0182798 A1 | 8/2005 | Todd et al. |
| 2005/0183021 A1 | 8/2005 | Allen et al. |
| 2005/0184999 A1 | 8/2005 | Daioku |
| 2005/0198159 A1 | 9/2005 | Kirsch |
| 2005/0198584 A1 | 9/2005 | Matthews et al. |
| 2005/0200762 A1 | 9/2005 | Barletta et al. |
| 2005/0207734 A1 | 9/2005 | Howell et al. |
| 2005/0216300 A1 | 9/2005 | Appelman et al. |
| 2005/0223057 A1 | 10/2005 | Buchheit et al. |
| 2005/0223069 A1 | 10/2005 | Cooperman et al. |
| 2005/0232166 A1 | 10/2005 | Nierhaus |
| 2005/0250547 A1 | 11/2005 | Salman et al. |
| 2005/0268237 A1 | 12/2005 | Crane et al. |
| 2005/0273614 A1 | 12/2005 | Ahuja |
| 2005/0280719 A1 | 12/2005 | Kim |
| 2006/0004685 A1 | 1/2006 | Pyhalammi et al. |
| 2006/0005207 A1 | 1/2006 | Louch et al. |
| 2006/0010394 A1 | 1/2006 | Chaudhri et al. |
| 2006/0015562 A1 | 1/2006 | Kilian-Kehr et al. |
| 2006/0015736 A1 | 1/2006 | Callas et al. |
| 2006/0015812 A1 | 1/2006 | Cunningham |
| 2006/0015820 A1 | 1/2006 | Wood |
| 2006/0026013 A1 | 2/2006 | Kraft |
| 2006/0026521 A1 | 2/2006 | Hotelling et al. |
| 2006/0036425 A1 | 2/2006 | Le Cocq et al. |
| 2006/0048073 A1 | 3/2006 | Jarrett et al. |
| 2006/0048101 A1 | 3/2006 | Krassovsky et al. |
| 2006/0059430 A1 | 3/2006 | Bells |
| 2006/0070005 A1 | 3/2006 | Gilbert et al. |
| 2006/0074735 A1 | 4/2006 | Shukla et al. |
| 2006/0074771 A1 | 4/2006 | Kim |
| 2006/0075360 A1 | 4/2006 | Bixler |
| 2006/0085764 A1* | 4/2006 | Klementiev .......... G06F 3/0481 715/853 |
| 2006/0103623 A1 | 5/2006 | Davis |
| 2006/0107231 A1 | 5/2006 | Matthews et al. |
| 2006/0112354 A1 | 5/2006 | Park et al. |
| 2006/0114239 A1 | 6/2006 | Nakajima |
| 2006/0129543 A1 | 6/2006 | Bates et al. |
| 2006/0135220 A1 | 6/2006 | Kim et al. |
| 2006/0136773 A1 | 6/2006 | Kespohl et al. |
| 2006/0152803 A1 | 7/2006 | Provitola |
| 2006/0156247 A1 | 7/2006 | McCormack et al. |
| 2006/0172724 A1 | 8/2006 | Linkert et al. |
| 2006/0173911 A1 | 8/2006 | Levin et al. |
| 2006/0184901 A1 | 8/2006 | Dietz |
| 2006/0190833 A1 | 8/2006 | SanGiovanni et al. |
| 2006/0199598 A1 | 9/2006 | Lee et al. |
| 2006/0212806 A1 | 9/2006 | Griffin et al. |
| 2006/0218234 A1 | 9/2006 | Deng et al. |
| 2006/0218501 A1 | 9/2006 | Wilson et al. |
| 2006/0224993 A1 | 10/2006 | Wong et al. |
| 2006/0246955 A1 | 11/2006 | Nirhamo |
| 2006/0248471 A1 | 11/2006 | Lindsay et al. |
| 2006/0253685 A1 | 11/2006 | Wong et al. |
| 2006/0253801 A1 | 11/2006 | Okaro et al. |
| 2006/0259870 A1 | 11/2006 | Hewitt et al. |
| 2006/0259873 A1 | 11/2006 | Mister |
| 2006/0262134 A1 | 11/2006 | Hamiter et al. |
| 2006/0268100 A1 | 11/2006 | Karukka et al. |
| 2006/0271520 A1 | 11/2006 | Ragan |
| 2006/0281448 A1 | 12/2006 | Plestid et al. |
| 2006/0293088 A1 | 12/2006 | Kokubo |
| 2006/0294063 A1 | 12/2006 | Ali et al. |
| 2006/0294396 A1 | 12/2006 | Witman |
| 2007/0005716 A1 | 1/2007 | LaVasseur et al. |
| 2007/0006094 A1 | 1/2007 | Canfield et al. |
| 2007/0011610 A1 | 1/2007 | Sethi et al. |
| 2007/0015532 A1 | 1/2007 | Deelman |
| 2007/0024646 A1 | 2/2007 | Saarinen |
| 2007/0030634 A1 | 2/2007 | Maskatia |
| 2007/0035513 A1 | 2/2007 | Sherrard et al. |
| 2007/0038567 A1 | 2/2007 | Allaire et al. |
| 2007/0044039 A1 | 2/2007 | Amadio et al. |
| 2007/0050724 A1 | 3/2007 | Lee et al. |
| 2007/0054679 A1 | 3/2007 | Cho et al. |
| 2007/0061306 A1 | 3/2007 | Pell et al. |
| 2007/0061488 A1 | 3/2007 | Alagappan et al. |
| 2007/0061714 A1 | 3/2007 | Stuple et al. |
| 2007/0063995 A1 | 3/2007 | Bailey et al. |
| 2007/0067272 A1 | 3/2007 | Flynt |
| 2007/0067737 A1 | 3/2007 | Zielinski et al. |
| 2007/0067798 A1 | 3/2007 | Wroblewski |
| 2007/0073718 A1 | 3/2007 | Ramer |
| 2007/0076013 A1 | 4/2007 | Campbell |
| 2007/0080954 A1 | 4/2007 | Griffin |
| 2007/0082707 A1 | 4/2007 | Flynt et al. |
| 2007/0082708 A1 | 4/2007 | Griffin |
| 2007/0083746 A1 | 4/2007 | Fallon et al. |
| 2007/0083821 A1 | 4/2007 | Garbow et al. |
| 2007/0094597 A1 | 4/2007 | Rostom |
| 2007/0099694 A1 | 5/2007 | McCarthy et al. |
| 2007/0106635 A1 | 5/2007 | Frieden et al. |
| 2007/0120835 A1 | 5/2007 | Sato |

(56) References Cited

U.S. PATENT DOCUMENTS

| | | |
|---|---|---|
| 2007/0127638 A1 | 6/2007 | Doulton |
| 2007/0136677 A1 | 6/2007 | Agarwal |
| 2007/0150826 A1 | 6/2007 | Anzures et al. |
| 2007/0150842 A1 | 6/2007 | Chaudhri et al. |
| 2007/0157089 A1 | 7/2007 | Van Os et al. |
| 2007/0157099 A1 | 7/2007 | Haug |
| 2007/0157105 A1 | 7/2007 | Owens et al. |
| 2007/0157106 A1 | 7/2007 | Bishop |
| 2007/0171192 A1 | 7/2007 | Seo et al. |
| 2007/0171238 A1 | 7/2007 | Ubillos et al. |
| 2007/0180401 A1 | 8/2007 | Singh et al. |
| 2007/0182595 A1 | 8/2007 | Ghasabian |
| 2007/0182999 A1 | 8/2007 | Anthony et al. |
| 2007/0185847 A1 | 8/2007 | Budzik et al. |
| 2007/0192707 A1 | 8/2007 | Maeda et al. |
| 2007/0192730 A1 | 8/2007 | Simila et al. |
| 2007/0192733 A1 | 8/2007 | Horiuchi |
| 2007/0192739 A1 | 8/2007 | Hunleth et al. |
| 2007/0197196 A1 | 8/2007 | Shenfield et al. |
| 2007/0198420 A1 | 8/2007 | Goldstein |
| 2007/0208840 A1 | 9/2007 | Mcconville et al. |
| 2007/0211034 A1 | 9/2007 | Griffin et al. |
| 2007/0214422 A1 | 9/2007 | Agarwal et al. |
| 2007/0214429 A1 | 9/2007 | Lyudovyk et al. |
| 2007/0214454 A1 | 9/2007 | Edwards et al. |
| 2007/0216651 A1 | 9/2007 | Patel |
| 2007/0216661 A1 | 9/2007 | Chen et al. |
| 2007/0222769 A1 | 9/2007 | Otsuka et al. |
| 2007/0225022 A1 | 9/2007 | Satake |
| 2007/0233654 A1 | 10/2007 | Karlson |
| 2007/0236468 A1 | 10/2007 | Tuli |
| 2007/0238487 A1 | 10/2007 | Kuhl et al. |
| 2007/0238488 A1 | 10/2007 | Scott |
| 2007/0247435 A1 | 10/2007 | Benko et al. |
| 2007/0250583 A1 | 10/2007 | Hardy |
| 2007/0250787 A1 | 10/2007 | Kawahara et al. |
| 2007/0253758 A1 | 11/2007 | Suess |
| 2007/0255831 A1 | 11/2007 | Hayashi et al. |
| 2007/0256029 A1 | 11/2007 | Maxwell |
| 2007/0257891 A1 | 11/2007 | Esenther et al. |
| 2007/0257933 A1 | 11/2007 | Klassen |
| 2007/0260674 A1 | 11/2007 | Shenfield |
| 2007/0262964 A1 | 11/2007 | Zotov et al. |
| 2007/0263843 A1 | 11/2007 | Foxenland |
| 2007/0273663 A1 | 11/2007 | Park et al. |
| 2007/0273668 A1 | 11/2007 | Park et al. |
| 2007/0280457 A1 | 12/2007 | Aberethy |
| 2007/0281747 A1 | 12/2007 | Pletikosa |
| 2007/0291007 A1 | 12/2007 | Forlines et al. |
| 2008/0005668 A1 | 1/2008 | Mavinkurve |
| 2008/0024436 A1 | 1/2008 | Morooka |
| 2008/0028294 A1 | 1/2008 | Sell et al. |
| 2008/0032681 A1 | 2/2008 | West |
| 2008/0036743 A1 | 2/2008 | Westerman et al. |
| 2008/0040692 A1 | 2/2008 | Sunday et al. |
| 2008/0048986 A1 | 2/2008 | Khoo |
| 2008/0052370 A1 | 2/2008 | Snyder |
| 2008/0057910 A1 | 3/2008 | Thoresson et al. |
| 2008/0057926 A1 | 3/2008 | Forstall et al. |
| 2008/0059896 A1 | 3/2008 | Anderson et al. |
| 2008/0059913 A1* | 3/2008 | Burtner ............ G06F 3/0482 715/854 |
| 2008/0062318 A1* | 3/2008 | Ellis ............ H04N 5/44543 348/564 |
| 2008/0065607 A1 | 3/2008 | Weber |
| 2008/0066010 A1 | 3/2008 | Brodersen et al. |
| 2008/0072173 A1 | 3/2008 | Brunner et al. |
| 2008/0076472 A1 | 3/2008 | Hyatt |
| 2008/0082934 A1 | 4/2008 | Kocienda et al. |
| 2008/0084970 A1 | 4/2008 | Harper |
| 2008/0085700 A1 | 4/2008 | Arora |
| 2008/0092054 A1 | 4/2008 | Bhumkar et al. |
| 2008/0092057 A1 | 4/2008 | Monson et al. |
| 2008/0095100 A1 | 4/2008 | Cleveland et al. |
| 2008/0102863 A1 | 5/2008 | Hardy |
| 2008/0104544 A1 | 5/2008 | Collins et al. |
| 2008/0107057 A1 | 5/2008 | Kannan et al. |
| 2008/0113656 A1 | 5/2008 | Lee et al. |
| 2008/0114535 A1 | 5/2008 | Nesbitt |
| 2008/0120569 A1 | 5/2008 | Mann et al. |
| 2008/0120571 A1 | 5/2008 | Chang et al. |
| 2008/0122796 A1 | 5/2008 | Jobs |
| 2008/0132252 A1 | 6/2008 | Altman et al. |
| 2008/0141153 A1 | 6/2008 | Samson et al. |
| 2008/0153551 A1 | 6/2008 | Baek et al. |
| 2008/0155425 A1 | 6/2008 | Murthy et al. |
| 2008/0162651 A1 | 7/2008 | Madnani |
| 2008/0163104 A1 | 7/2008 | Haug |
| 2008/0165132 A1 | 7/2008 | Weiss |
| 2008/0165136 A1 | 7/2008 | Christie et al. |
| 2008/0165141 A1 | 7/2008 | Christie |
| 2008/0165163 A1 | 7/2008 | Bathiche |
| 2008/0167058 A1 | 7/2008 | Lee et al. |
| 2008/0168349 A1 | 7/2008 | Lamiraux et al. |
| 2008/0168379 A1 | 7/2008 | Forstall et al. |
| 2008/0168382 A1 | 7/2008 | Louch et al. |
| 2008/0168402 A1 | 7/2008 | Blumenberg |
| 2008/0168403 A1 | 7/2008 | Westerman et al. |
| 2008/0172609 A1 | 7/2008 | Rytivaara |
| 2008/0174570 A1 | 7/2008 | Jobs et al. |
| 2008/0180399 A1 | 7/2008 | Cheng |
| 2008/0182628 A1 | 7/2008 | Lee et al. |
| 2008/0184112 A1 | 7/2008 | Chiang et al. |
| 2008/0189653 A1 | 8/2008 | Taylor et al. |
| 2008/0189658 A1 | 8/2008 | Jeong et al. |
| 2008/0192056 A1 | 8/2008 | Robertson et al. |
| 2008/0198141 A1 | 8/2008 | Lee et al. |
| 2008/0200142 A1 | 8/2008 | Adbel-Kader et al. |
| 2008/0208973 A1 | 8/2008 | Hayashi |
| 2008/0222273 A1 | 9/2008 | Lakshmanan |
| 2008/0222545 A1 | 9/2008 | Lemay et al. |
| 2008/0222547 A1 | 9/2008 | Wong et al. |
| 2008/0222560 A1 | 9/2008 | Harrison |
| 2008/0222569 A1 | 9/2008 | Champion |
| 2008/0242362 A1 | 10/2008 | Duarte |
| 2008/0250354 A1 | 10/2008 | Park |
| 2008/0259042 A1 | 10/2008 | Thorn |
| 2008/0261513 A1 | 10/2008 | Shin et al. |
| 2008/0261660 A1 | 10/2008 | Huh et al. |
| 2008/0263457 A1 | 10/2008 | Kim et al. |
| 2008/0270558 A1 | 10/2008 | Ma |
| 2008/0297475 A1 | 12/2008 | Woolf et al. |
| 2008/0299999 A1 | 12/2008 | Lockhart et al. |
| 2008/0301046 A1 | 12/2008 | Martinez |
| 2008/0301575 A1 | 12/2008 | Fermon |
| 2008/0307345 A1* | 12/2008 | Hart ............ G06F 11/1448 715/769 |
| 2008/0307351 A1 | 12/2008 | Louch et al. |
| 2008/0307364 A1 | 12/2008 | Chaudhri et al. |
| 2008/0309626 A1 | 12/2008 | Westerman et al. |
| 2008/0313538 A1 | 12/2008 | Hudson |
| 2008/0316177 A1 | 12/2008 | Tseng |
| 2008/0317240 A1 | 12/2008 | Chang et al. |
| 2008/0320413 A1 | 12/2008 | Oshiro |
| 2009/0007009 A1 | 1/2009 | Luneau et al. |
| 2009/0007017 A1 | 1/2009 | Anzures et al. |
| 2009/0011838 A1 | 1/2009 | Miyamoto |
| 2009/0012952 A1 | 1/2009 | Fredriksson |
| 2009/0019369 A1 | 1/2009 | Borovsky et al. |
| 2009/0029736 A1 | 1/2009 | Kim et al. |
| 2009/0031247 A1 | 1/2009 | Walter et al. |
| 2009/0037469 A1 | 2/2009 | Kirsch |
| 2009/0037846 A1 | 2/2009 | Spalink et al. |
| 2009/0051671 A1 | 2/2009 | Konstas |
| 2009/0058821 A1 | 3/2009 | Chaudhri |
| 2009/0061837 A1 | 3/2009 | Chaudhri et al. |
| 2009/0061948 A1 | 3/2009 | Lee et al. |
| 2009/0062007 A1 | 3/2009 | Chihaya |
| 2009/0064055 A1 | 3/2009 | Chaudhri et al. |
| 2009/0070673 A1 | 3/2009 | Barkan et al. |
| 2009/0077649 A1 | 3/2009 | Lockhart |
| 2009/0083656 A1 | 3/2009 | Dokhon |
| 2009/0085851 A1 | 4/2009 | Lim |
| 2009/0085878 A1 | 4/2009 | Heubel |

(56) References Cited

U.S. PATENT DOCUMENTS

| | | |
|---|---|---|
| 2009/0089215 A1 | 4/2009 | Newton |
| 2009/0089459 A1 | 4/2009 | Jeyaseelan et al. |
| 2009/0094562 A1 | 4/2009 | Jeong et al. |
| 2009/0103515 A1 | 4/2009 | Pointer |
| 2009/0106694 A1 | 4/2009 | Kraft et al. |
| 2009/0106696 A1 | 4/2009 | Duarte |
| 2009/0109243 A1 | 4/2009 | Kraft |
| 2009/0117942 A1 | 5/2009 | Boningue et al. |
| 2009/0125844 A1 | 5/2009 | Weir et al. |
| 2009/0140061 A1 | 6/2009 | Schultz et al. |
| 2009/0140986 A1 | 6/2009 | Karkkainen et al. |
| 2009/0144642 A1 | 6/2009 | Crystal |
| 2009/0144653 A1 | 6/2009 | Ubillos |
| 2009/0146962 A1 | 6/2009 | Ahonen et al. |
| 2009/0150618 A1 | 6/2009 | Allen, Jr. et al. |
| 2009/0153492 A1 | 6/2009 | Popp |
| 2009/0158144 A1 | 6/2009 | Griffin |
| 2009/0160809 A1 | 6/2009 | Yang |
| 2009/0163182 A1 | 6/2009 | Gatti et al. |
| 2009/0164888 A1 | 6/2009 | Phan |
| 2009/0164928 A1 | 6/2009 | Brown et al. |
| 2009/0164936 A1 | 6/2009 | Kawaguchi |
| 2009/0174679 A1 | 7/2009 | Westerman |
| 2009/0178007 A1 | 7/2009 | Matas et al. |
| 2009/0182788 A1 | 7/2009 | Chung et al. |
| 2009/0184939 A1 | 7/2009 | Wohlstadter et al. |
| 2009/0189915 A1* | 7/2009 | Mercer ............... G06F 3/0482 345/646 |
| 2009/0192942 A1 | 7/2009 | Cottrille et al. |
| 2009/0199122 A1 | 8/2009 | Deutsch et al. |
| 2009/0199128 A1 | 8/2009 | Matthews et al. |
| 2009/0199130 A1 | 8/2009 | Tsern et al. |
| 2009/0205041 A1 | 8/2009 | Michalske |
| 2009/0215504 A1 | 8/2009 | Lando |
| 2009/0228825 A1 | 9/2009 | Van Os et al. |
| 2009/0228841 A1 | 9/2009 | Hildreth |
| 2009/0235200 A1 | 9/2009 | Deutsch et al. |
| 2009/0235203 A1 | 9/2009 | Iizuka |
| 2009/0248421 A1 | 10/2009 | Michaelis et al. |
| 2009/0249257 A1 | 10/2009 | Bove et al. |
| 2009/0249428 A1 | 10/2009 | White et al. |
| 2009/0265662 A1 | 10/2009 | Bamford |
| 2009/0271778 A1 | 10/2009 | Mandyam et al. |
| 2009/0284482 A1 | 11/2009 | Chin |
| 2009/0288044 A1 | 11/2009 | Matthews et al. |
| 2009/0292989 A1 | 11/2009 | Matthews et al. |
| 2009/0293007 A1 | 11/2009 | Duarte et al. |
| 2009/0293013 A1 | 11/2009 | O'Shaugnessy et al. |
| 2009/0293014 A1 | 11/2009 | Meuninck et al. |
| 2009/0298547 A1 | 12/2009 | Kim et al. |
| 2009/0303231 A1 | 12/2009 | Robinet et al. |
| 2009/0305732 A1 | 12/2009 | Marcellino et al. |
| 2009/0307105 A1 | 12/2009 | Lemay et al. |
| 2009/0307589 A1 | 12/2009 | Inose et al. |
| 2009/0307623 A1 | 12/2009 | Agarawala et al. |
| 2009/0313584 A1 | 12/2009 | Kerr et al. |
| 2009/0315839 A1 | 12/2009 | Wilson et al. |
| 2009/0315847 A1 | 12/2009 | Fujii |
| 2009/0318171 A1 | 12/2009 | Backholm et al. |
| 2009/0322760 A1 | 12/2009 | Kwiatkowski et al. |
| 2009/0327904 A1* | 12/2009 | Guzak ............... G06F 3/0482 715/738 |
| 2009/0327969 A1 | 12/2009 | Estrada |
| 2010/0008490 A1 | 1/2010 | Gharachorloo et al. |
| 2010/0013782 A1 | 1/2010 | Liu et al. |
| 2010/0020025 A1 | 1/2010 | Lemort et al. |
| 2010/0020091 A1 | 1/2010 | Rasmussen et al. |
| 2010/0031186 A1 | 2/2010 | Tseng |
| 2010/0042911 A1 | 2/2010 | Wormald et al. |
| 2010/0050076 A1 | 2/2010 | Roth |
| 2010/0058248 A1 | 3/2010 | Park |
| 2010/0062811 A1 | 3/2010 | Park et al. |
| 2010/0066698 A1 | 3/2010 | Seo |
| 2010/0066705 A1 | 3/2010 | Keely et al. |
| 2010/0070931 A1 | 3/2010 | Nichols |
| 2010/0073380 A1 | 3/2010 | Kaplan et al. |
| 2010/0075628 A1 | 3/2010 | Ye |
| 2010/0077058 A1 | 3/2010 | Messer |
| 2010/0077310 A1 | 3/2010 | Karachale et al. |
| 2010/0077330 A1 | 3/2010 | Kaplan et al. |
| 2010/0079392 A1 | 4/2010 | Chiang et al. |
| 2010/0079413 A1 | 4/2010 | Kawashima et al. |
| 2010/0081475 A1 | 4/2010 | Chiang et al. |
| 2010/0086022 A1 | 4/2010 | Hunleth et al. |
| 2010/0087169 A1 | 4/2010 | Lin |
| 2010/0087173 A1 | 4/2010 | Lin |
| 2010/0088635 A1 | 4/2010 | Louch |
| 2010/0100839 A1 | 4/2010 | Tseng et al. |
| 2010/0102998 A1 | 4/2010 | Fux |
| 2010/0103118 A1 | 4/2010 | Townsend et al. |
| 2010/0103124 A1 | 4/2010 | Kruzeniski |
| 2010/0105370 A1 | 4/2010 | Kruzeniski |
| 2010/0105424 A1 | 4/2010 | Smuga |
| 2010/0105438 A1 | 4/2010 | Wykes |
| 2010/0105439 A1 | 4/2010 | Friedman |
| 2010/0105440 A1* | 4/2010 | Kruzeniski ............ G06F 3/0482 455/566 |
| 2010/0105441 A1 | 4/2010 | Voss |
| 2010/0106607 A1 | 4/2010 | Riddiford et al. |
| 2010/0106915 A1 | 4/2010 | Krishnaprasad et al. |
| 2010/0107067 A1 | 4/2010 | Vaisanen |
| 2010/0107068 A1 | 4/2010 | Butcher |
| 2010/0107100 A1 | 4/2010 | Schneekloth |
| 2010/0122110 A1 | 5/2010 | Ordogh |
| 2010/0131901 A1 | 5/2010 | Takahashi et al. |
| 2010/0138767 A1 | 6/2010 | Wang et al. |
| 2010/0138782 A1 | 6/2010 | Rainisto |
| 2010/0138834 A1 | 6/2010 | Agarwal et al. |
| 2010/0145675 A1 | 6/2010 | Lloyd et al. |
| 2010/0146384 A1 | 6/2010 | Peev et al. |
| 2010/0146437 A1 | 6/2010 | Woodcock et al. |
| 2010/0157157 A1 | 6/2010 | Yi |
| 2010/0159966 A1 | 6/2010 | Friedman |
| 2010/0159994 A1 | 6/2010 | Stallings et al. |
| 2010/0159995 A1 | 6/2010 | Stallings et al. |
| 2010/0162180 A1 | 6/2010 | Dunnam et al. |
| 2010/0167699 A1 | 7/2010 | Sigmund et al. |
| 2010/0169766 A1 | 7/2010 | Duarte et al. |
| 2010/0169772 A1 | 7/2010 | Stallings et al. |
| 2010/0175018 A1 | 7/2010 | Petschnigg et al. |
| 2010/0175029 A1 | 7/2010 | Williams |
| 2010/0180233 A1 | 7/2010 | Kruzeniski |
| 2010/0185932 A1 | 7/2010 | Coffman et al. |
| 2010/0192102 A1 | 7/2010 | Chmielewski et al. |
| 2010/0216491 A1 | 8/2010 | Winkler et al. |
| 2010/0223569 A1 | 9/2010 | Vuong et al. |
| 2010/0235733 A1 | 9/2010 | Drislane et al. |
| 2010/0248688 A1 | 9/2010 | Teng |
| 2010/0248689 A1 | 9/2010 | Teng |
| 2010/0248741 A1 | 9/2010 | Setlur et al. |
| 2010/0248787 A1 | 9/2010 | Smuga |
| 2010/0248788 A1 | 9/2010 | Yook et al. |
| 2010/0251153 A1 | 9/2010 | SanGiovanni et al. |
| 2010/0265196 A1 | 10/2010 | Lee et al. |
| 2010/0281402 A1 | 11/2010 | Staikos et al. |
| 2010/0281409 A1 | 11/2010 | Rainisto et al. |
| 2010/0283743 A1 | 11/2010 | Coddington |
| 2010/0289806 A1 | 11/2010 | Lao et al. |
| 2010/0293056 A1 | 11/2010 | Flynt et al. |
| 2010/0293501 A1 | 11/2010 | Russ et al. |
| 2010/0295795 A1 | 11/2010 | Wilairat |
| 2010/0298034 A1 | 11/2010 | Shin et al. |
| 2010/0302172 A1 | 12/2010 | Wilairat |
| 2010/0302176 A1 | 12/2010 | Nikula et al. |
| 2010/0302278 A1 | 12/2010 | Shaffer et al. |
| 2010/0302712 A1 | 12/2010 | Zednicek et al. |
| 2010/0309148 A1 | 12/2010 | Fleizach et al. |
| 2010/0311470 A1 | 12/2010 | Seo et al. |
| 2010/0313165 A1 | 12/2010 | Louch et al. |
| 2010/0321403 A1 | 12/2010 | Inadome |
| 2010/0325411 A1 | 12/2010 | Jung et al. |
| 2010/0328431 A1 | 12/2010 | Kim et al. |
| 2010/0329642 A1 | 12/2010 | Kam et al. |
| 2010/0333008 A1 | 12/2010 | Taylor |

(56) References Cited

U.S. PATENT DOCUMENTS

| | | |
|---|---|---|
| 2011/0004839 A1 | 1/2011 | Cha et al. |
| 2011/0004845 A1 | 1/2011 | Ciabarra |
| 2011/0018806 A1 | 1/2011 | Yano |
| 2011/0029598 A1 | 2/2011 | Arnold et al. |
| 2011/0029904 A1 | 2/2011 | Smith et al. |
| 2011/0029927 A1 | 2/2011 | Lietzke et al. |
| 2011/0029934 A1 | 2/2011 | Locker et al. |
| 2011/0043527 A1 | 2/2011 | Ording et al. |
| 2011/0055773 A1 | 3/2011 | Agarawala et al. |
| 2011/0057953 A1 | 3/2011 | Horodezky |
| 2011/0074699 A1 | 3/2011 | Marr et al. |
| 2011/0074710 A1 | 3/2011 | Weeldreyer et al. |
| 2011/0074719 A1 | 3/2011 | Yeh et al. |
| 2011/0078624 A1 | 3/2011 | Missig et al. |
| 2011/0087739 A1 | 4/2011 | Lin |
| 2011/0087988 A1 | 4/2011 | Ray et al. |
| 2011/0093778 A1 | 4/2011 | Kim et al. |
| 2011/0093816 A1 | 4/2011 | Chang et al. |
| 2011/0093821 A1 | 4/2011 | Wigdor et al. |
| 2011/0107272 A1 | 5/2011 | Aguilar |
| 2011/0109563 A1 | 5/2011 | Liu |
| 2011/0113337 A1 | 5/2011 | Liu et al. |
| 2011/0113486 A1 | 5/2011 | Hunt et al. |
| 2011/0119586 A1 | 5/2011 | Blinnikka et al. |
| 2011/0126156 A1 | 5/2011 | Krishnaraj et al. |
| 2011/0138319 A1* | 6/2011 | Sidman ............... G06F 3/0481 715/781 |
| 2011/0154235 A1 | 6/2011 | Min et al. |
| 2011/0157027 A1 | 6/2011 | Rissa |
| 2011/0161845 A1 | 6/2011 | Stallings et al. |
| 2011/0163968 A1 | 7/2011 | Hogan |
| 2011/0167341 A1 | 7/2011 | Cranfill et al. |
| 2011/0170252 A1 | 7/2011 | Jones et al. |
| 2011/0173556 A1 | 7/2011 | Czerwinski et al. |
| 2011/0173568 A1 | 7/2011 | Royal, Jr. et al. |
| 2011/0173569 A1 | 7/2011 | Howes et al. |
| 2011/0175930 A1 | 7/2011 | Hwang et al. |
| 2011/0179368 A1* | 7/2011 | King ................. G06F 3/04815 715/769 |
| 2011/0179386 A1 | 7/2011 | Shaffer et al. |
| 2011/0179387 A1 | 7/2011 | Shaffer et al. |
| 2011/0184960 A1 | 7/2011 | Delpha et al. |
| 2011/0185318 A1 | 7/2011 | Hinckley et al. |
| 2011/0191675 A1 | 8/2011 | Kauranen |
| 2011/0202866 A1 | 8/2011 | Huang et al. |
| 2011/0209039 A1 | 8/2011 | Hinckley et al. |
| 2011/0209089 A1 | 8/2011 | Hinckley et al. |
| 2011/0209099 A1 | 8/2011 | Hinckley |
| 2011/0209100 A1 | 8/2011 | Hinckley et al. |
| 2011/0209101 A1 | 8/2011 | Hinckley et al. |
| 2011/0209102 A1 | 8/2011 | Hinckley et al. |
| 2011/0209103 A1 | 8/2011 | Hinckley et al. |
| 2011/0209104 A1 | 8/2011 | Hinckley et al. |
| 2011/0216064 A1 | 9/2011 | Dahl et al. |
| 2011/0225547 A1 | 9/2011 | Fong et al. |
| 2011/0231796 A1 | 9/2011 | Vigil |
| 2011/0252346 A1 | 10/2011 | Chaudhri |
| 2011/0252372 A1 | 10/2011 | Chaudhri |
| 2011/0252380 A1 | 10/2011 | Chaudhri |
| 2011/0252381 A1 | 10/2011 | Chaudhri |
| 2011/0276864 A1 | 11/2011 | Oules |
| 2011/0276992 A1 | 11/2011 | Tsai |
| 2011/0279461 A1 | 11/2011 | Hamilton et al. |
| 2011/0296337 A1 | 12/2011 | Louch et al. |
| 2011/0316884 A1 | 12/2011 | Giambalvo et al. |
| 2011/0320978 A1 | 12/2011 | Horodezky et al. |
| 2012/0005584 A1 | 1/2012 | Seago et al. |
| 2012/0009903 A1 | 1/2012 | Schultz et al. |
| 2012/0011437 A1 | 1/2012 | James et al. |
| 2012/0012483 A1 | 1/2012 | Fan |
| 2012/0023101 A1 | 1/2012 | Heimendinger et al. |
| 2012/0028687 A1 | 2/2012 | Wykes |
| 2012/0050185 A1 | 3/2012 | Davydov et al. |
| 2012/0050332 A1 | 3/2012 | Nikara et al. |
| 2012/0054778 A1 | 3/2012 | Russell et al. |
| 2012/0072853 A1 | 3/2012 | Krigstrom et al. |
| 2012/0072953 A1 | 3/2012 | James et al. |
| 2012/0084704 A1 | 4/2012 | Lee et al. |
| 2012/0102433 A1 | 4/2012 | Falkenburg |
| 2012/0151397 A1 | 6/2012 | Oberstein et al. |
| 2012/0159386 A1 | 6/2012 | Kang et al. |
| 2012/0159395 A1 | 6/2012 | Deutsch et al. |
| 2012/0159402 A1 | 6/2012 | Nurmi et al. |
| 2012/0161791 A1 | 6/2012 | Shaw |
| 2012/0162266 A1 | 6/2012 | Douglas et al. |
| 2012/0166471 A1* | 6/2012 | Ramamurthy ........ G06F 3/0482 707/769 |
| 2012/0167008 A1 | 6/2012 | Zaman |
| 2012/0167011 A1 | 6/2012 | Zaman |
| 2012/0174005 A1 | 7/2012 | Deutsch et al. |
| 2012/0174029 A1 | 7/2012 | Bastide et al. |
| 2012/0174034 A1 | 7/2012 | Chae et al. |
| 2012/0176401 A1 | 7/2012 | Hayward et al. |
| 2012/0179992 A1 | 7/2012 | Smuga |
| 2012/0180001 A1 | 7/2012 | Griffin et al. |
| 2012/0194448 A1 | 8/2012 | Rothkopf |
| 2012/0208501 A1 | 8/2012 | Tsuda |
| 2012/0210265 A1 | 8/2012 | Delia et al. |
| 2012/0212495 A1 | 8/2012 | Butcher |
| 2012/0216139 A1 | 8/2012 | Ording et al. |
| 2012/0233571 A1 | 9/2012 | Wever et al. |
| 2012/0235930 A1 | 9/2012 | Lazaridis et al. |
| 2012/0244841 A1 | 9/2012 | Teng |
| 2012/0254780 A1 | 10/2012 | Mouton et al. |
| 2012/0254808 A1 | 10/2012 | Gildfind |
| 2012/0265644 A1 | 10/2012 | Roa et al. |
| 2012/0272181 A1 | 10/2012 | Rogers et al. |
| 2012/0278727 A1 | 11/2012 | Ananthakrishnan et al. |
| 2012/0290962 A1 | 11/2012 | Zielinski et al. |
| 2012/0299968 A1 | 11/2012 | Wong et al. |
| 2012/0304068 A1 | 11/2012 | Zaman et al. |
| 2012/0304092 A1 | 11/2012 | Jarrett et al. |
| 2012/0304102 A1 | 11/2012 | LeVee et al. |
| 2012/0304103 A1 | 11/2012 | LeVee et al. |
| 2012/0304106 A1 | 11/2012 | LeVee et al. |
| 2012/0304107 A1 | 11/2012 | Nan et al. |
| 2012/0304108 A1 | 11/2012 | Jarrett et al. |
| 2012/0304113 A1 | 11/2012 | Patten et al. |
| 2012/0304114 A1 | 11/2012 | Wong et al. |
| 2012/0304116 A1 | 11/2012 | Donahue et al. |
| 2012/0304117 A1 | 11/2012 | Donahue et al. |
| 2012/0304118 A1 | 11/2012 | Donahue et al. |
| 2012/0304131 A1 | 11/2012 | Nan et al. |
| 2012/0304132 A1 | 11/2012 | Sareen et al. |
| 2012/0304133 A1 | 11/2012 | Nan et al. |
| 2012/0311485 A1 | 12/2012 | Caliendo, Jr. et al. |
| 2012/0314342 A1 | 12/2012 | Sheu et al. |
| 2012/0322527 A1 | 12/2012 | Aoki et al. |
| 2012/0323992 A1 | 12/2012 | Brobst et al. |
| 2012/0329557 A1 | 12/2012 | Takamura et al. |
| 2013/0033525 A1 | 2/2013 | Markiewicz |
| 2013/0042203 A1 | 2/2013 | Wong et al. |
| 2013/0042206 A1 | 2/2013 | Zaman et al. |
| 2013/0044136 A1 | 2/2013 | Matthews |
| 2013/0044141 A1 | 2/2013 | Markiewicz |
| 2013/0047079 A1 | 2/2013 | Kroeger et al. |
| 2013/0047105 A1 | 2/2013 | Jarrett |
| 2013/0047117 A1 | 2/2013 | Deutsch |
| 2013/0047126 A1 | 2/2013 | Sareen |
| 2013/0057572 A1 | 3/2013 | Anderson et al. |
| 2013/0057587 A1 | 3/2013 | Leonard et al. |
| 2013/0057588 A1 | 3/2013 | Leonard |
| 2013/0063442 A1 | 3/2013 | Zaman |
| 2013/0063443 A1 | 3/2013 | Garside |
| 2013/0063465 A1 | 3/2013 | Zaman |
| 2013/0063490 A1 | 3/2013 | Zaman et al. |
| 2013/0067381 A1 | 3/2013 | Yalovsky |
| 2013/0067390 A1 | 3/2013 | Kwiatkowski |
| 2013/0067391 A1 | 3/2013 | Pittappilly |
| 2013/0067398 A1 | 3/2013 | Pittappilly |
| 2013/0067399 A1 | 3/2013 | Elliott |
| 2013/0067412 A1 | 3/2013 | Leonard et al. |
| 2013/0067420 A1 | 3/2013 | Pittappilly |
| 2013/0093757 A1 | 4/2013 | Cornell |

(56) References Cited

U.S. PATENT DOCUMENTS

| | | | |
|---|---|---|---|
| 2013/0102366 | A1 | 4/2013 | Teng |
| 2013/0145244 | A1 | 6/2013 | Rothschiller et al. |
| 2013/0155116 | A1 | 6/2013 | Paretti et al. |
| 2013/0159900 | A1 | 6/2013 | Pendharkar |
| 2013/0167058 | A1 | 6/2013 | LeVee |
| 2013/0174070 | A1 | 7/2013 | Briand |
| 2013/0178155 | A1 | 7/2013 | Shulenberger |
| 2013/0179781 | A1 | 7/2013 | Nan et al. |
| 2013/0227476 | A1 | 8/2013 | Frey |
| 2013/0227482 | A1 | 8/2013 | Thorsander et al. |
| 2013/0227483 | A1 | 8/2013 | Thorsander et al. |
| 2013/0232451 | A1 | 9/2013 | Chen et al. |
| 2013/0268422 | A1 | 10/2013 | Ram et al. |
| 2013/0275921 | A1 | 10/2013 | Lee et al. |
| 2013/0277271 | A1 | 10/2013 | Toulotte |
| 2013/0297700 | A1 | 11/2013 | Hayton et al. |
| 2013/0339904 | A1* | 12/2013 | Geithner .............. G06F 3/0482 715/834 |
| 2014/0035820 | A1 | 2/2014 | Zheng |
| 2014/0074909 | A1* | 3/2014 | Gunderson ......... H04L 12/1822 709/203 |
| 2014/0082552 | A1 | 3/2014 | Zaman |
| 2014/0096024 | A1* | 4/2014 | Laurent ................. G06F 21/128 715/739 |
| 2014/0109008 | A1 | 4/2014 | Zaman |
| 2014/0123072 | A1* | 5/2014 | Bhowmick ........... G06F 3/0482 715/838 |
| 2014/0195963 | A1* | 7/2014 | Cheung .................. G06F 17/50 715/781 |
| 2014/0298226 | A1 | 10/2014 | Jin et al. |
| 2014/0298245 | A1 | 10/2014 | Tappen et al. |
| 2014/0328479 | A1* | 11/2014 | Epiktetov ........... H04M 3/5183 379/265.09 |
| 2014/0380232 | A1* | 12/2014 | Sarnoff .............. G06F 3/04817 715/781 |
| 2015/0086180 | A1 | 3/2015 | Pan |
| 2015/0113476 | A1 | 4/2015 | Deutsch et al. |
| 2015/0160828 | A1* | 6/2015 | Wang .................. G06F 3/0482 715/835 |
| 2015/0186397 | A1* | 7/2015 | Cueto .............. G06F 17/30126 715/854 |
| 2015/0193403 | A1 | 7/2015 | Zaman et al. |

FOREIGN PATENT DOCUMENTS

| | | |
|---|---|---|
| CN | 1749936 | 3/2006 |
| CN | 1786906 | 6/2006 |
| CN | 1851641 | 10/2006 |
| CN | 1936797 | 3/2007 |
| CN | 101006425 | 7/2007 |
| CN | 101075174 | 11/2007 |
| CN | 101114303 | 1/2008 |
| CN | 101228570 | 7/2008 |
| CN | 101770332 | 7/2010 |
| CN | 101809531 | 8/2010 |
| CN | 102144213 | 8/2011 |
| CN | 102197702 | 9/2011 |
| CN | 102624970 | 8/2012 |
| CN | 202904485 | 4/2013 |
| CN | 103105995 | 5/2013 |
| CN | 203025612 | 6/2013 |
| CN | 103197837 | 7/2013 |
| CN | 203133676 | 8/2013 |
| CN | 103475784 | 12/2013 |
| CN | 103562858 | 2/2014 |
| CN | 103562917 | 2/2014 |
| EP | 0583060 | 2/1994 |
| EP | 0965932 | 12/1999 |
| EP | 1337093 | 8/2003 |
| EP | 1526463 | 4/2005 |
| EP | 1752868 | 2/2007 |
| EP | 1939718 | 7/2008 |
| EP | 2172836 | 4/2009 |
| EP | 2535809 | 12/2012 |
| EP | 2762997 A2 | 8/2014 |
| GB | 2350991 | 12/2000 |
| JP | 2004227393 | 8/2004 |
| JP | 2004357257 | 12/2004 |
| JP | 2006139615 | 6/2006 |
| KR | 200303655 | 2/2003 |
| KR | 20060019198 | 3/2006 |
| KR | 1020070036114 | 4/2007 |
| KR | 20070093585 | 9/2007 |
| KR | 1020070098337 | 10/2007 |
| KR | 20070120368 | 12/2007 |
| KR | 1020080025951 | 3/2008 |
| KR | 1020080041809 | 5/2008 |
| KR | 1020080076390 | 8/2008 |
| KR | 100854333 | 9/2008 |
| KR | 20080084156 | 9/2008 |
| KR | 1020080084156 | 9/2008 |
| KR | 1020080113913 | 12/2008 |
| KR | 20090002951 | 1/2009 |
| KR | 1020090041635 | 4/2009 |
| KR | 20090053143 | 5/2009 |
| KR | 20100010072 | 2/2010 |
| KR | 20100048375 | 5/2010 |
| KR | 20100056369 | 5/2010 |
| KR | 1020100056369 | 5/2010 |
| TW | 201023026 | 6/2010 |
| TW | 201106128 | 2/2011 |
| WO | WO-9926127 | 5/1999 |
| WO | WO-0129976 | 4/2001 |
| WO | WO-2005026931 | 3/2005 |
| WO | WO-2005027506 | 3/2005 |
| WO | WO-2006019639 | 2/2006 |
| WO | WO-2007121557 | 11/2007 |
| WO | WO-2007134623 | 11/2007 |
| WO | WO-2008030608 | 3/2008 |
| WO | WO-2008031871 | 3/2008 |
| WO | WO-2008035831 | 3/2008 |
| WO | WO-2008084211 | 7/2008 |
| WO | WO-2008146784 | 12/2008 |
| WO | WO-2009000043 | 12/2008 |
| WO | WO-2009012398 | 1/2009 |
| WO | WO-2009049331 | 4/2009 |
| WO | WO-2009054809 | 4/2009 |
| WO | WO-2010024969 | 3/2010 |
| WO | WO-2010048229 | 4/2010 |
| WO | WO-2010048448 | 4/2010 |
| WO | WO-2010048519 | 4/2010 |
| WO | WO-2010117643 | 10/2010 |
| WO | WO-2010117661 | 10/2010 |
| WO | WO-2010119356 | 10/2010 |
| WO | WO-2010135155 | 11/2010 |
| WO | WO-2011041885 | 4/2011 |
| WO | 2013120135 A2 | 8/2013 |
| WO | WO-2013158110 | 10/2013 |

OTHER PUBLICATIONS

"Foreign Office Action", CN Application No. 201180071186.4, Jun. 2, 2015, 7 pages.

"Non-Final Office Action", U.S. Appl. No. 14/659,442, Jul. 7, 2015, 7 pages.

"Notice of Allowance", U.S. Appl. No. 13/335,001, Aug. 26, 2015, 7 pages.

"Authoritative Dictionary of IEEE Standards Terms, 7th ed.", Definitions—processor, memory, and storage, 2000, 3 pages.

"CloseAll Closes All Open Program Windows in One Click", Guiding Tech.com, Retrieved from <https://web.archive.org/web/20100424072622/http://www.guidingtech.com/2470/close-open-program-windows-in-one-click> on Apr. 1, 2015, Apr. 24, 2010, 6 pages.

"Extended European Search Report", EP Application No. 11871863.4, May 11, 2015, 8 pages.

"Extended European Search Report", EP Application No. 11871917.8, May 11, 2015, 9 pages.

"Extended European Search Report", EP Application No. 11872137.2, Apr. 9, 2015, 12 pages.

(56) References Cited

OTHER PUBLICATIONS

"Foreign Office Action", CN Application No. 201210331158.8, May 11, 2015, 7 pages.
"Foreign Office Action", CN Application No. 201210331670.2, Mar. 25, 2015, 14 pages.
"Foreign Office Action", CO Application No. 13300256, Apr. 11, 2015, 8 Pages.
"Foreign Office Action", CO Application No. 13300265, Apr. 21, 2015, 11 Pages.
"Foreign Office Action", PH Application No. PH/1/2013/502367, Apr. 24, 2015, 3 pages.
"Non-Final Office Action", U.S. Appl. No. 13/073,300, Apr. 30, 2015, 15 pages.
"Non-Final Office Action", U.S. Appl. No. 13/229,693, Apr. 23, 2015, 28 pages.
"Non-Final Office Action", U.S. Appl. No. 13/335,001, Apr. 1, 2015, 25 pages.
"Non-Final Office Action", U.S. Appl. No. 13/550,432, Apr. 27, 2015, 15 pages.
"Non-Final Office Action", U.S. Appl. No. 13/904,880, May 4, 2015, 22 pages.
"Notice of Allowance", U.S. Appl. No. 13/118,333, May 4, 2015, 16 pages.
"Notice of Allowance", U.S. Appl. No. 13/229,702, Apr. 29, 2015, 7 pages.
"Notice of Allowance", U.S. Appl. No. 13/345,383, May 18, 2015, 5 pages.
"Rename a file", Retrieved from <http://windows.microsoft.com/en-us/windows7/rename-a-file> on Apr. 27, 2015, Aug. 24, 2009, 1 page.
Bederson,"Implementing a Zooming User Interface: Experience Building Pad++", Software Practice & Experience, Wiley & Sons, Aug. 1998, 34 pages.
Bederson,"Jazz: An Extensible Zoomable User Interface Graphics Toolkit in Java", Proceedings of the 2000 ACM SIGCPR Conference, Apr. 2000, 11 pages.
Jetter,"Materializing the Query with Facet-Streams—A Hybrid Surface for Collaborative Search on Tabletops", May 7, 2011, 10 pages.
"Adobe Acrobat 8 Standard User Guide", Adobe Systems Incorporated, 2007, pp. 34 & 36.
"Advisory Action", U.S. Appl. No. 12/414,382, Jan. 20, 2012, 3 pages.
"Advisory Action", U.S. Appl. No. 12/433,605, Apr. 5, 2012, 3 pages.
"Airbender 2.0", Retrieved From: <http://www.newtrent.com/airbender-2-0-nt30b.html> Mar. 31, 2014, 2013, 2 Pages.
"Alltel Adds Dedicated Search Key to Phones", Retrieved from: <http://www.phonescoop.com/news/item.php?n=2159> on Nov. 26, 2008., Apr. 12, 2007, 2 Pages.
"Android 2.3 User's Guide", AUG-2.3-103, Android mobile technology platform 2.3, Dec. 13, 2010, 380 pages.
"Apple iPhone—8GB AT&T", Retrieved from: <http://nytimes.com.com/smartphones/apple-iphone-8gb-at/4515-6452_7-32309245.html> on Nov. 20, 2008, Jun. 29, 2007, 11 pages.
"Application User Model IDs", Retrieved from: <http://msdn.microsoft.com/en-us/library/dd378459(VS.85).aspx> on Sep. 28, 2010, 2010, 6 pages.
"Ask Web Hosting", Retrieved from: <http://www.askwebhosting.com/story/18501/HTC_FUZE_From_ATandampT_Fuses_Fun_and_Function_With_the_One-Touch_Power_of_TouchFLO_3D.html> on May 5, 2009., Nov. 11, 2008, 3 pages.
"Basics of Your Device: Get Familiar with the Home Screen", Nokia USA—How to—retrieved from <http://www.nokia.ca/get-support-and-software/product-support/c6-01/how-to#> on May 11, 2011, 3 pages.
"Blackberry office tools: Qwerty Convert", Retrieved from: <http://blackberrysoftwarelist.net/blackberry/download-software/blackberry-office/qwerty_convert.aspx> on Nov. 20, 2008, 1 page.
"Bluetooth 360 Rotating Removable Keyboard Case Cover Stand for iPad 2 3 4", Retrieved From: <http://www.ebay.com/itm/Bluetooth-360-Rotating-Removable-Keyboard-Case-Cover-Stand-for-iPad-2-3-4-/200999748037> Mar. 31, 2014, Mar. 19, 2014, 3 Pages.
"Calc4M", Retrieved from: <http://www.hellebo.com/Calc4M.html> on Dec. 11, 2008, Sep. 10, 2008, 4 Pages.
"Class ScrollView", Retrieved from: <http://www.blackberry.com/developers/docs/6.0.0api/net/rim/device/api/ui/ScrollView.html> on Sep. 28, 2010, 13 pages.
"Content-Centric E-Mail Message Analysis in Litigation Document Reviews", Retrieved from: <http://www.busmanagement.com/article/Issue-14/Data-Management/Content-Centric-E-Mail-Message-Analysis-in-Litigation-Document-Reviews/> on May 6, 2009, 2009, 5 Pages.
"Daphne v1.47", retrieved from <http://www.drk.com.ar/daphne.php> on Nov. 18, 2011, 3 pages.
"Dial a number", Retrieved from: <http://www.phonespell.org/ialhelp.html> on Nov. 20, 2008, 1 page.
"DuoSense™ Multi-Touch Gestures", Retrieved from: <http://www.n-trig.com/Data/Uploads/Misc/DuoSenseMTG_final.pdf>, Jul. 2008, 4 pages.
"Elecont Quick Desktop 1.0.43", Retrieved from: <http://handheld.softpedia.com/get/System-Utilities/Launcher-Applications/Elecont-Quick-Desktop-72131.shtml> on May 5, 2009., Mar. 13, 2009, 2 pages.
"Email Notification for Microsoft Outlook and Outlook Express", Retrieved from:<http://www.contextmagic.com/express-notification/> on Sep. 29, 2010, Jul. 21, 2004, 3 pages.
"Enhanced IBM Power Systems Software and PowerVM Restructuring", IBM United States Announcement 208-082, dated Apr. 8, 2008, available at <http://www.ibm.com/common/ssi/rep_ca/2/897/ENUS208-082/ENUS208082.PDF>,Apr. 8, 2008, pp. 1-19.
"Exclusive: Windows Mobile 7 to Focus on Touch and Motion Gestures", Retrieved from: <http://anti-linux.blogspot.com/2008/08/exclusive-windows-mobile-7-to-focus-on.html> on May 6, 2009, Aug. 1, 2008, 14 pages.
"Extended European Search Report", EP Application No. 09818253.8, Apr. 10, 2012, 7 pages.
"Extended European Search Report", EP Application No. 09822736.6, Dec. 18, 2012, 7 pages.
"Extended European Search Report", EP Application No. 10762112.0, Aug. 2, 2013, 7 Pages.
"Extended European Search Report", EP Application No. 11866553.8, Dec. 9, 2014, 7 pages.
"Extended European Search Report", EP Application No. 11867033.0, Nov. 27, 2014, 8 pages.
"eXtreme Energy Conservation: Advanced Power-Saving Software for Wireless Devices", White Paper, Freescale Semiconductor, Inc., Document No. XTMENRGYCNSVWP, Rev #0, available at <http://www.freescale.com/files/32bit/doc/white_paper/XTMENRGYCNSVWP.pdf>,Feb. 2006, 15 pages.
"Final Office Action", U.S. Appl. No. 11/305,789, Apr. 1, 2009, 10 pages.
"Final Office Action", U.S. Appl. No. 11/502,264, Feb. 4, 2010, 15 pages.
"Final Office Action", U.S. Appl. No. 11/502,264, Mar. 29, 2013, 16 pages.
"Final Office Action", U.S. Appl. No. 11/502,264, Apr. 3, 2009, 9 pages.
"Final Office Action", U.S. Appl. No. 12/244,545, Dec. 7, 2011, 16 pages.
"Final Office Action", U.S. Appl. No. 12/244,545, Sep. 7, 2012, 23 pages.
"Final Office Action", U.S. Appl. No. 12/413,977, Nov. 17, 2011, 16 pages.
"Final Office Action", U.S. Appl. No. 12/414,382, Dec. 23, 2011, 7 pages.
"Final Office Action", U.S. Appl. No. 12/414,476, Apr. 8, 2013, 25 pages.
"Final Office Action", U.S. Appl. No. 12/414,476, Dec. 1, 2011, 20 pages.
"Final Office Action", U.S. Appl. No. 12/433,605, Jul. 17, 2013, 13 pages.

(56) References Cited

OTHER PUBLICATIONS

"Final Office Action", U.S. Appl. No. 12/433,605, Feb. 3, 2012, 11 pages.
"Final Office Action", U.S. Appl. No. 12/433,667, Jan. 7, 2013, 17 pages.
"Final Office Action", U.S. Appl. No. 12/433,667, Sep. 13, 2011, 17 pages.
"Final Office Action", U.S. Appl. No. 12/469,458, Feb. 1, 2013, 19 pages.
"Final Office Action", U.S. Appl. No. 12/469,458, Nov. 17, 2011, 15 pages.
"Final Office Action", U.S. Appl. No. 12/469,480, Apr. 10, 2013, 21 pages.
"Final Office Action", U.S. Appl. No. 12/469,480, Feb. 9, 2012, 17 pages.
"Final Office Action", U.S. Appl. No. 12/480,969, Nov. 23, 2012, 18 pages.
"Final Office Action", U.S. Appl. No. 12/480,969, Jul. 24, 2013, 19 pages.
"Final Office Action", U.S. Appl. No. 12/484,799, Apr. 30, 2012, 13 pages.
"Final Office Action", U.S. Appl. No. 12/560,081, Mar. 14, 2012, 16 pages.
"Final Office Action", U.S. Appl. No. 12/577,400, Aug. 16, 2013, 25 pages.
"Final Office Action", U.S. Appl. No. 12/577,400, Sep. 14, 2012, 26 pages.
"Final Office Action", U.S. Appl. No. 12/721,422, Mar. 7, 2013, 10 pages.
"Final Office Action", U.S. Appl. No. 12/972,967, Oct. 11, 2013, 21 pages.
"Final Office Action", U.S. Appl. No. 12/983,106, Oct. 7, 2013, 19 pages.
"Final Office Action", U.S. Appl. No. 13/073,300, Apr. 1, 2014, 14 pages.
"Final Office Action", U.S. Appl. No. 13/118,181, Dec. 20, 2013, 18 pages.
"Final Office Action", U.S. Appl. No. 13/118,204, Nov. 21, 2013, 24 pages.
"Final Office Action", U.S. Appl. No. 13/118,221, Mar. 17, 2014, 21 pages.
"Final Office Action", U.S. Appl. No. 13/118,292, Dec. 5, 2014, 30 pages.
"Final Office Action", U.S. Appl. No. 13/118,321, Dec. 19, 2013, 30 pages.
"Final Office Action", U.S. Appl. No. 13/118,333, Apr. 23, 2014, 22 pages.
"Final Office Action", U.S. Appl. No. 13/118,339, Aug. 22, 2013, 21 pages.
"Final Office Action", U.S. Appl. No. 13/118,347, Aug. 15, 2013, 25 pages.
"Final Office Action", U.S. Appl. No. 13/224,258, Sep. 11, 2013, 37 pages.
"Final Office Action", U.S. Appl. No. 13/229,693, Sep. 4, 2013, 23 pages.
"Final Office Action", U.S. Appl. No. 13/335,001, May 22, 2014, 19 pages.
"Final Office Action", U.S. Appl. No. 13/335,001, Oct. 21, 2014, 34 pages.
"Final Office Action", U.S. Appl. No. 13/335,001, Nov. 22, 2013, 18 pages.
"Final Office Action", U.S. Appl. No. 13/345,383, Jul. 30, 2013, 27 pages.
"Final Office Action", U.S. Appl. No. 13/655,386, Jun. 6, 2013, 34 pages.
"Final Office Action", U.S. Appl. No. 13/656,354, Jun. 17, 2013, 14 pages.
"Final Office Action", U.S. Appl. No. 13/656,574, Aug. 23, 2013, 20 pages.
"Final Office Action", U.S. Appl. No. 13/657,621, Sep. 10, 2013, 18 pages.
"Final Office Action", U.S. Appl. No. 13/657,646, May 6, 2013, 12 pages.
"Final Office Action", U.S. Appl. No. 13/657,789, Jun. 21, 2013, 35 pages.
"Final Office Action", U.S. Appl. No. 13/658,694, Oct. 30, 2013, 17 pages.
"Foreign Office Action", CN Application No. 200980142644.1, Aug. 20, 2013, 9 Pages.
"Foreign Office Action", CN Application No. 200980142661.5, Sep. 24, 2013, 8 Pages.
"Foreign Office Action", JP Application No. 2011-533353, Jul. 5, 2013, 9 Pages.
"Foreign Office Action", CL Application No. 2379-2011, Jul. 3, 2013, 8 pages.
"Foreign Office Action", CN Application No. 200980139831.4, Jul. 1, 2013, 12 pages.
"Foreign Office Action", CN Application No. 200980142632.9, Jun. 14, 2013, 6 pages.
"Foreign Office Action", CN Application No. 200980142632.9, Jan. 29, 2013, 11 pages.
"Foreign Office Action", CN Application No. 200980142644.1, Apr. 3, 2013, 10 pages.
"Foreign Office Action", CN Application No. 200980142661.5, Jan. 21, 2013, 12 pages.
"Foreign Office Action", CN Application No. 201080015728.1, May 16, 2013, 10 pages.
"Foreign Office Action", CN Application No. 201080015728.1, Dec. 26, 2012, 9 pages.
"Foreign Office Action", CN Application No. 201080015788.3, Jun. 5, 2013, 12 Pages.
"Foreign Office Action", CN Application No. 201080015788.3, Dec. 24, 2012, 10 pages.
"Foreign Office Action", CN Application No. 201080023212.1, Dec. 5, 2012, 10 pages.
"Foreign Office Action", CN Application No. 201080023212.1, Jun. 5, 2013, 8 pages.
"Foreign Office Action", CN Application No. 201080045865.X, Dec. 4, 2012, 10 pages.
"Foreign Office Action", CN Application No. 201080045865.X, Jun. 4, 2013, 10 pages.
"Foreign Office Action", CN Application No. 201110429183.5, Jan. 6, 2014, 10 Pages.
"Foreign Office Action", CN Application No. 201110437542.1, Jan. 6, 2014, 10 Pages.
"Foreign Office Action", CN Application No. 201110437572.2, Dec. 3, 2013, 7 pages.
"Foreign Office Action", CN Application No. 201110454251.3, Dec. 27, 2013, 12 Pages.
"Foreign Office Action", EP Application No. 10823883.3, Aug. 10, 2012, 5 pages.
"Foreign Office Action", JP Application No. 2012-503523, Apr. 22, 2013, 5 Pages.
"Freeware.mobi", Retrieved from: <http://www.palmfreeware.mobi/download-palette.html> on Nov. 6, 2008, Oct. 9, 2001, 2 pages.
"GnomeCanvas", Retrieved from: <http://library.gnome.org/devel/libgnomecanvas/unstable/GnomeCanvas.html> on Sep. 28, 2010, 11 pages.
"Google Apps versus Office 365: Audit Logs", Retrieved From: <http://www.linkgard.com/blog/google-apps/google-apps-vs-office-365-audit-logs.html> Mar. 29, 2014, Jul. 23, 2013, 8 pages.
"Heatmap", Retrieved From: <https://supportgoogle.com/drive/answer/91599?hl=en> Mar. 29, 2014, 2 Pages.
"How Do I Cancel a "Drag" Motion on an Android Seekbar?", retrieved from <http://stackoverflow.com/questions/2917969/how-do-i-cancel-a-drag-motion-on-an-android-seekbar> on Jun. 20, 2011, May 28, 2010, 1 page.
"How do I use Categories with my Weblog?", Retrieved from: <http://tpsupport.mtcs.sixapart.com/tp/us-tp1/how_do_i_use_categories_with_my_weblog.html> on Sep. 28, 2010, Sep. 16, 2009, 3 pages.

(56) References Cited

OTHER PUBLICATIONS

"How do you dial 1-800-FLOWERS", Retrieved from: <http://blogs.msdn.com/windowsmobile/archive/2007/02/06/how-do-you-dial-1-800-flowers.aspx> on Nov. 20, 2008, Feb. 6, 2007, 24 pages.
"How-to Close an Application in BlackBerry PlayBook?", retrieved from <http://stackoverflow.com/questions/5277027/how-to-close-an-application-in-blackberry-playbook> on Nov. 18, 2011, 2 pages.
"HTC Shows HTC Snap with Snappy Email Feature", Retrieved from: <http://www.wirelessandmobilenews.com/smartphones/ on May 5, 2009>, May 4, 2009, 10 Pages.
"IntelliScreen—New iPhone App Shows Today Screen Type Info in Lock Screen", Retrieved from: <http://justanotheriphoneblog.com/wordpress//2008/05/13/intelliscreen-new-iphone-app-shows-today-screen-type-info-on-lock-screen/> on Nov. 12, 2008, May 13, 2008, 11 pages.
"International Search Report and Written Opinion", Application No. PCT/US2010/028555, Oct. 12, 2010, 10 pages.
"International Search Report and Written Opinion", Application No. PCT/US2010/028699, Oct. 4, 2010, 10 pages.
"International Search Report and Written Opinion", Application No. PCT/US2013/059563, Nov. 7, 2013, 10 pages.
"International Search Report and Written Opinion", Application No. PCT/US2011/067075, Dec. 12, 2012, 10 pages.
"International Search Report and Written Opinion", Application No. PCT/US2009/061864, May 14, 2010, 10 pages.
"International Search Report and Written Opinion", Application No. PCT/US2009/061382, May 26, 2010, 10 pages.
"International Search Report and Written Opinion", Application No. PCT/US2011/055725, Sep. 27, 2012, 10 pages.
"International Search Report and Written Opinion", Application No. PCT/US2009/061735, Jun. 7, 2010, 11 pages.
"International Search Report and Written Opinion", Application No. PCT/US2010/034772, Dec. 29, 2010, 12 pages.
"International Search Report and Written Opinion", Application No. PCT/CN2014/074793, Sep. 30, 2014, 15 pages.
"International Search Report and Written Opinion", Application No. PCT/US2012/047091, Dec. 27, 2012, 15 pages.
"International Search Report and Written Opinion", Application No. PCT/CN2014/075046, Oct. 28, 2014, 16 pages.
"International Search Report and Written Opinion", Application No. PCT/US2013/061066, Feb. 4, 2014, 17 pages.
"International Search Report and Written Opinion", Application No. PCT/US2010/038730, Jan. 19, 2011, 8 pages.
"International Search Report and Written Opinion", Application No. PCT/US2011/055513, Mar. 27, 2012, 8 pages.
"International Search Report and Written Opinion", Application No. PCT/US2010/052119, May 2, 2011, 8 pages.
"International Search Report and Written Opinion", Application No. PCT/US2011/055514, May 22, 2012, 8 pages.
"International Search Report and Written Opinion", Application No. PCT/US2011/055512, May 24, 2012, 8 pages.
"International Search Report and Written Opinion", Application No. PCT/US2011/055520, May 9, 2012, 8 pages.
"International Search Report and Written Opinion", Application No. PCT/US2011/055524, Jun. 1, 2012, 8 pages.
"International Search Report and Written Opinion", Application No. PCT/US2011/065702, Aug. 29, 2012, 8 pages.
"International Search Report and Written Opinion", Application No. PCT/US2011/055736, Sep. 17, 2012, 8 pages.
"International Search Report and Written Opinion", Application No. PCT/US2011/067073, Sep. 17, 2012, 8 pages.
"International Search Report and Written Opinion", Application No. PCT/US2011/055511, Apr. 24, 2012, 9 pages.
"International Search Report and Written Opinion", Application No. PCT/US2011/055523, May 10, 2012, 9 pages.
"International Search Report and Written Opinion", Application No. PCT/US2011/055521, May 15, 2012, 9 pages.
"International Search Report and Written Opinion", Application No. PCT/US2011/055522, May 15, 2012, 9 pages.
"International Search Report and Written Opinion", Application No. PCT/US2011/055496, Sep. 12, 2012, 9 pages.
"International Search Report and Written Opinion", Application No. PCT/US2011/055712, Sep. 21, 2012, 9 pages.
"International Search Report and Written Opinion", Application No. PCT/US2011/055493, Sep. 26, 2012, 9 pages.
"International Search Report and Written Opinion", Application No. PCT/US2011/055478, Sep. 27, 2012, 9 pages.
"International Search Report and Written Opinion", Application No. PCT/US2011/055746, Sep. 27, 2012, 9 pages.
"International Search Report and Written Opinion", Application No. PCT/US2010/028553, Application Filing Date: Mar. 24, 2010, Nov. 9, 2010, 9 pages.
"Internet Explorer Window Restrictions", Retrieved from: http://technet.microsoft.com/en-us/library/cc759517(WS.10).aspx on Jun. 28, 2011, Microsoft TechNet, 5 pages.
"Introducing Application Styling for Windows Forms", Infragistics Software Manual, Version 7.3.20073.1043, Nov. 2007, 95 pages.
"Introduction to Windows Touch", Retrieved from: <http://download.microsoft.com/download/a/d/f/adf1347d-08dc-41a4-9084-623b1194d4b2/Win7_touch.docx>, Dec. 18, 2008, pp. 1-7.
"iPad User Guide", retrieved from <http://cyndidannerkuhn.info/CDK/iPads_Resources_files/iPad_User_Guide.pdf> on Jun. 17, 2011, 154 pages.
"iPod touch User Guide for iPhone OS 3.0 Software", Apple Inc., 2009, 153 pages.
"Keyboard (5)", Retrieved from: <http://landru.uwaterloo.ca/cgi-bin/man.cgi?section=5&topic=keyboard> on Dec. 11, 2008., Aug. 11, 1997, 8 Pages.
"Keyboard Case Adjustable 10inch Rotating Stand Bluetooth USB Apple Ipad 2 3", Retrieved From:<http://shopping.rediff.com/product/keyboard-case-adjustable-10inch-rotating-stand-bluetooth-usb-apple-ipad-2-3/11935954> Mar. 31, 2014, 2 Pages.
"Keyboard Shortcuts", Retrieved from: <http://www.pctoday.com/editorial/article.asp?article=articles%2F2005%2Ft0311%2F26t11%2F26t11.asp> on Aug. 3, 2009., Nov. 2005, 5 pages.
"KeyFolio Pro™ for iPad Air", Retrieved From:<http://www.kensington.com/kensington/us/us/s/3478/keyfolio-pro%E2%084%A2-for-ipad-air.aspx#.UxYF5P1dV8F> Feb. 26, 2014, Dec. 15, 2013, 2 Pages.
"Kiosk Browser Chrome Customization Firefox 2.x", Retrieved from: <http://stlouis-shopper.com/cgi-bin/mozdev-wiki/.pl?ChromeCustomization> on Oct. 22, 2008 Making a new chrome for the kiosk browser, Kiosk Project Kiosk Browser Chrome Customization Firefox-2.x,Aug. 16, 2007, 2 pages.
"Live Photo Gallery—Getting Started—from Camera to Panorama", Retrieved from: <http://webdotwiz.spaces.live.com/blog/cns!2782760752B93233!1729.entry> on May 5, 2009., Sep. 2008, 7 Pages.
"Logitech Ultrathin Keyboard Folio for iPad Air", Retrieved From: <http://store.apple.com/us/product/HE900VC/A/logitech-ultrathin-keyboard-folio-for-ipad-air> Mar. 28, 2014, 2013, 4 Pages.
"Magic mouse", Retrieved from: <http://www.apple.com/magicmouse/> on May 10, 2011, 3 pages.
"Meet ClamCase Pro", Retrieved From: <http://clamcase.com/bluetooth-ipad-keyboard-case.html?PID=6146810> Mar. 28, 2014, 6 Pages.
"MIDTB Tip Sheet: Book Courier", Retrieved from: <http://www.midtb.org/tipsbookcourier.htm> on Dec. 11, 2008., Sep. 26, 2005, 6 Pages.
"Mobile/UI/Designs/TouchScreen/workingUI", Retrieved from: <https://wiki.mozilla.org/Mobile/UI/Designs/TouchScreen/workingUI> on Oct. 26, 2009, 2009, 30 pages.
"moGo beta v.0.4", Retrieved from: <http://forum.xda-developers.com/showthread.php?t=375196> on Sep. 27, 2010, Mar. 7, 2008, 10 pages.
"Multi-touch", Retrieved from <http://en.wikipedia.org/wiki/Multi-touch#Microsoft_Surface> on Apr. 24, 2009, Apr. 17, 2009, 8 pages.
"My Favorite Gadgets, System Monitor II", Retrieved from <http://www.myfavoritegadgets.info/monitors/SystemMonitorII/system-monitorII.html> on Mar. 12, 2013, Jun. 8, 2010, 5 pages.

(56) References Cited

OTHER PUBLICATIONS

"New Features in WhatsUp Gold v12.0", retrieved from <http://www.netbright.co.th/?name=product&file=readproduct&id=12> on Jun. 10, 2011, 4 pages.
"Nokia E61 Tips and Tricks for Keyboard Shortcuts", Retrieved from: <http://www.mobiletopsoft.com/board/1810/nokia-e61-tips-and-tricks-for-keyboard-shortcuts.html> on Dec. 17, 2008., Jan. 27, 2006, 2 Pages.
"Non-Final Office Action", U.S. Appl. No. 13/228,707, Oct. 25, 2013, 12 pages.
"Non-Final Office Action", U.S. Appl. No. 13/228,888, Feb. 10, 2014, 21 pages.
"Non-Final Office Action", U.S. Appl. No. 11/215,052, Jun. 23, 2011, 17 pages.
"Non-Final Office Action", U.S. Appl. No. 11/305,789, Sep. 21, 2009, 5 pages.
"Non-Final Office Action", U.S. Appl. No. 11/502,264, Sep. 30, 2009, 15 pages.
"Non-Final Office Action", U.S. Appl. No. 11/502,264, Sep. 14, 2012, 14 pages.
"Non-Final Office Action", U.S. Appl. No. 12/244,545, Mar. 27, 2012, 18 pages.
"Non-Final Office Action", U.S. Appl. No. 12/244,545, Aug. 17, 2011, 15 pages.
"Non-Final Office Action", U.S. Appl. No. 12/413,977, Jul. 19, 2011, 17 pages.
"Non-Final Office Action", U.S. Appl. No. 12/413,977, Jul. 20, 2012, 18 pages.
"Non-Final Office Action", U.S. Appl. No. 12/414,382, Jul. 26, 2011, 9 pages.
"Non-Final Office Action", U.S. Appl. No. 12/414,434, Jan. 17, 2012, 7 pages.
"Non-Final Office Action", U.S. Appl. No. 12/414,434, May 31, 2012, 7 pages.
"Non-Final Office Action", U.S. Appl. No. 12/414,434, Aug. 2, 2011, 6 pages.
"Non-Final Office Action", U.S. Appl. No. 12/414,455, Aug. 29, 2011, 8 pages.
"Non-Final Office Action", U.S. Appl. No. 12/414,458, Jul. 6, 2011, 8 pages.
"Non-Final Office Action", U.S. Appl. No. 12/414,476, Nov. 9, 2012, 22 pages.
"Non-Final Office Action", U.S. Appl. No. 12/414,476, Aug. 3, 2011, 21 pages.
"Non-Final Office Action", U.S. Appl. No. 12/433,605, Jan. 11, 2013, 7 pages.
"Non-Final Office Action", U.S. Appl. No. 12/433,605, Jun. 24, 2011, 10 pages.
"Non-Final Office Action", U.S. Appl. No. 12/433,667, Jun. 7, 2011, 15 pages.
"Non-Final Office Action", U.S. Appl. No. 12/433,667, Feb. 3, 2012, 16 pages.
"Non-Final Office Action", U.S. Appl. No. 12/469,419, Nov. 9, 2011, 15 pages.
"Non-Final Office Action", U.S. Appl. No. 12/469,419, May 23, 2012, 13 pages.
"Non-Final Office Action", U.S. Appl. No. 12/469,458, May 3, 2013, 21 pages.
"Non-Final Office Action", U.S. Appl. No. 12/469,458, Jul. 1, 2011, 15 pages.
"Non-Final Office Action", U.S. Appl. No. 12/469,458, Sep. 21, 2012, 14 pages.
"Non-Final Office Action", U.S. Appl. No. 12/469,480, Aug. 27, 2013, 22 pages.
"Non-Final Office Action", U.S. Appl. No. 12/469,480, Oct. 17, 2012, 16 pages.
"Non-Final Office Action", U.S. Appl. No. 12/469,480, Sep. 22, 2011, 14 pages.
"Non-Final Office Action", U.S. Appl. No. 12/470,558, Nov. 22, 2011, 9 pages.
"Non-Final Office Action", U.S. Appl. No. 12/480,969, Apr. 4, 2013, 22 pages.
"Non-Final Office Action", U.S. Appl. No. 12/480,969, Aug. 7, 2012, 15 pages.
"Non-Final Office Action", U.S. Appl. No. 12/484,799, Aug. 11, 2011, 12 pages.
"Non-Final Office Action", U.S. Appl. No. 12/484,799, Aug. 7, 2012, 13 pages.
"Non-Final Office Action", U.S. Appl. No. 12/484,845, Dec. 7, 2011, 16 pages.
"Non-Final Office Action", U.S. Appl. No. 12/560,081, Dec. 7, 2011, 16 pages.
"Non-Final Office Action", U.S. Appl. No. 12/577,400, Apr. 15, 2013, 25 pages.
"Non-Final Office Action", U.S. Appl. No. 12/577,400, Apr. 11, 2012, 22 pages.
"Non-Final Office Action", U.S. Appl. No. 12/721,422, Oct. 1, 2012, 7 pages.
"Non-Final Office Action", U.S. Appl. No. 12/972,967, Jan. 30, 2013, 19 pages.
"Non-Final Office Action", U.S. Appl. No. 12/977,584, Dec. 7, 2012, 8 pages.
"Non-Final Office Action", U.S. Appl. No. 12/978,184, Jan. 23, 2013, 7 pages.
"Non-Final Office Action", U.S. Appl. No. 12/983,106, Nov. 9, 2012, 17 pages.
"Non-Final Office Action", U.S. Appl. No. 13/073,300, Jul. 25, 2013, 13 pages.
"Non-Final Office Action", U.S. Appl. No. 13/118,181, Mar. 4, 2013, 22 pages.
"Non-Final Office Action", U.S. Appl. No. 13/118,204, Feb. 28, 2013, 13 pages.
"Non-Final Office Action", U.S. Appl. No. 13/118,221, Mar. 1, 2013, 22 pages.
"Non-Final Office Action", U.S. Appl. No. 13/118,257, Mar. 5, 2013, 19 pages.
"Non-Final Office Action", U.S. Appl. No. 13/118,292, Jun. 6, 2014, 25 pages.
"Non-Final Office Action", U.S. Appl. No. 13/118,302, Mar. 4, 2014, 10 pages.
"Non-Final Office Action", U.S. Appl. No. 13/118,314, Feb. 27, 2014, 13 pages.
"Non-Final Office Action", U.S. Appl. No. 13/118,321, Jun. 10, 2013, 32 pages.
"Non-Final Office Action", U.S. Appl. No. 13/118,333, Jul. 5, 2013, 18 pages.
"Non-Final Office Action", U.S. Appl. No. 13/118,339, Feb. 11, 2013, 15 pages.
"Non-Final Office Action", U.S. Appl. No. 13/118,347, Feb. 12, 2013, 14 pages.
"Non-Final Office Action", U.S. Appl. No. 13/196,272, Feb. 6, 2013, 10 pages.
"Non-Final Office Action", U.S. Appl. No. 13/196,272, Sep. 3, 2013, 5 pages.
"Non-Final Office Action", U.S. Appl. No. 13/224,258, Jan. 8, 2013, 35 pages.
"Non-Final Office Action", U.S. Appl. No. 13/228,876, Nov. 22, 2013, 14 pages.
"Non-Final Office Action", U.S. Appl. No. 13/228,931, Apr. 7, 2014, 21 pages.
"Non-Final Office Action", U.S. Appl. No. 13/228,945, Apr. 14, 2014, 22 pages.
"Non-Final Office Action", U.S. Appl. No. 13/229,155, Nov. 18, 2013, 14 pages.
"Non-Final Office Action", U.S. Appl. No. 13/229,556, Mar. 28, 2014, 12 pages.
"Non-Final Office Action", U.S. Appl. No. 13/229,693, Mar. 12, 2013, 21 pages.
"Non-Final Office Action", U.S. Appl. No. 13/229,709, Apr. 7, 2014, 12 pages.
"Non-Final Office Action", U.S. Appl. No. 13/335,001, Aug. 7, 2014, 20 pages.

(56) References Cited

OTHER PUBLICATIONS

"Non-Final Office Action", U.S. Appl. No. 13/335,001, Sep. 13, 2013, 15 pages.
"Non-Final Office Action", U.S. Appl. No. 13/335,001, Jan. 8, 2014, 17 pages.
"Non-Final Office Action", U.S. Appl. No. 13/345,383, Feb. 28, 2013, 25 pages.
"Non-Final Office Action", U.S. Appl. No. 13/492,495, Dec. 19, 2012, 6 pages.
"Non-Final Office Action", U.S. Appl. No. 13/492,495, Sep. 17, 2012, 8 pages.
"Non-Final Office Action", U.S. Appl. No. 13/655,386, Dec. 26, 2012, 23 pages.
"Non-Final Office Action", U.S. Appl. No. 13/655,390, Dec. 17, 2012, 12 pages.
"Non-Final Office Action", U.S. Appl. No. 13/656,354, Feb. 6, 2013, 10 pages.
"Non-Final Office Action", U.S. Appl. No. 13/656,574, Jan. 31, 2013, 21 pages.
"Non-Final Office Action", U.S. Appl. No. 13/656,639, Feb. 7, 2013, 29 pages.
"Non-Final Office Action", U.S. Appl. No. 13/657,621, Feb. 7, 2013, 19 pages.
"Non-Final Office Action", U.S. Appl. No. 13/657,646, Jan. 3, 2013, 13 pages.
"Non-Final Office Action", U.S. Appl. No. 13/657,789, Jan. 9, 2013, 38 pages.
"Non-Final Office Action", U.S. Appl. No. 13/658,694, Feb. 13, 2014, 19 pages.
"Non-Final Office Action", U.S. Appl. No. 13/658,694, Apr. 26, 2013, 13 pages.
"Non-Final Office Action", U.S. Appl. No. 14/089,149, Nov. 3, 2014, 8 pages.
"Normalizing Text: A Java Tutorial by Oracle", Retrieved from: <http://docs.oracle.com/javase/tutorial/i18n/text/normalizerapi.html> on Apr. 8, 2014, Nov. 11, 2006, 3 pages.
"Notice of Allowance", U.S. Appl. No. 11/215,052, Mar. 14, 2012, 5 pages.
"Notice of Allowance", U.S. Appl. No. 11/305,789, Nov. 23, 2009, 8 pages.
"Notice of Allowance", U.S. Appl. No. 12/414,382, Apr. 4, 2012, 4 pages.
"Notice of Allowance", U.S. Appl. No. 12/414,434, Aug. 17, 2012, 4 pages.
"Notice of Allowance", U.S. Appl. No. 12/414,455, Jan. 4, 2012, 4 pages.
"Notice of Allowance", U.S. Appl. No. 12/414,458, Oct. 31, 2011, 2 pages.
"Notice of Allowance", U.S. Appl. No. 12/414,458, Nov. 29, 2011, 2 pages.
"Notice of Allowance", U.S. Appl. No. 12/414,458, Aug. 10, 2011, 6 pages.
"Notice of Allowance", U.S. Appl. No. 12/433,667, Jun. 25, 2013, 14 pages.
"Notice of Allowance", U.S. Appl. No. 12/469,419, Nov. 27, 2012, 13 pages.
"Notice of Allowance", U.S. Appl. No. 12/470,558, Apr. 2, 2012, 7 pages.
"Notice of Allowance", U.S. Appl. No. 12/470,558, Aug. 23, 2012, 2 pages.
"Notice of Allowance", U.S. Appl. No. 12/484,799, Oct. 22, 2012, 10 pages.
"Notice of Allowance", U.S. Appl. No. 12/484,845, Mar. 16, 2012, 5 pages.
"Notice of Allowance", U.S. Appl. No. 12/721,422, Jul. 11, 2013, 9 pages.
"Notice of Allowance", U.S. Appl. No. 12/977,584, Jun. 19, 2013, 5 pages.
"Notice of Allowance", U.S. Appl. No. 12/978,184, Nov. 6, 2013, 5 pages.
"Notice of Allowance", U.S. Appl. No. 12/978,184, Aug. 2, 2013, 5 pages.
"Notice of Allowance", U.S. Appl. No. 13/196,272, Nov. 8, 2013, 8 pages.
"Notice of Allowance", U.S. Appl. No. 13/492,495, Apr. 26, 2013, 5 pages.
"Notice of Allowance", U.S. Appl. No. 13/655,386, Apr. 25, 2014, 6 pages.
"Notice of Allowance", U.S. Appl. No. 13/655,390, May 24, 2013, 5 pages.
"Notice of Allowance", U.S. Appl. No. 13/656,639, Aug. 19, 2013, 14 pages.
"Notice of Allowance", U.S. Appl. No. 14/089,149, Dec. 5, 2014, 4 pages.
"Notifications", retrieved from <http://msdn.microsoft.com/enus/library/aa511497.aspx> on May 10, 2011, 16 pages.
"OmneMon™ System Resource Metrics", retrieved from <http://www.omnesys.com/documents/OmneMonSRM_Brochure.pdf> on Jun. 10, 2011, 3 pages.
"ONYX Graphics Announces New ONYX Prepedge Job Preparation Software", retrieved from <http://www.largeformatreview.com/rip-software/433-onyx-graphics-announces-new-onyx-> on May 10, 2011, 2 pages.
"Oracle Mobile Sales Assistant User Guide for BlackBerry", Retrieved from <http://download.oracle.com/docs/cd/E12547_01/books/PDF/MobileSalesAsstBB.pdf.>, Nov. 2008, 20 pages.
"Oracle8i Application Developer's Guide—Advanced Queuing Release 2 (8.1.6)", Retrieved from: http://www.cs.otago.ac.nz/oradocs/appdev.817/a76938/adq01in5.htm on May 6, 2009., Dec. 1999, 8 pages.
"Oracle8i Application Developer's Guide—Advanced Queuing", Retrieved from: http://www.cs.umbc.edu/help/oracle8/server.815/a68005/03_adq1i.htm on May 6, 2009., Feb. 1999, 29 Pages.
"Oracle8i Concepts Release 8.1.5", Retrieved from: http://www.cs.umbc.edu/help/oracle8/server.815/a67781/c16queue.htm on May 6, 2009., Feb. 1999, 10 Pages.
"Palette Extender 1.0.2", Retrieved from: <http://palette-extender.en.softonic.com/symbian> on Nov. 6, 2008, Jan. 21, 2003, 2 pages.
"Parallax Scrolling", Retrieved from: <http://en.wikipedia.org/wiki/Parallax_scrolling> on May 5, 2009., May 4, 2009, 3 Pages.
"Purple Swivel Rotating Stand Case Cover Wireless Bluetooth Keyboard for iPad Air", Retrieved From: <http://www.ebay.com/itm/Purple-Swivel-Rotating-Stand-Case-Cover-Wireless-Bluetooth-Keyboard-for-iPad-Air-/400686726944> Mar. 31, 2014, Mar. 2014, 9 Pages.
"Push Notifications Overview for Windows Phone", Retrieved from: <http://msdn.microsoft.com/en-us/library/ff402558%28VS.92%29.aspx> on Sep. 30, 2010, Sep. 3, 2010, 1 page.
"QNX Photon microGUI Windowing System", Retrieved from: <http://www.qnx.com/developers/docs/6.5.0/index.jsp?topic=%2Fcom.qnx.doc.photon_prog_guide%2Fdragndrop.html> on Apr. 6, 2014, 22 pages.
"QODE Ultimate Keyboard Case for iPad (4th & 3rd gen) and iPad 2", Available at: <http://www.belkin.com/us/p/P-F5L149/>, Mar. 28, 2013, 8 pages.
"Remapping the Keyboard", Retrieved from: <http://publib.boulder.ibm.com/infocenter/hodhelp/v9r0/index.jsp?topic=/com.ibm.hod9.doc/help/assignkey.html> on Dec. 11, 2008., Jul. 15, 2005, 5 Pages.
"Restriction Requirement", U.S. Appl. No. 13/118,265, Feb. 27, 2014, 7 pages.
"Restriction Requirement", U.S. Appl. No. 13/118,288, Mar. 4, 2014, 7 pages.
"Restriction Requirement", U.S. Appl. No. 13/658,694, Feb. 6, 2013, 6 pages.
"SecureMe-Anti-Theft Security Application for S60 3rd", Retrieved from: <http:/www.killermobile.com/newsite/mobile-software/s60-applications/secureme-%11-anti%11theft-security-application-for-s60-3rd.htm> on Jun. 28, 2011, Dec. 15, 2008, 3 pages.
"Snap", Windows 7 Features—retrieved from <http://windows.microsoft.com/en-US/windows7/products/features/snap> on Sep. 23, 2011, 2 pages.

(56) References Cited

OTHER PUBLICATIONS

"Supplemental Notice of Allowance", U.S. Appl. No. 12/433,667, Aug. 1, 2013, 2 pages.
"Supplemental Notice of Allowance", U.S. Appl. No. 12/977,584, Sep. 16, 2013, 2 pages.
"Supplemental Notice of Allowance", U.S. Appl. No. 12/977,584, Oct. 11, 2013, 2 pages.
"Supplemental Notice of Allowance", U.S. Appl. No. 12/978,184, Feb. 25, 2014, 2 pages.
"Supplemental Notice of Allowance", U.S. Appl. No. 13/655,390, Sep. 19, 2013, 2 pages.
"Supplemental Notice of Allowance", U.S. Appl. No. 13/655,390, Jul. 25, 2013, 2 pages.
"Supplementary European Search Report", European Patent Application No. 10823883.3, Jul. 31, 2012, 3 pages.
"Switch between Windows of the Same App", Retrieved from <http://www.ntwind.com/software/vistaswitcher/instance-switcher.html> on Feb. 20, 2013, May 12, 2012, 2 pages.
"Symbian Applications", Retrieved from: <http://symbianfullversion.blogspot.com/2008_12_01_archive.html> on May 5, 2009., Jan. 2009, 51 Pages.
"TaskOS", AppBrain retrieved from <http://www.appbrain.com/app/taskos/com.profete162.TaskOS> on 11/18/211, 2 pages.
"The Map Screen", retrieved from <http://www.symbianos.org/whereamiusersguide> on Jun. 17, 2011, 3 pages.
"The Start Menu (overview)", retrieved from <http://web.archive.org/web/20101219151141/http://www.windows.microsoft.com/en-US/windows-vista/The-Start-menu-overview> on Feb. 12, 2013, Dec. 19, 2010, 5 pages.
"ThumbJot", Retrieved form <http://thumbjot.com/wp/?page_id=8>, 2008, 2 pages.
"Tiles and Notifications for Windows Phone", Retrieved From: <http://msdn.microsoft.com/en-us/library/windowsphone/develop/jj662933.aspx> Apr. 1, 2014, Mar. 11, 2014, 2 Pages.
"Top 3 Task Switchers for Android", TechCredo—retrieved from <http://www.techcredo.com/android/top-3-task-switchers-for-android> on May 11, 2011, Mar. 9, 2011, 5 pages.
"Top Android App: Swipepad", Best Android Apps Review—retrieved from <http://www.bestandroidappsreview.com/2011/01/top-android-app-swipepad-launcher.html> on May 11, 2011, 4 pages.
"Touch Shell Free", Retrieved from: <http://www.pocketpcfreeware.mobi/download-touch-shell-free.html> on May 5, 2009., Feb. 23, 2009, 2 Pages.
"User Guide", retrieved from <http://wireframesketcher.com/help/help.html> on Jun. 17, 2011, 19 pages.
"What's new in Excel 2013", Retrieved From: <http://office.microsoft.com/en-in/excel-help/what-s-new-in-excel-2013-HA102809308.aspx> Mar. 28, 2014, Oct. 30, 2012, 5 Pages.
"Windows 8 Is Gorgeous, But Is It More Than Just a Shell? (Video)", retrieved from <http://techcrunch.com/2011/06/02/windows-8-gorgeous-shell-video/> on Jun. 20, 2011, Jun. 2, 2011, 6 pages.
"Windows Phone 7 (Push Notification)", retrieved from <http://unknownerror.net/2011-06/windows-phone-7-push-notification-36520> on Jul. 6, 2011, 4 pages.
"Windows Phone 7 Live Tiles", Retrieved from: <http://www.knowyourmobile.com/microsoft/windowsphone7/startscreen/640737/windows_phone_7_live_tiles.html> on May 11, 2011, Oct. 20, 2010, 3 pages.
"Winterface Review", Retrieved from: <http://www.mytodayscreen.com/winterface-review/> on Nov. 12, 2008, Jul. 9, 2008, 42 pages.
"Womma", Retrieved from: <http://www.womma.org/blog/links/wom-trends/> on May 5, 2009., 2007, 70 Pages.
"Working with Multiple Windows", MSOFFICE tutorial! retrieved from <http://www.msoffice-tutorial.com/working-with-multiple-windows.php> on Sep. 23, 2011, 3 pages.
"You've Got Mail 1.4 Build", retrieved from <http://www.fileshome.com/Shows_Animation_Plays_Sound_Automatic_N . . . > on Jan. 6, 2010, Jun. 18, 2007, 2 pages.
"YUI 3: ScrollView [beta]", Retrieved from: <http://developer.yahoo.com/yui/3/scrollview/> on Sep. 28, 2010, 5 pages.
"ZAGGkeys PROfolio+ Keyboard", Retrieved From: <http://www.zagg.com/accessories/zaggkeys-ipad-profolio-plus-keyboard-case/7063?cj_aid=10539646&cj_pid=6146810&cj_sid=fwn62ieocicw#7063?cj_aid=10539646&cj_pid=6146810&cj_sid=fwn62ieocicw&_suid=13959948728450884140834287934> Mar. 31, 2014, 2013, 9 pages.
Aguilar, "How to Run Multiple Instances of the Same App in Mac OS X", Retrieved from <http://operating-systems.wonderhowto.com/how-to/run-multiple-instances-same-app-mac-os-x-0140144/> on Feb. 20, 2013, Jan. 1, 2013, 4 Pages.
Al "Droptiles—Metro Style Live Tiles Enabled Web 2.0 Dashboard", Retrieved from <http://oazabir.github.com/Droptiles/> on Mar. 5, 2013, Jul. 18, 2012, 7 pages.
Bates, "A Framework to Support Large-Scale Active Applications", University of Cambridge Computer Laboratory—Available at <http://citeseerx.ist.psu.edu/viewdoc/download?doi=10.1.1.48.1690&rep=rep1&type=pdf>, 1996, 8 pages.
Baweja, "OpenHeatMap: Create Heat Maps for Excel Spreadsheets With Geo Data", Retrieved From: <http://www.makeuseof.com/tag/openheatmap-create-heat-maps/> Mar. 29, 2014, Jul. 24, 2010, 4 Pages.
Beiber, et al., "Screen Coverage: A Pen-Interaction Problem for PDA's and Touch Screen Computers", in Proceedings of ICWMC 2007, Mar. 2007, 6 pages.
Bhatnagar, "Locate and Kill Annoying Processes in Windows", Trouble Fixers: All About Fixing Computer Troubles—retrieved from <http://www.troublefixers.com/locate-and-kill-annoying-processes-in-windows/> on Nov. 18, 2011, Apr. 19, 2010, 4 pages.
Bjork, et al., "Redefining the Focus and Context of Focus+Context Visualizations", in Proceedings of INFOVIS 2000—Available at <http://www.johan.redstrom.se/papers/redefining.pdf>, Oct. 2000, 9 pages.
Blankenburg, "31 Days of Mango | Day #11: Live Tiles", Retrieved from <http://www.jeffblankenburg.com/2011/11/11/31-days-of-mango-day-11-live-tiles/> on Mar. 5, 2013, Nov. 11, 2011, 10 pages.
Bolten, "A Slide-out Keyboard on an Android tablet. Genius or total madness?", Retrieved From: <http://www.techradar.com/reviews/pc-mac/tablets/asus-eee-pad-slider-1036296/review> Mar. 31, 2014, Oct. 25, 2011, 8 pages.
Bowes, et al., "Transparency for Item Highlighting", Faculty of Computing Science, Dalhousie University—Available at <http://torch.cs.dal.ca/~dearman/pubs/G12003-bowes,dearman,perkins-paper.pdf>, 2003, 2 pages.
Bruzzese, "Using Windows 7, Managing and Monitoring Windows 7—Chapter 11", Que Publishing, May 5, 2010, 33 pages.
Buring, "User Interaction with Scatterplots on Small Screens—A Comparative Evaluation of Geometric-Semantic Zoom and Fisheye Distortion", IEEE Transactions on Visualization and Computer Graphics, vol. 12, Issue 5, Available at <http://citeseerx.ist.psu.edu/viewdoc/download?doi=10.1.1.134.4568&rep=rep1&typ=pdf>, sep. 2006, pp. 829-836.
Carrera, et al., "Conserving Disk Energy in Network Servers", available at <http://citeseerx.ist.psu.edu/viewdoc/download-?doi=10.1.1.6.8301&rep=rep1&type=ps>, Nov. 2002, 15 pages.
Cawley, "How to Customize Your Windows Phone 7", Retrieved from: <http://www.brighthub.com/mobile/windows-mobile-platform/articles/95213.aspx> on May 10, 2011, Nov. 12, 2010, 3 pages.
Cawley, "Windows Phone 7 Customization Tips and Tricks", retrieved from <http://www.brighthub.com/mobile/windows-mobile-platform/articles/95213.aspx> on Jun. 20, 2011, May 16, 2011, 2 pages.
Cohen, et al.,"Automatic Strategies in the Siemens RTL Tiled Window Manager", In Proceedings: The 2nd IEEE Conference on Computer Workstations, Mar. 7, 1988, pp. 111-119.

(56) References Cited

OTHER PUBLICATIONS

Cohen, et al., "Wang Tiles for Image and Texture Generation", In Proceedings of SIGGRAPH 2003—Available <http://research.microsoft.com/en-us/um/people/cohen/WangFinal.pdf>, 2003, 8 pages.

Crouch, "Smartphone Wars: Micron's Slide-to-Unlock Patent", Jan. 30, 2013, 2 pages.

Damien, "7 Ways to Supercharge Multitasking in Android", retrieved from <http://maketecheasier.com/7-ways-to-supercharge-multitasking-in-android/2011/01/22/> on May 11, 2011, Jan. 22, 2011, 5 pages.

Danish, "Win7sé Brings Mac-Like Screen Corners to Windows 7 & Windows 8", retrieved from <http://technomondo.com/2011/11/13/win7se-brings-mac-like-screen-corners-to-windows-7-windows8/> on Nov. 23, 2011, Nov. 13, 2011, 4 pages.

Davis, "A WPF Custom Control for Zooming and Panning", Retrieved from: <http://www.codeproject.com/KB/WPF/zoomandpancontrol.aspx> on Sep. 28, 2010, Jun. 29, 2010, 21 pages.

Delimarsky, "Sending Tile Push Notifications on Windows Phone 7", retrieved from <http://mobile.dzone.com/articles/sending-tile-push> on May 10, 2011, Aug. 25, 2010, 2 pages.

Denoue, et al., "WebNC: Efficient Sharing of Web Applications", In Proceedings of WWW 2009—Available at <http://www.fxpal.com/publications/FXPAL-PR-09-495.pdf>, 2009, 2 pages.

Dixon, "Living in the Online Cloud: the T-Mobile G1 / Google Android Smartphone", Retrieved from <http://www.manifest-tech.com/media_pda/t-mobile_g1_android.htm>, Dec. 2008, 3 pages.

Dolcourt, "Webware", Retrieved from: <http://news.cnet.com/webware/?categoryId=2010> on May 5, 2009., 13 Pages.

Dunsmuir, "Selective Semantic Zoom of a Document Collection", Available at <http://www.cs.ubc.cahtmm/courses/533/projects/dustin/proposal.pdf>, Oct. 30, 2009, pp. 1-9.

Egan, "Modifying Live Tiles in a Background Process", Retrieved from <http://thesociablegeek.com/windows-8/livetiles/modifying-live-tiles-in-a-background-process/> on Mar. 5, 2013, Aug. 31, 2012, 24 pages.

Farrugia, et al., "Cell Phone Mini Challenge: Node-Link Animation Award Animating Multivariate Dynamic Social Networks", IEEE Symposium on Visual Analytics Science and Technology, Columbus, OH, USA, Oct. 21-23, 2008, Oct. 21, 2008, 2 pages.

Fisher, "Cool Discussion of Push Notifications—Toast and Tile—on Windows Phone", Retrieved from: <http://www.windowsphoneexpert.com/Connection/forums/p/4153/18399.aspx> on Sep. 29, 2010, May 3, 2010, 3 pages.

Friedlaender, "Better Way to Delete and Close Apps from Task Manager", retrieved from <http://www.ideasproject.com/ideas/14475> on Nov. 21, 2011, Nov. 15, 2011, 2 pages.

Gade, "Samsung Alias u740", Retrieved from: <http://www.mobiletechreview.com/phones/Samsung-U740.htm> on Nov. 20, 2008, Mar. 14, 2007, 6 pages.

Gao, "A General Logging Service for Symbian based Mobile Phones", Retrieved from: <http://www.nada.kth.se/utbildning/grukth/exjobb/rapportlistor/2007/rapporter07/gao_rui_07132.pdf.> on Jul. 17, 2008, Feb. 2007, pp. 1-42.

Gralla, "Windows XP Hacks, Chapter 13—Hardware Hacks", O'Reilly Publishing, Feb. 23, 2005, 25 pages.

Greenberg, "Review: SHARKK Apple iPad Air Wireless Bluetooth Keyboard Case", Retrieved From: <http://www.runaroundtech.com/2014/01/25/review-sharkk-apple-ipad-air-wireless-bluetooth-keyboard-case/> Mar. 31, 2014, Jan. 25, 2014, 6 Pages.

Ha, et al., "SIMKEYS: An Efficient Keypad Configuration for Mobile Communications", Retrieved from: < http://ieeexplore.ieee.org/stamp/stamp.jsp?arnumber=01362557.> on Dec. 17, 2008, Nov. 2004, 7 Pages.

Hahn, "Freedom Case, the Adjustable Stand and Protective Case for Microsoft Surface Tablets with Patent-Pending Folding Design, Launches Pre-Orders on Kickstarter", Retrieved From: <http://www.prweb.com/releases/2014/02/prweb11583725.htm> Mar. 3, 2014, Feb. 8, 2014, 4 Pages.

Harrison, "Symbian OS C++ for Mobile Phones Volume 3", Retrieved from: <http://www.amazon.co.uk/Symbian-OS-Mobile-Phones-Press/dp/productdescription/0470066415> on Oct. 23, 2008, Symbian Press,Jun. 16, 2003, 4 pages.

Hickey, "Google Android has Landed; T-Mobile, HTC Unveil G1", Retrieved from: <http://www.crn.com/retail/210603348> on Nov. 26, 2008., Sep. 23, 2008, 4 pages.

Horowitz, "Installing and Tweaking Process Explorer part 2", Retrieved from <http://web.archive.org/web/20110510093838/http://blogs.computerworld.com/16165/installing_and_tweaking_process_explorer_part_2> on Mar. 12, 2013, May 23, 2010, 7 pages.

Janecek, et al., "An Evaluation of Semantic Fisheye Views for Opportunistic Search in an Annotated Image Collection", Available at <http://citeseerx.ist.psu.edu/viewdoc/download?doi=10.1.1.67.3084&rep=rep1&type=pdf >, Feb. 15, 2005, pp. 1-15.

Kandogan, et al., "Elastic Windows: Improved Spatial Layout and Rapid Multiple Window Operations", In Proceedings of the Workshop on Advanced Visual Interfaces, May 27, 1996, 10 Pages.

Kcholi, "Windows ce .net Interprocess Communication", Retrieved from http://msdn.microsoft.com/en-us/library/ms836784.aspx on Jul. 17, 2008., Jan. 2004, 15 Pages.

Keranen, "OpenGL-based User Interface Toolkit for Symbian Mobile Devices", Master of Science Thesis, Tamere University of Technology, Department of Information Technology, Apr. 6, 2005, 88 pages.

Kurdi, "Acer GridVista: snap your windows to pre-defined sections on your screen(s)", Retrieved from <http://www.freewaregenius.com/acer-gridvista-snap-your-windows-to-pre-defined-sections-of-your-screens/> on Jun. 30, 2013, Jan. 19, 2010, 6 pages.

Kurdi, "WinSplit Revolution", Retrieved from <http://www.freewaregenius.com/winsplit-revolution/> on Jun. 30, 2013, Aug. 22, 2007, 4 Pages.

La, "Parallax Gallery", Available at <http://webdesignerwall.comtutorials/parallax-gallery/comment-page-1>, Apr. 25, 2008, 16 pages.

Livingston, et al., "Windows 95 Secrets", 1995, I DG Books Worldwide, 3rd Edition, 1995, pp. 121-127.

Long, "Gmail Manager 0.6", Retrieved from: <https://addons.mozilla.org/en-US/firefox/addon/1320/> on Sep. 29, 2010, Jan. 27, 2010, 4 pages.

Mann, et al., "Spectrum Analysis of Motion Parallax in a 3D Cluttered Scene and Application to Egomotion", Journal of the Optical Society of America A, vol. 22, No. 9—Available at <http://www.cs.uwaterloo.ca/~mannr/snow/josa-mann-langer.pdf>, Sep. 2005, pp. 1717-1731.

Mantia, "Multitasking: What Does It Mean?", retrieved from <http://mantia.me/blog/multitasking/> on Sep. 23, 2011, 3 pages.

Mao, "Comments of Verizon Wireless Messaging Services, LLC", Retrieved from: http://www.ntia.doc.gov/osmhome/warnings/comments/verizon.htm on May 6, 2009., Aug. 18, 2000, 5 Pages.

Marie, "MacBook Trackpad Four Fingers Swipe Left/Right to Switch Applications", MacBook Junkie—retrieved from <http://www.macbookjunkie.com/macbook-trackpad-four-fingers-swipe-left-right-to-switch-applications/> on May 11, 2011, Nov. 13, 2010, 4 pages.

Matejka, et al., "Patina: Dynamic Heatmaps for Visualizing Application Usage", In Proceedings: The SIGCHI Conference on Human Factors in Computing Systems, Autodesk Research, Toronto, Ontario, Canada,Apr. 27, 2013, pp. 3227-3236.

Mazo, "How to Switch Applications and Multitask on the Galaxy S3", Retrieved from <http://www.androidcentral.com/how-switch-applications-and-multitask-samsung-galaxy-s3> on Feb. 18, 2013, Jul. 17, 2012, 7 pages.

Mei, et al., "Probabilistic Multimodality Fusion for Event Based Home Photo Clustering", Retrieved from: <http://ieeexplore.ieee.org//stamp/stamp.jsp?tp=&arnumber=04036960.>, Dec. 26, 2006, pp. 1757-1760.

Michaluk, "Using the Application Switcher and Closing Apps When Finished to Maximize your BlackBerry Efficiency", Retrieved from <http://crackberry.com/using-application-switcher-and-closing-apps-when-finished-maximize-your-blackberry-efficiency> on Feb. 19, 2013, Aug. 17, 2009, 14 pages.

(56) References Cited

OTHER PUBLICATIONS

Mpdooley, "SeaMonkey Hangs during Drag Operation", mozillaZine—retrieved from <http://forums.mozillazine.org/viewtopic.php?f=5&t=1783735> on Nov. 18, 2011, Mar. 5, 2010, 2 pages.
Nordgren, "Development of a Touch Screen Interface for Scania Interactor", Master's Thesis in C—Available at <http://www.cs.umu.se/education/examina/Rapporter/PederNordgren.pdf>omputing Science, UMEA University, Apr. 10, 2007, pp. 1-59.
Oliver, "Potential iPhone Usability and Interface Improvements", Retrieved from: <http://www.appleinsider.com/articles/08/09/18/potential_iphone_usability_and_interface_improvements.html> on Nov. 12, 2008, AppleInsider,Sep. 18, 2008, 4 pages.
Oryl, "Review: Asus P527 Smartphone for North America", Retrieved from: <http://www.mobileburn.com/review.jsp?Id=4257> on Dec. 17, 2008., Mar. 5, 2008, 1 Page.
Padilla, "Palm Treo 750 Cell Phone Review—Hardware", Retrieved from: <http://www.wirelessinfo.com/content/palm-Treo-750-Cell-Phone-Review/Hardware.htm> on Dec. 11, 2008., Mar. 17, 2007, 4 Pages.
Paul, "Hands-on: KDE 4.5 Launches with Tiling, New Notifications", Retrieved from: <http://arstechnica.com/open-source/reviews/2010/08/hands-on-kde-45-launches-with-tiling-new-notifications.ars> on Sep. 29, 2010, Aug. 2010, 3 pages.
Pendharkar, "Fluid Home Screen for Mobile Phones", Helsinki Metropolia University of Applied Sciences, Master of Engineering, Information Technology, Thesis, Available at <http://theseus17-kk.lib.helsinki.fi/bitstream/handle/10024/46481/FinalThesis3.pdf?sequence=1/>,Apr. 12, 2012, 48 pages.
Perry, "Teach Yourself Windows 95 in 24 Hours", 1997, Sams Publishing, 2nd Edition, 1997, pp. 193-198.
Raghaven, et al., "Model Based Estimation and Verification of Mobile Device Performance", Available at http://alumni.cs.ucsb.edu/~raimisl/emsoft04_12.pdf., Sep. 27-29, 2004, 10 Pages.
Rathbone, "Windows Phone 7 Live Tile Schedules—How to Execute Instant Live Tile Updates", Retrieved from <http://www.diaryofaninja.com/blog/2011/04/03/windows-phone-7-live-tile-schedules-ndash-executing-instant-live-tile-updates> on Mar. 11, 2013, Apr. 3, 2011, 8 pages.
Ray, "Microsoft Re-Tiles Mobile Platform for Windows 7 Era", retrieved from <http://www.theregister.co.uk/2010/02/15/windows_phone_7_series/> on May 11, 2011, Feb. 15, 2010, 2 pages.
Reed, "Microsoft Demos Windows Mobile 6.1 at CTIA", Retrieved from: <http://www.networkworld.com/news/2008/040208-ctia-microsoft-windows-mobile.html> on Jul. 18, 2008, Apr. 2, 2008, 1 page.
Remond, "Mobile Marketing Solutions", Retrieved from: <http://www.mobilemarketingmagazine.co.uk/mobile_social_networking/> on May 5, 2009., Apr. 28, 2009, 16 Pages.
Rice, et al., "A System for Searching Sound Palettes", Proceedings of the Eleventh Biennial Symposium on Arts and Technology Available at <http://www.comparisonics.com/FindSoundsPalettePaper.pdf>,Feb. 2008, 6 pages.
Ritchie, "iOS 4 features: iPod touch Wi-Fi stays connected when asleep—iPhone too?", Retrieved from: <http://www.goip.com/2010/06/ios-4-features-ipod-touch-wi-fi-stays-connected-when-asleep-%E2%80%94-iphone-too/> on Sep. 30, 2010, Jun. 14, 2010, 2 pages.
Ritscher, "Using Surface APIs in your WPF application—Part 1", Retrieved from: <http://blog.wpfwonderland.com/2009/06/30/using-surface-apis-in-your-wpf-application/> on Sep. 28, 1010, Jun. 30, 2009, 7 pages.
Roberts, "Touching and Gesturing on the iPhone", Available at <http://www.sitepen.com/blog/2008/07/10/touching-and-gesturing-on-the-iphone/comments-pare-1>, Jul. 10, 2008, 16 pages.
Sandoval, "A development platform and execution environment for mobile applications", Universidad Autónoma de Baja California, School of Chemical Sciences and Engineering, Available at <http://citeseerx.ist.psu.edu/viewdoc/download?doi=10.1.1.86.7989&rep=rep1&type=pdf >,2004, 18 pages.
Simeone, "A Cross-Device Drag-and-Drop Technique", In Proceedings of MUM 2013, Dec. 2013, 4 pages.
Singh, et al., "Cinema: Columbia InterNet Extensible Multimedia Architecture", Available at <http://www1.cs.columbia.edu/~library/TR-repository/reports/reports2002/cucs-011-02.pdf>, Sep. 3, 2002, 83 Pages.
Smith, et al., "GroupBar: The TaskBar Evolved", Proceedings of OZCHI 2003—Available at <http://research.microsoft.com/pubs/64316/ozchi2003-groupbar.pdf>, Nov. 2003, pp. 1-10.
Spradlin, "Switcher Provides an Incredible Gesture-based App Switching Tool", Retrieved from <http://www.androidpolice.com/2012/07/09/switcher-proof-of-concept-hits-the-play-store-providing-an-incredible-gesture-based-app-switching-tool/> on Feb. 18, 2013, Jul. 9, 2012, 7 pages.
Stark, "Review: Logitech Ultrathin Keyboard Cover for iPad", Retrieved From: <http://www.gadgetguy.com.au/product/logitech-ultrathin-keyboard-cover-for-ipad/> Feb. 26, 2014, Jun. 8, 2012, 4 Pages.
Stebih, "Windows 8 Mouse and Keyboard Commands", retrieved from <http://www.helpdesktv.ca/windows/windows-8-mouse-and-keyboard-commands.html> on Nov. 23, 2011, Sep. 21, 2011, 5 pages.
Steinicke, et al., "Multi—Touching 3D Data: Towards Direct Interaction in Stereoscopic Display Environments coupled with Mobile Devices", Advanced Visual Interfaces (AVI) Workshop on Designing Multi-Touch Interaction Techniques for Coupled Public, Available at <http://viscg.uni-muenster.de/publications/2008/SHSK08/ppd-workshop.-pdf.>,Jun. 15, 2008, 4 Pages.
Sun, "Clamshell Keyboard Case transforms the iPad Mini into a Laptop and Gets Raving Review from RunAroundTech.com", Retrieved From: <http://www.prweb.com/releases/2014/01/prweb11456818.htm> Apr. 1, 2014, Jan. 6, 2014, 3 Pages.
Suror, "PocketShield—New Screenlock App for the HTC Diamond and Pro", Retrieved from: <http://wmpoweruser.com/?tag=htc-touch-diamond> on Jun. 28, 2011, Oct. 23, 2008, 2 pages.
Terpstra, "Beta Beat: Grape, a New Way to Manage Your Desktop Clutter", Retrieved from: http://www.tuaw.com/2009/04/14/beta-beat-grape-a-new-way-to-manage-your-desktop-clutter/, Apr. 14, 2009, 4 pages.
Ueland, "25 Apps for Dropbox", Retrieved from: <http://www.practicalecommerce.com/articles/3984-25-Apps-for-Dropbox> on Apr. 6, 2014, Apr. 15, 2013, 10 pages.
Vallerio, et al., "Energy-Efficient Graphical User Interface Design", Retrieved from: <http://www.cc.gatech.edu/classes/AY2007/cs7470_fall/zhong-energy-efficient-user-interface.pdf>, Jun. 10, 2004, pp. 1-13.
Vermeulen, "BlackBerry PlayBook Hands-on", retrieved from <http://mybroadband.co.za/news/gadgets/20104-BlackBerry-PlayBook-hands-.html> on May 11, 2011, May 8, 2011, 4 pages.
Viticci, "Growl 1.3 to Be Released on Mac App Store, Introduce Lion Support and Drop GrowlMail Support", Retrieved from: <http://www.macstories.net/stories/growl-1-3-to-be-released-on-mac-app-store-introduce-lion-support-and-drop-growlmail-support/> on Jul. 22, 2011, Jul. 6, 2011, 6 pages.
Vornberger, "Bluetile", Retrieved from: <http://www.bluetile.org> on Sep. 29, 2010, 5 pages.
Webster, "VsNotepad: An Improved Way to Jot Down on Windows Mobile", Retrieved from <http://pocketnow.com/index.php/index.php?a=portal_detail&t=news&id=7424>, May 19, 2009, 2 pages.
Wells, "Advanced Task Killer", Android Tapp: Android App Reviews—retrieved from <http://www.androidtapp.com/advanced-task-killer/> on Nov. 18, 2011, Aug. 28, 2009, 15 pages.
Wilson, "How the iPhone Works", Retrieved from: <http://electronics.howstuffworks.com/iphone2.htm> on Apr. 24, 2009, Jan. 2007, 9 pages.
Wilson, "Robust Computer Vision-Based Detection of Pinching for One and Two-Handed Gesture Input", In Proceedings of UIST 2006—Available at <http://research.microsoft.com/en-us/um/people/awilson/publications/wilsonuist2006/uist%202006%20taffi.pdf>, Oct. 2006, 4 pages.

(56) References Cited

OTHER PUBLICATIONS

Wobbrock, et al., "User-Defined Gestures for Surface Computing", CHI 2009, Apr. 4-9, 2009, Boston, MA—available at <http://faculty.washington.edu/wobbrock/pubs/chi-09.2.pdf>, Apr. 4, 2009, 10 pages.
Wollman, "Sony gives the slider another shot with the VAIO Duo 13", Retrieved From: <http://www.engadget.com/2013/06/04/sony-duo-13/> Mar. 31, 2014, Jun. 4, 2013, 7 Pages.
Wu, et al., "Achieving a Superior Ownership Experience in Manageability and Quality for Siebel CRM", available at <http://www.oracle.com/us/products/enterprise-manager/superior-exp-for-siebel-crm-068962.pdf>, Aug. 2008, 25 pages.
Wyatt, "/Flash/the art of parallax scrolling", .net Magazine, Aug. 1, 2007, pp. 74-76.
Yang, et al., "Dual-Surface Input: Augmenting One-Handed Interaction with Coordinated Front and Behind-the-Screen Input", Proceedings: MobileHCI '09, Sep. 15-18, 2009, Bonn, Germany—retrieved from <http://www.cs.ualberta.ca/~wfb/publications/C-2009-MobileHCI-Yang.pdf>, Sep. 18, 2009, 10 pages.
Yang, et al., "Semantic Photo Album Based on MPEG-4 Compatible Application Format", Retrieved from: <http://ieeexplore.ieee.org/stamp/stamp.jsp?arnumber=04146254.>, 2007, 2 Pages.
"Corrected Notice of Allowance", U.S. Appl. No. 14/089,149, Feb. 20, 2015, 2 pages.
"Foreign Office Action", CN Application No. 201180071186.4, Jan. 20, 2015, 8 pages.
"International Search Report and Written Opinion", Application No. PCT/CN2014/074788, Dec. 30, 2014, 12 pages.
"International Search Report and Written Opinion", Application No. PCT/CN2014/074988, Jan. 8, 2015, 13 pages.
"International Search Report and Written Opinion", Application No. PCT/CN2014/074825, Jan. 5, 2015, 15 pages.
"International Search Report and Written Opinion", Application No. PCT/CN2014/074783, Dec. 31, 2014, 15 pages.
"International Search Report and Written Opinion", Application No. PCT/CN2014/075038, Dec. 30, 2014, 16 pages.
"Supplemental Notice of Allowance", U.S. Appl. No. 14/089,149, Mar. 20, 2015, 2 pages.
"Non-Final Office Action Issued in U.S. Appl. No. 14/517,298", dated: Nov. 15, 2016, 51 Pages.
"Non-Final Office Action Issued in U.S. Appl. No. 14/517,417", dated: Nov. 4, 2016, 39 Pages.
Borchers, Callum, "Device Makes Skipping TV Ads Easy", Retrieved from http://www.bostonglobe.com/business/2013/07/28/mychoice-let-viewers-skip-ads-with-channel-changing-device/z69iYACIkwFQ2ugno1eTIK/story.html, Jul. 29, 2013, 4 Pages.
"International Search Report and Written Opinion Issued in PCT Patent Application No. PCT/CN2014/074793", dated: Sep. 30, 2014, 15 pages.
"International Search Report and Written Opinion Issued in PCT Patent Application No. PCT/CN2014/075180", dated: Feb. 3, 2015, 13 Pages.
"Final Office Action Issued in U.S. Appl. No. 14/517,417", dated: Mar. 15, 2017, 39 pages.
"Supplementary Search Report Issued in European Patent Application No. 14888387.9", date: Feb. 22, 2017, 4 pages.
"Office Action Issued in European Patent Application No. 14888466.1", dated: Mar. 29, 2017, 10 pages.
"Supplementary Search Report Issued in European Patent Application No. 14888466.1", dated: Mar. 15, 2017, 5 pages.
"Search Report Issued in European Patent Application No. 14888179.0", dated: Apr. 7, 2017, 4 pages.

\* cited by examiner

1600

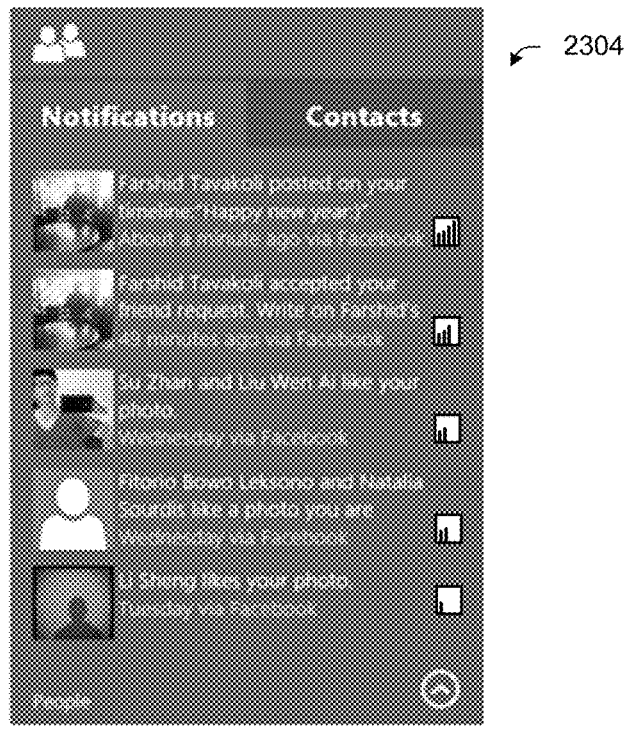
Fig. 23

2700 —

2702
Display representations of applications, selectable to launch execution of respective said applications, in a root level of a menu hierarchy maintained by an operating system of the computing device, at least one of the representations having an expanded display having a result of execution of the respective said application

2704
Responsive to receipt of an input from a mobile computing device that is associated with the at least one representation having the expanded display, transfer the result of the execution of the respective said application to the mobile computing device

*Fig. 27*

EXPANDABLE APPLICATION REPRESENTATION

PRIORITY APPLICATION

This application claims benefit of priority of PCT Application Serial No. PCT/CN2014/074793 entitled "Expandable Application Representation" filed Apr. 4, 2014, the content of which is incorporated by reference herein in its entirety.

BACKGROUND

With the advent of application availability via the Internet, the number of applications that are made available to a user has increased along with the ease at which the user may access these applications. Accordingly, users may chose and install a large number of applications on the users' computing device.

However, interaction by a user with the applications may be hindered by the number of applications that are installed on the computing device. This may include locating an application of interest as well as accessing functionality of the application. For instance, a user may select a weather application to get weather information, then interact with a news application to catch up on the latest news, and so on through a number of other applications. Consequently, navigation through these applications to locate desired information may take a significant amount of time, which may be further complicated by the number of applications that are available on the computing device.

SUMMARY

Expandable application representation techniques are described. The techniques may include support of an expandable representation that may function as an intermediary within a root level (e.g., start menu or screen) of a file system. The expandable representation, for instance, may be output via a gesture to gain additional information that was not included in an unexpanded version of the representation, may be utilized to provide inputs to an application, and so on. Thus, this may support non-modal interaction by a user within the root level of the file system.

Techniques are also described in which the expanded representation is included in a taskbar, which may also be used for non-modal interaction, support sending of content represented in the representation to a device or application, continuation of interaction initiated with the representation by a mobile computing device, and so on. Expandable representation techniques may also be utilized to support interaction between shells of an operating system, such as a desktop and immersive shells. Further description of these and other examples involving and not involving an expandable representation are also contemplated as further described in the detail description.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

FIG. 23 depicts an example implementation in which expanded representations are leveraged to indicate activity levels of content in relation to a shared network environment.

FIG. 27 is a flow diagram depicting a procedure in an example implementation in which a result of execution of an application associated with an expanded representation is transferred between computing devices.

DETAILED DESCRIPTION

Overview

Figure 1:
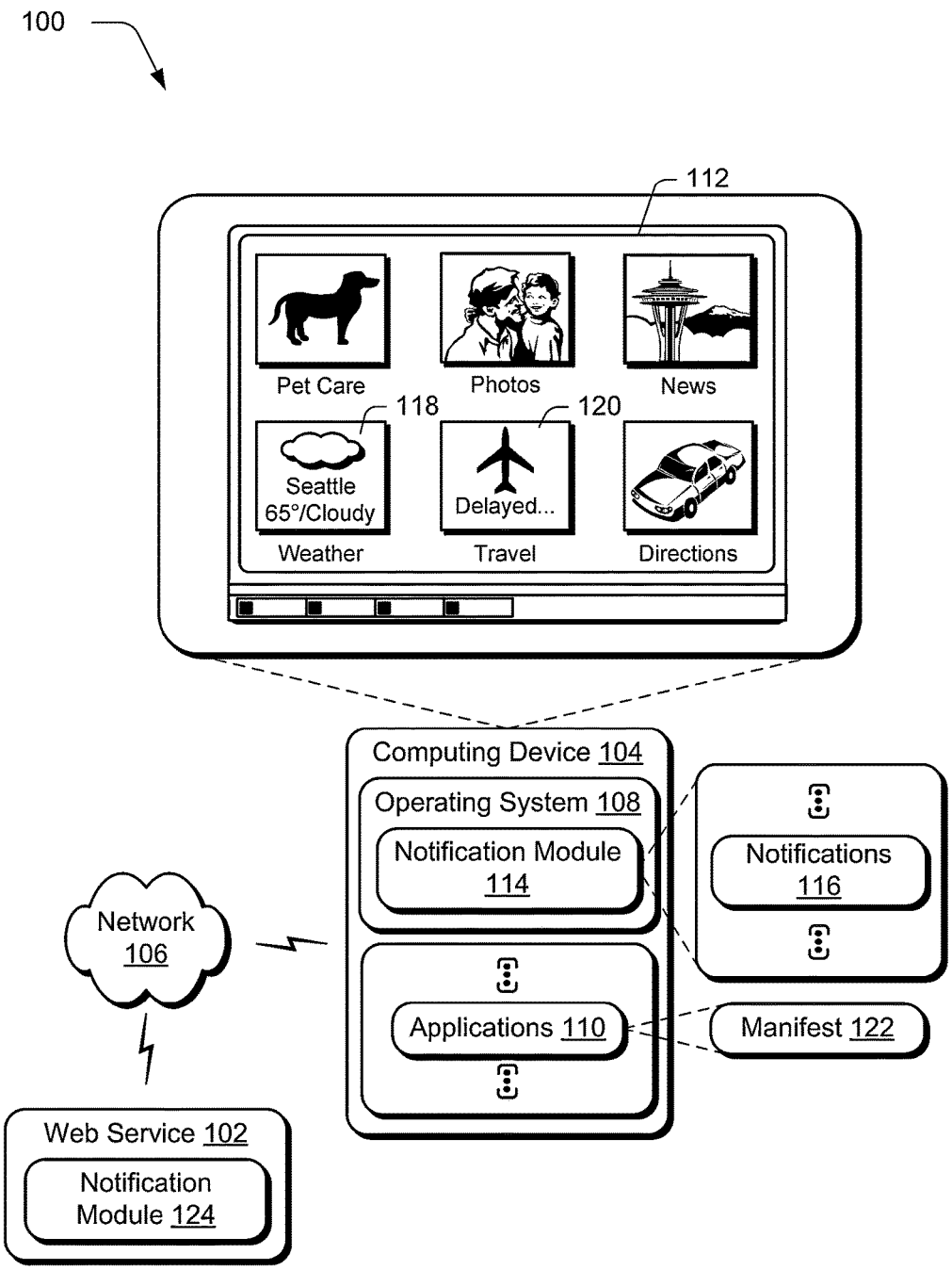
FIG. 1 depicts an environment in an example implementation that is configured to perform expandable representation techniques described herein.

Representations of applications (e.g., icons, tiles, and so on) may be utilized to support a wide variety of functionality without having the user specifically launch the application. For example, a representation of a weather application may include a notification that describes current weather conditions. However, conventional techniques that were utilized to display a notification were often static and modal and thus often necessitated that a user navigate away from the representations to gain further information about the notification.

Expandable application representation techniques are described. The techniques may include support of an expandable representation (e.g., tile) that may function as an intermediary within a root level (e.g., start screen) of a file system. For example, the root level may include representations, such as tiles, of applications within a start menu.

An expanded version of the tile may be output via a gesture to gain additional information that was not included in an unexpanded version of the tile. The expanded representation may also be included within the root level, e.g., through rearrangement of other representations in the grid when expanded. A first expanded representation may be utilized to provide additional content, such as additional notifications or additional content associated with a particular notification, view activity levels of content in a shared network environment, and so on. Another expended representation may be utilized to allow a user provide limited inputs to an application and/or allow limited functionality to applications features such as making a call, answering a text, post a status, play a video or song, etc. Another expanded representation of the application at a root level mode may include a full functionality implementation of the app within the larger root mode display, such as a calculator, Sudoku game, video player. Although not an expanded presentation of an application, the next expansion would be launching of the application to the typical full screen or split screen application running within a full screen or window frame in a desktop. Thus, all the expanded presentations of the application within the root mode display this may support non-modal interaction by a user without forcing the user to navigate "away" from the root level.

Techniques are also described in which the expanded representation is included in a taskbar, which may also be used for non-modal interaction, sending of content represented in the representation to a device or application, continuation of interaction initiated with the representation by a mobile computing device, and so on. Expandable tile techniques may also be utilized to support interaction between shells of an operating system, such as a desktop and immersive shell. Further description of these and other techniques may be found in relation to the following sections.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ the expandable application representation techniques described herein. The illustrated environment 100 includes a web service 102 and a computing device 104 that are communicatively coupled via a network 106. The web service 102 and the computing device 104 may be implemented by a wide range of computing devices.

For example, a computing device may be configured as a computer that is capable of communicating over the network 106, such as a desktop computer, a mobile station, an entertainment appliance, a set-top box communicatively coupled to a display device, a mobile communication device (e.g., a wireless phone as illustrated for the computing device 104), a game console, and so forth. Thus, a computing device may range from full resource devices with substantial memory and processor resources (e.g., personal computers, game consoles) to a low-resource device with limited memory and/or processing resources (e.g., traditional set-top boxes, hand-held game consoles). Additionally, a computing device may be representative of a plurality of different devices, such as multiple servers utilized by a business to perform operations, a remote control and set-top box combination, an image capture device and a game console configured to capture gestures, and so on.

Although the network 106 is illustrated as the Internet, the network may assume a wide variety of configurations. For example, the network 106 may include a wide area network (WAN), a local area network (LAN), a wireless network, a public telephone network, an intranet, and so on. Further, although a single network 106 is shown, the network 106 may be configured to include multiple networks.

The computing device 104 is further illustrated as including an operating system 108. The operating system 108 is configured to abstract underlying functionality of the client 104 to applications 110 that are executable on the computing device 104. For example, the operating system 108 may abstract processing, memory, network, and/or display functionality of the computing device 104 such that the applications 110 may be written without knowing "how" this underlying functionality is implemented. The application 110, for instance, may provide data to the operating system 108 to be rendered and displayed by the display device 112 without understanding how this rendering will be performed.

The operating system 108 may also represent a variety of other functionality, such as to manage a file system and a user interface that is navigable by a user of the computing device 104. An example of this is illustrated as an application launcher (e.g., start screen) that is displayed on the display device 112 of the computing device 104. The start screen includes representations of a plurality of the applications 110, such as icon, tiles, textual descriptions, and so on which may be displayed in a matrix or grid of rows and/or columns of application representations (icons, tiles, etc.). The start screen may be considered a root level of a hierarchical file structure, e.g., each of the other levels are "beneath" the root level in the hierarchy. The representations shown in the illustrated example are selectable to launch a corresponding one of applications 110 for execution on the computing device 104. In this way, a user may readily navigate through a file structure and initiate execution of applications of interest.

The operating system 108 is also illustrated as including a notification module 114. The notification module 114 is representative of functionality to manage notifications 116 that are to be displayed as part of the representations of the applications. For example, a representation 118 of a weather application is illustrated as including a notification that indicates a name and current weather conditions, e.g., "Seattle 65°/Cloudy." Likewise, a representation 120 for a travel application is illustrated as including a notification that indicates that a current flight status is "delayed." In this way, a user may readily view information relating to the applications 110 without having to launch and navigate through each of the applications. Although representations of specific applications are shown, other representations of applications are also contemplated, such as a representation of an application that references a user's involvement with a service, e.g., a friend in a social network service.

In one or more implementations, the notifications 116 may be managed without executing the corresponding applications 110. For example, the notification module 114 may receive the notifications 116 from a variety of different sources, such as from software (e.g., other applications executed by the computing device 104), from a web service 102 via the network 106, and so on. This may be performed responsive to registration of the applications 110 with the notification module 114 to specify where and how notifications are to be received. The notification module 114 may then manage how the notifications 116 are displayed as part of the representations without executing the applications 110. This may be used to improve battery life and performance of the computing device 104 by not running each of the applications 110 to output the notifications 116.

Additionally, the notification module 114 may support techniques to allow developers of the respective applications 110 to specify how the notifications 116 are to be displayed as part of the representation of the applications 110. For example, the notification module 114 may examine a manifest 122 of an application 110, such as an install manifest used to install the application 110, at runtime using a system call, and so on. The manifest 122 may describe how and when the notifications 116 are to be displayed as well as how the notifications 116 are to be managed to determine which notifications 116 are to be displayed.

The notification module 114 may also utilize a variety of other techniques to enable a developer or other entity to specify how the notifications 116 are to be displayed and managed. For instance, the notifications 116 may be communicated along with corresponding tags that specify how the notifications 116 are to be displayed and/or managed. Thus, an originator of the tags may specify how corresponding notifications 116 are to be displayed or managed. This may be performed to enable a variety of different functionality as further described in the following sections.

Although this discussion described incorporation of the notification module 114 at the client, functionality of the notification module 114 may be implemented in a variety of ways. For example, functionality of a notification module 124 may be incorporated by the web service 102 in whole or in part. The notification module 124, for instance, may process notifications received from other web services and manage the notifications for distribution to the computing device 104 over the network 106.

As previously described, conventional techniques were often modal and thus caused a user to navigate away from the root level to gain more information. For example, a user may view the representation 118 of the weather application is illustrated as including a notification that indicates a name and current weather conditions, e.g., "Seattle 65°/Cloudy." To gain additional information, the user selected the representation 118 to launch a corresponding application, which causes the user to leave the start menu in this example. However, techniques are described in which the representations may be expanded within the root level, in some instances, to provide additional content, and in a further expanded view supports additional functionality without causing the user to navigate away from the root level and thus support non-modal interaction, an example of which is described as follows and shown in a corresponding figure.

Figure 2:
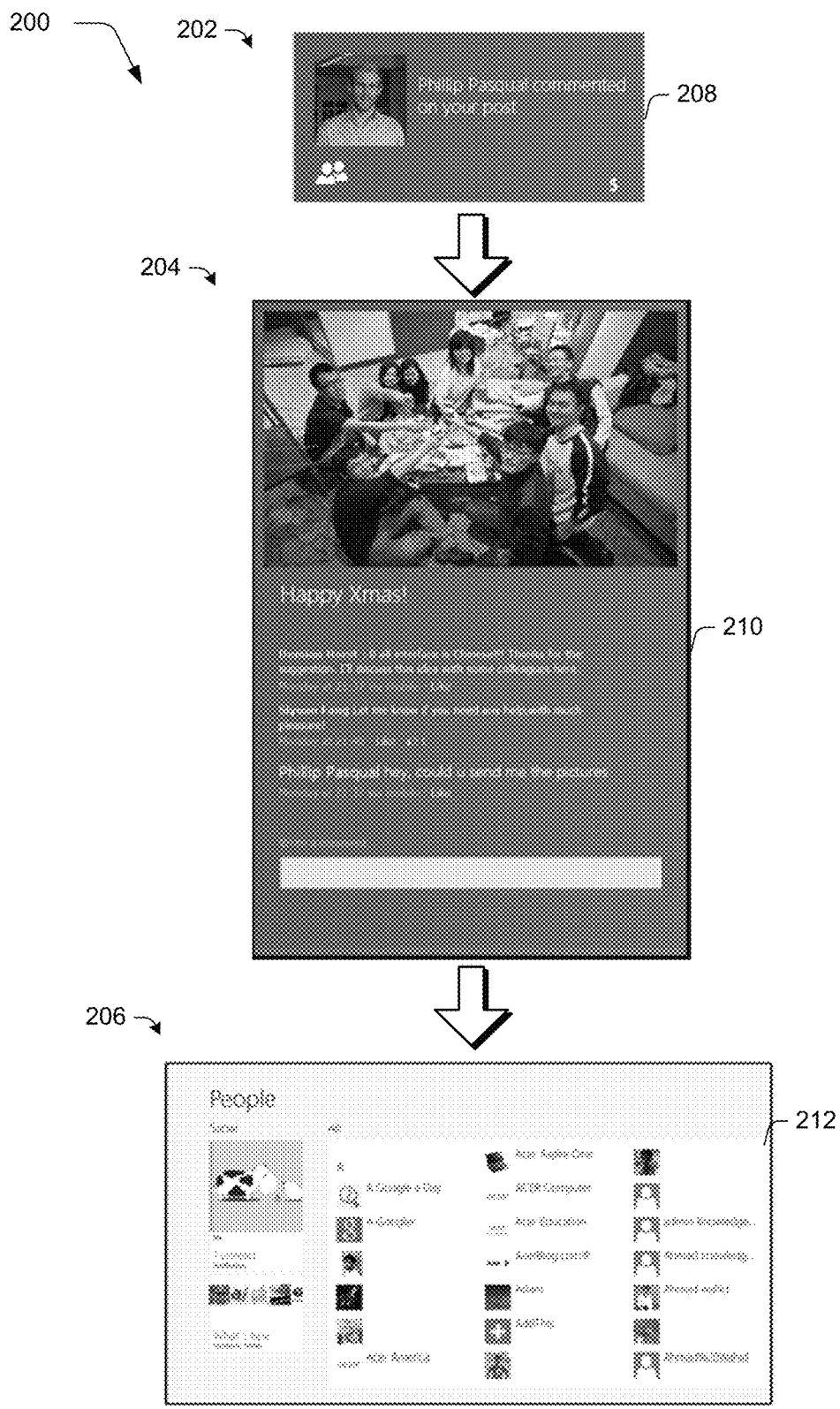
FIG. 2 depicts an example implementation showing a plurality of display modes that are usable to support user interaction with an application.

FIG. 2 depicts an example implementation 200 showing a plurality of display modes that are usable to support user interaction with an application. The example implementation is illustrated through use of first, second, third, and fourth display modes 202, 204, 206 for interaction with an application and associated content. In the first display mode 202, a representation 208 is configured as a tile corresponding to a contact that also includes a notification that the contact commented on the post of the user. To view additional information about this notification, a user may supply an input (e.g., gesture, selection via a cursor control device, speech input, and so on) to cause expansion of the representation 208 to transition to the second display mode 204.

In the second display mode 204, an expanded representation 210 is shown that is output responsive to the gesture or other input described above. The expanded representation 210 includes additional content related to the notification in this example. For instance, the expanded representation 210 includes a picture that was the subject of the post, other comments made in relation to the post, an input portion configured to receive one or more inputs from a user of the computing device 104 as further described in relation to FIGS. 5 and 6, as well as the post that was actually made by a user represented by the contact. Thus, the representation 210 includes additional content other than the notifications included in the unexpanded representation 208, which may further describe the notification. In other examples, multiple additional notifications may be displayed. The second display mode may have a plurality of different sub-modes involving display of the expanded representation.

The expanded representation 210 may be configured to receive and output this content in a variety of ways. For example, selection of the representation 208 to cause output of the expanded representation 210 may cause execution of a corresponding application 110 of FIG. 1. Thus, in this example the application 110 is "woken" to obtain the content for inclusion in the expanded representation 210.

In another example, the content of display 204 may be supplied by the notification module 114 of FIG. 1 without executing the corresponding application 110. For example, the notification module 114 may be configured to obtain notifications as previously described in relation to FIG. 1 without executing the applications 110. In this way, the notification module 114 may obtain content associated with the application 110 to support user interaction with the application 110 without actually executing the application.

Figure 4:
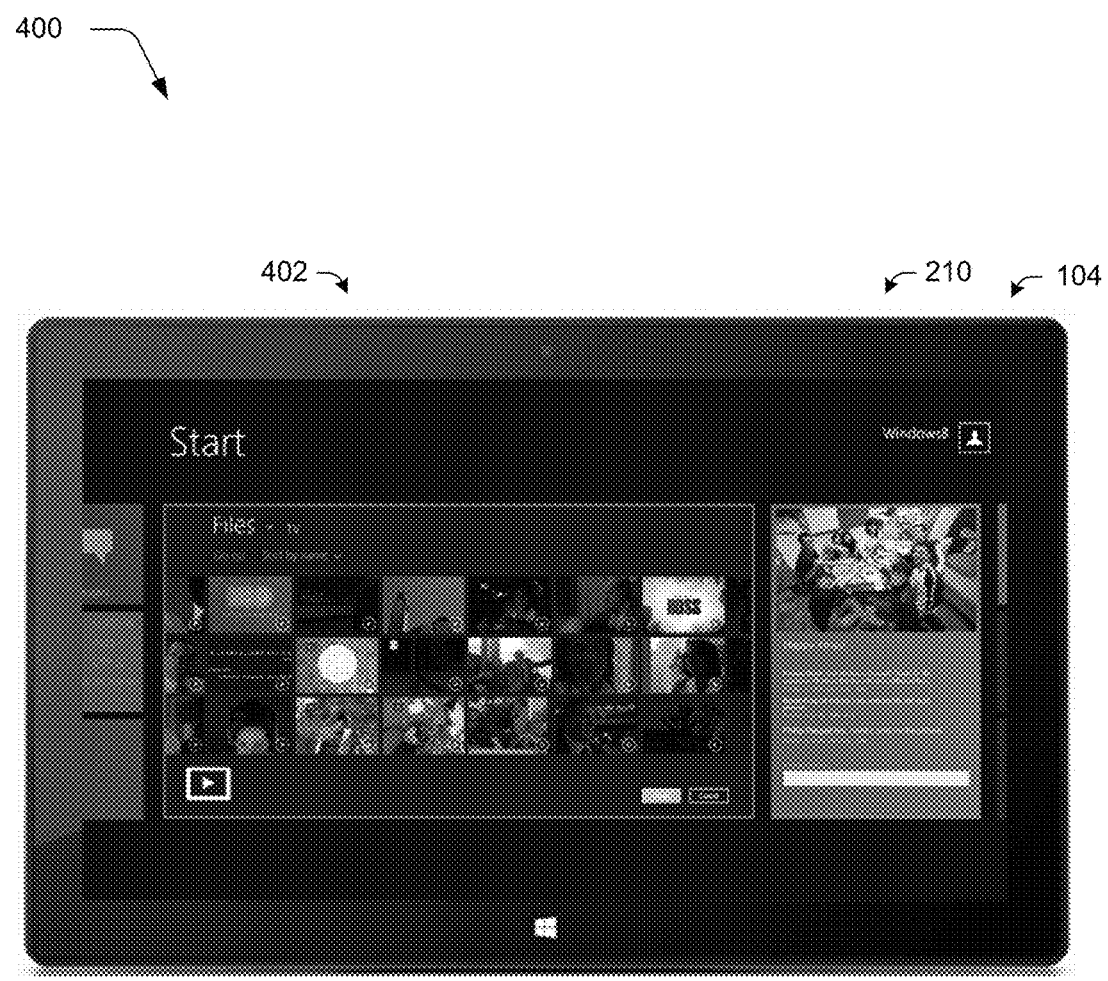
FIG. 4 depicts an expanded representation that is output responsive to a gesture of FIG. 3.
Figure 11:
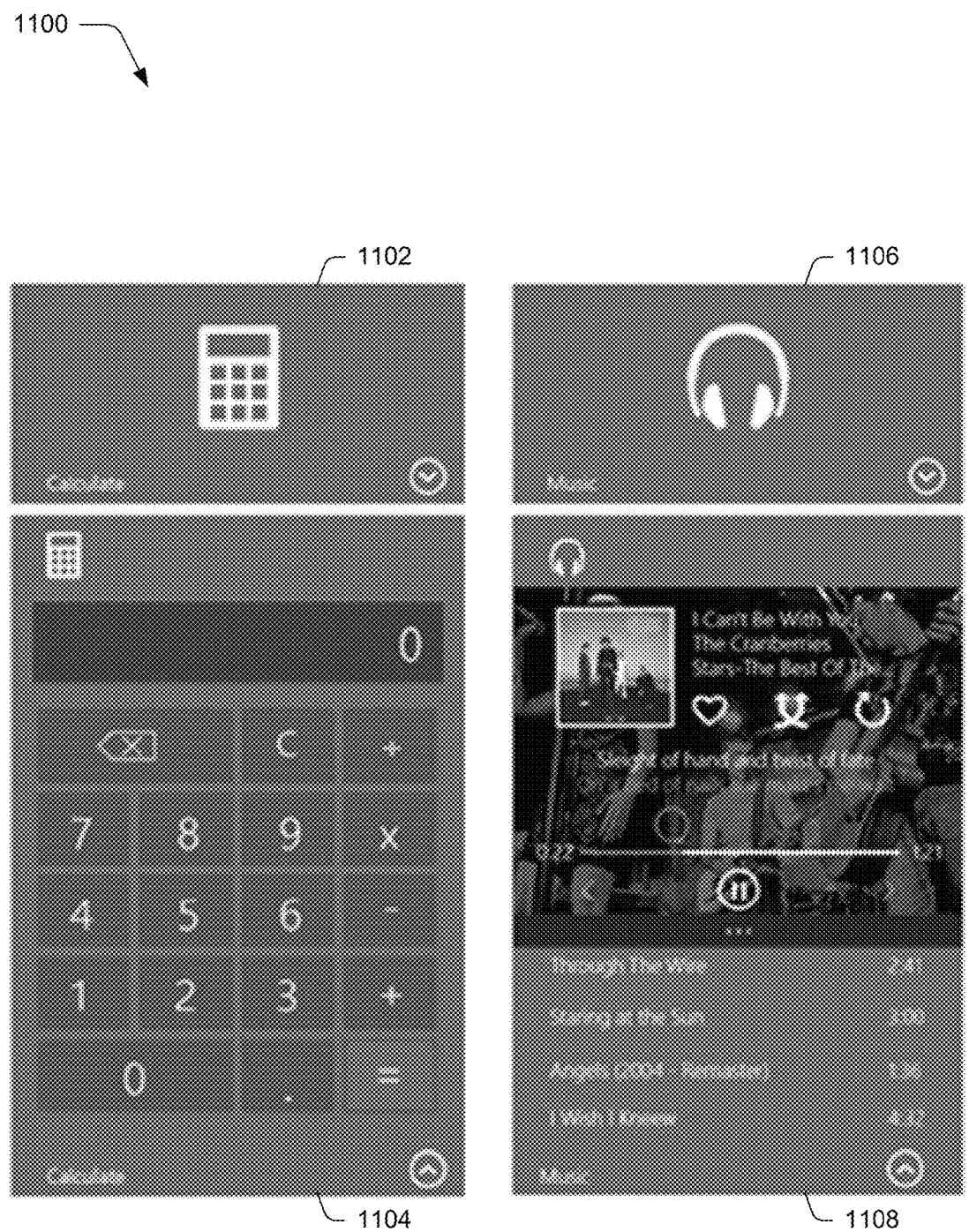
FIG. 11 is an example implementation showing representations and expanded representations of calculator and music applications.
Figure 14:
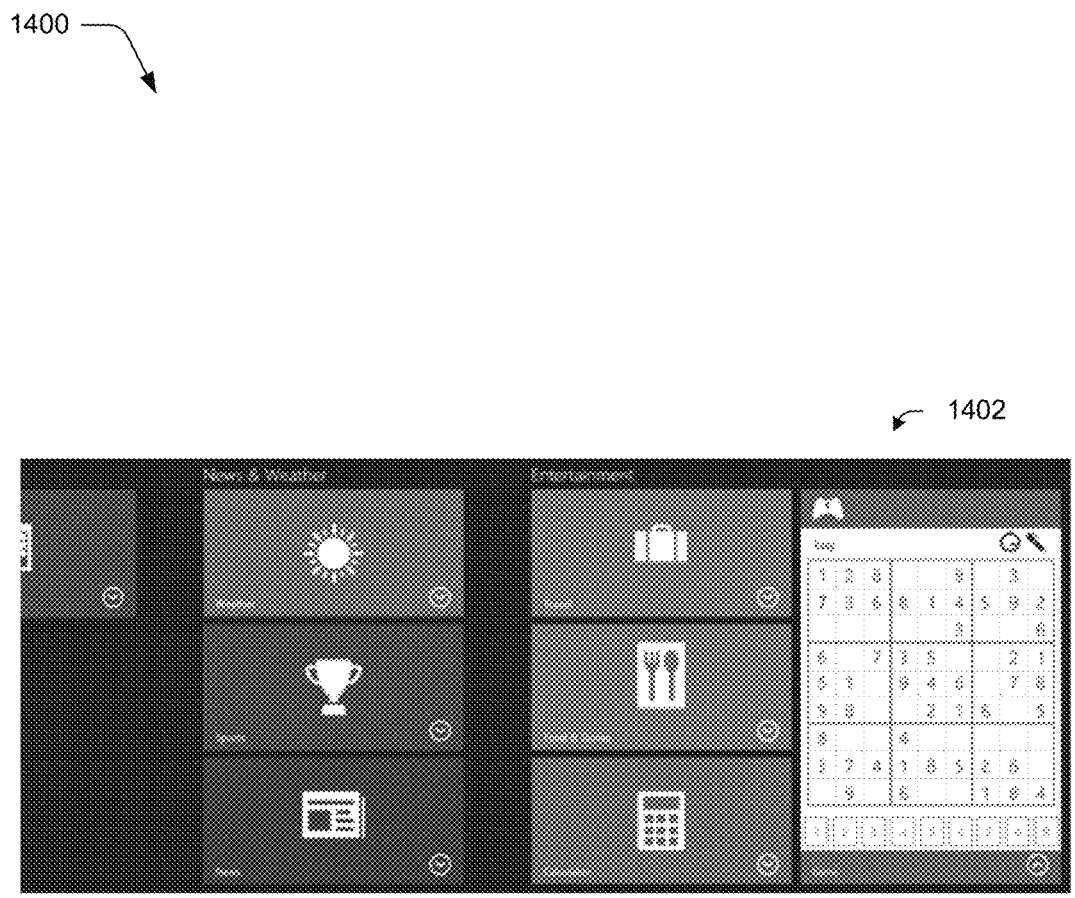
FIG. 14 depicts an example implementation showing a user interface of an application store that is configured to provide users access to applications for download and use.

The second display mode 204 may also support a variety of different sub-modes involving display of the expanded representation. For example, one such sub-mode may involve an expanded representation that may be utilized to provide additional content, such as additional notifications or additional content associated with a particular notification, view activity levels of content in a shared network environment, and so on. Another expended representation in another sub-mode may be utilized to allow a user provide limited inputs to an application and/or allow limited functionality to applications features such as making a call, answering a text, post a status, play a video or song, and so forth. Another expanded representation in another one of the sub-modes of the application at a root level mode may include a full functionality implementation of the app within the larger root mode display, such as a calculator as shown in FIG. 11, Sudoku game as shown in FIG. 14, video player as shown in FIG. 4, and so on which is described in further detail below.

In the third display mode 206, execution of the application 110 associated with the representation (e.g., a contacts application) is fully launched in a mode such as desktop mode in a window or frame or in a full screen view or split screen without chrome. For example, the operating system 108 may support an immersive shell as further described below in which an application is displayed without chrome, e.g., without a window. The third display mode 206 may be entered through selection of either the representation 208 in the first display mode 202 or the expanded representation 210 in the second display mode 204 or through any other suitable icon or user interaction with the application representation.

Thus, although not an expanded presentation of an application, the next expansion provided via the third display mode involves launching of the application to the typical full screen or split screen application running within a full screen or window frame in a desktop. Thus, all the expanded presentations of the application within the root mode display this may support non-modal interaction by a user without forcing the user to navigate "away" from the root level.

Further, a user may navigate between the modes in a variety of ways. For example, a user may select a portion of the representation 208 (e.g., the text of the notification) to cause output of the expanded representation 210 and select another portion of the representation 208 (e.g., the shadowed people representing a contacts application) to cause a transition to the third display mode 206. Gestures may also be supported, an example of which is described as follows and shown in the corresponding figure.

Figure 3:
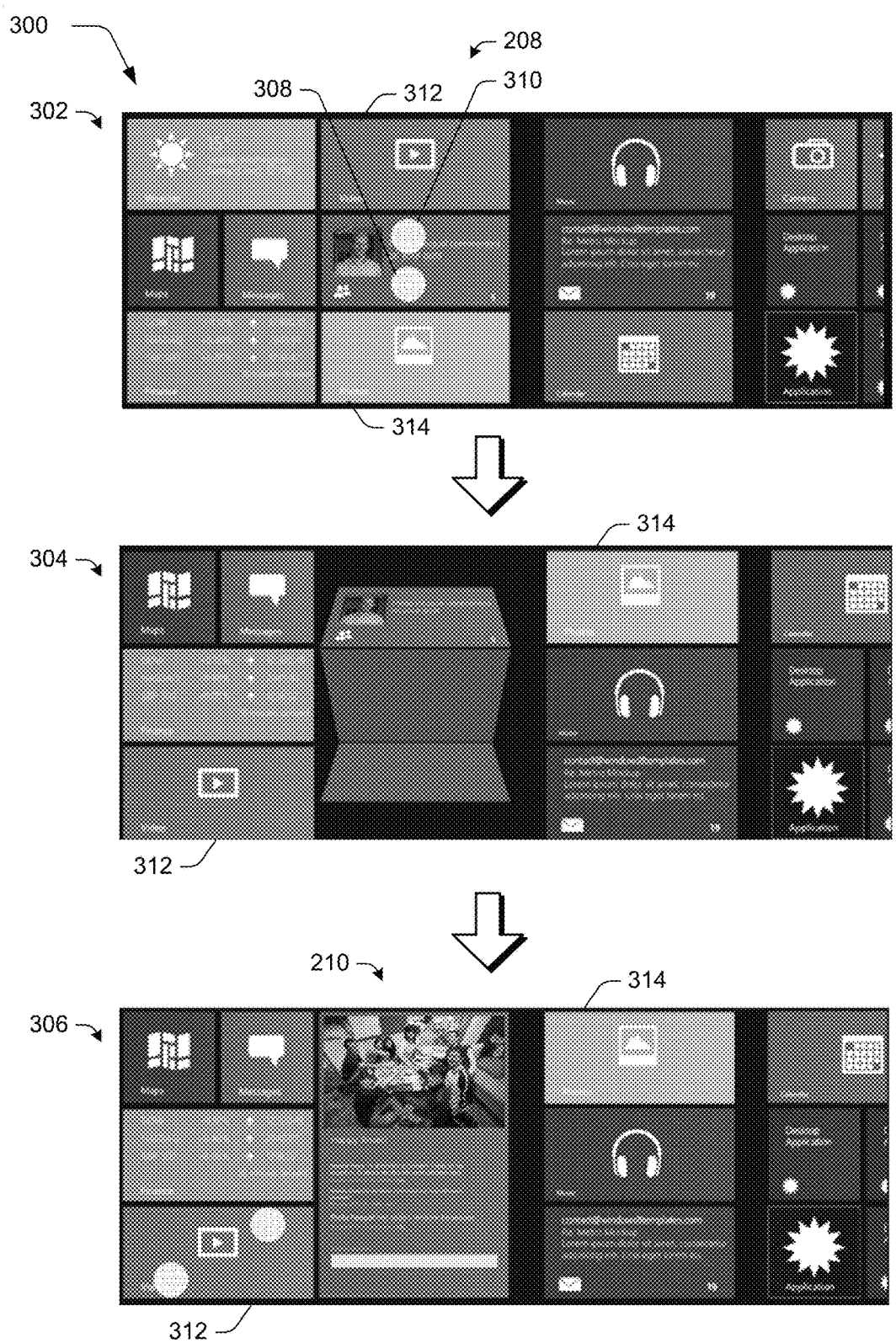
FIG. 3 depicts an example implementation showing use of a gesture to cause output of an expanded representation that involves an animation.

FIG. 3 depicts an example implementation 300 showing use of a gesture or icon (down arrow, etc.) to expand to the next hierarchical view or representation and selection of another portion of the application representation (icon, tile, etc.) may open the fully functioning application. In some cases, the input received by the operating system associated with expanding the application representation will cause output of an expanded representation that involves an animation. This example implementation 300 is shown using first, second, and third 302, 304, 306 stages. At the first stage 302, a user contacts the representation 208 as shown in FIG. 2 using two fingers (illustrated through use of two phantom circles 308, 301) and moves them apart to make an expansion gesture. Other gestures are also contemplated, such as a tap or activation through a menu or icon. As illustrated, the start screen in this example includes a plurality of other representations configured as tiles that follows a grid arrangement.

The operating system 108 then recognizes the gesture and in response causes output of an animation or other suitable user interface display transformation as shown in the second stage 304. In the displayed embodiment, the animation in this example gives an appearance that the representation 208 shown in second stage 304 is unfolding to assume its expanded size. It should also be recognized in this stage that the animation also involves rearrangement of other representations. As illustrated, the representation 208 is included in a column that includes representations 312, 314 of video and photos in the first stage 302. The representations 312, 314 of video and photos are then moved to adjacent columns in the second stage 304, e.g., the video representation 312 to the left and the photos representation 314 to the right. This movement may also cause rearrangement of other columns as illustrated. Any appropriate movement of proximate application representations may be used to make room for expanding the representation of the selected application representation in the root mode.

At the third stage 306, the expanded representation 210 is shown along with the other rearranged representations. In this way, a user may interact with the expanded representation 210 in a non-modal manner without leaving the root level, e.g., the start screen, of the operating system 108 in this example. Although a root level is described, it should be readily apparent that this functionality may also be employed at other levels in a file system without departing from the spirit and scope thereof, such as in a taskbar.

Use of expanded representations may also be leveraged to support multitasking. For example, as shown in the third stage 306, a user repeats the expansion gesture as previously described, but in this instance performs the gesture for the representation 312 of a video application. This also causes expansion of the representation and rearrangement of other representations as shown in the example implementation 400 of FIG. 4.

In FIG. 4, an expanded representation 402 is illustrated that is output responsive to the gesture of FIG. 3. The expanded representation 402 for the video application is displayed concurrently with the expanded representation 210 for the contacts application. The expanded representation 402 includes content that is selectable via the representation and in some implementations to cause display of the video within the representation within the root mode. In this way, the expanded representations 210, 402 may permit a user to multitask by interacting with a plurality of expanded representations simultaneously, e.g., to watch a video and view posts from a social network service and also allow the panning/scrolling or other root mode user interactions with the root mode display of multiple application representations. Thus, in this example the expanded representation 402 supports inputs to interact with content displayed within the tile. An expanded representation may also be configured to support text inputs, an example of which is further described in the following and shown in corresponding figures.

Figure 5:
FIG. 5 depicts an example implementation showing an instance of user interaction with an expanded representation.

FIG. 5 depicts an example implementation 500 showing an instance of user interaction with an expanded representation 210. As previously described, the expanded representation 210 in this example corresponds to a contacts application. The contacts application may support interaction with a social network service and thus include images, videos, status updates, and other posts that are uploaded to share with "friends" of a user. As illustrated, a user selects a text entry box to enter text that is to be posted to the social network service, e.g., by "tapping" on the box, through use of a cursor control device, and so on.

Figure 6:
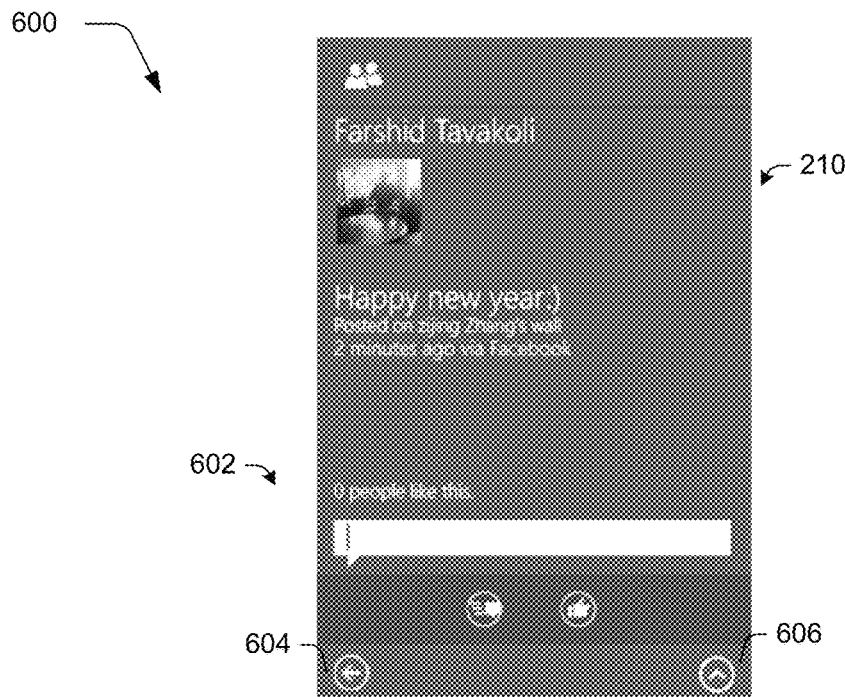
FIG. 6 is an illustration of a larger view of the expanded representation having a text entry box that is configured to receive text that may then be posted to the social network service through selection of an icon.

As shown in the example implementation 600 of FIG. 6 showing a larger view of the expanded representation 210, the text entry box 602 is configured to receive text that may then be posted to the social network service through selection of an icon. A user may also provide other inputs, such as to "like" a post through use of the "thumbs up" icon, provide a status update or any other appropriate but limited functionality of the application underlying the application representation. The expanded representation 210 also includes an option to navigate through other posts and an option 606 which is shown as an icon but can be a gesture, to return to an unexpanded or lesser hierarchical expanded version of the representation 208. In this way, a user may quickly expand and interact with the expanded representation 210 and then remove the expansion when done to conserve space in the user interface. An expanded representation 210 may be configured in a variety of ways, examples of which are described as follows and shown in corresponding figures. Although examples of a contacts application and video application are described above, any suitable application with notifications, expandable content, and/or limited sets of functionality may apply the application expandable content and/or functionality, e.g., calculator application can expand from simple tile addition to a full scientific calculator, a setting application can provide indications of connectivity status and/or further functionality to connect or set some settings, a game application to expand to show new games available, show friends and/or current status or updates, etc.

Figure 7:
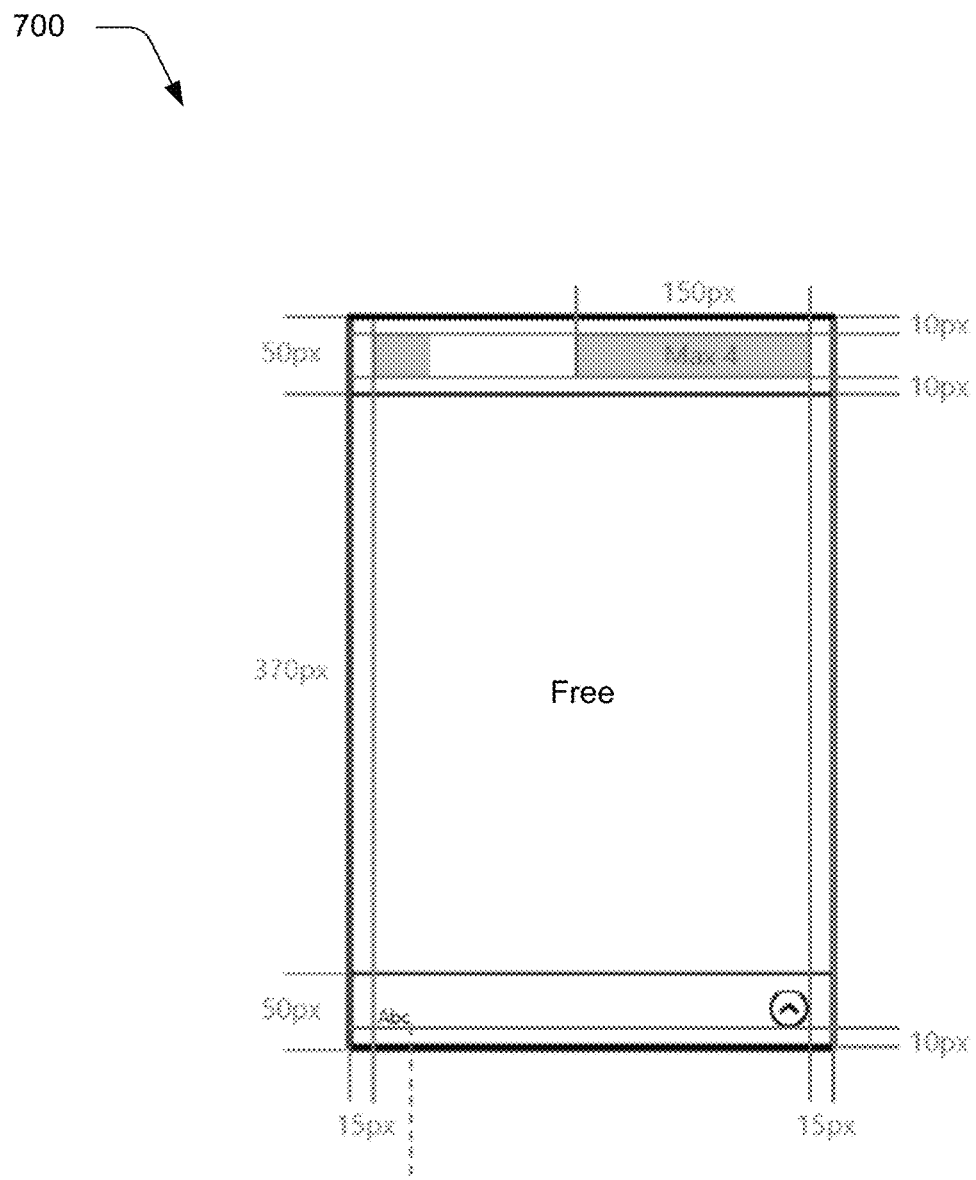
FIG. 7 depicts an example implementation of a free arrangement for an expanded representation.

FIG. 7 depicts an example implementation of a free arrangement 700 for an expanded representation. In this example, the free arrangement 700 includes a large center area that is configured to include content of one or more notifications from the notification engine along with a top portion that is configured to include titles and a bottom portion having functionality as previously described.

Figure 8:
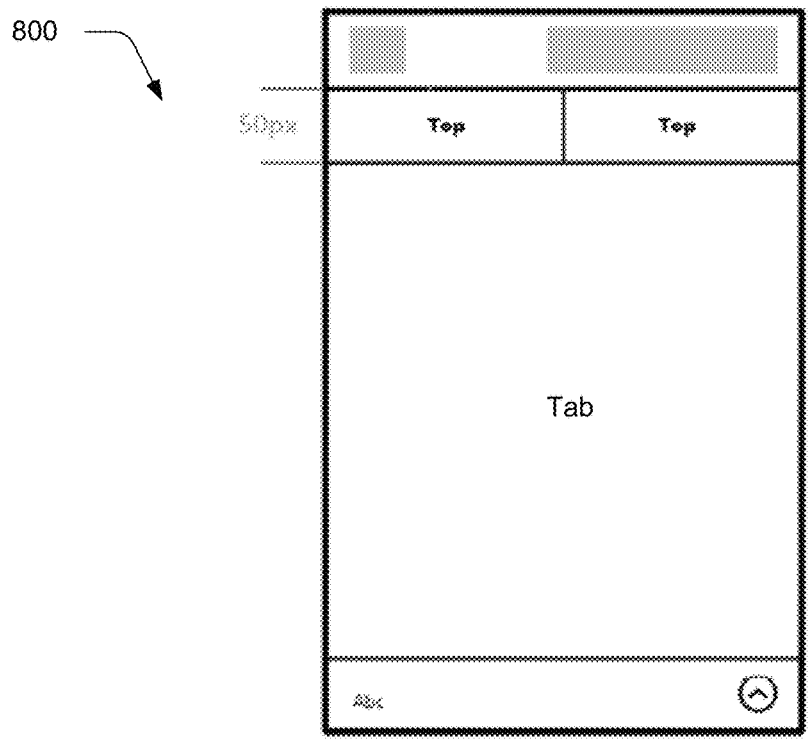
FIG. 8 depicts an example implementation of a tabbed arrangement for an expanded representation.

FIG. 8 depicts an example implementation of a tabbed arrangement 800 for an expanded representation. As the name implies, tabs may be included along the top in this example to navigate between different views within the tab and thus may include support of additional content.

Figure 9:
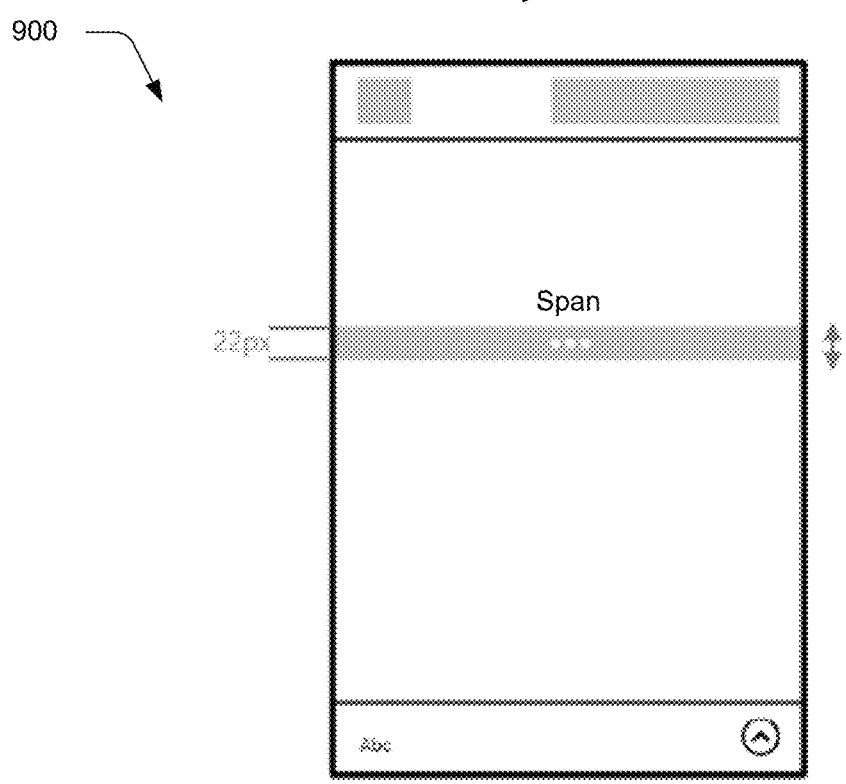
FIG. 9 depicts an example implementation of a span arrangement for an expanded representation.

FIG. 9 depicts an example implementation of a span arrangement 900 for an expanded representation. In this example, the span arrangement 900 supports a vertical display of a plurality of items to support navigation through the items. Items in the span layout 900 may then be scrolled.

Figure 10:
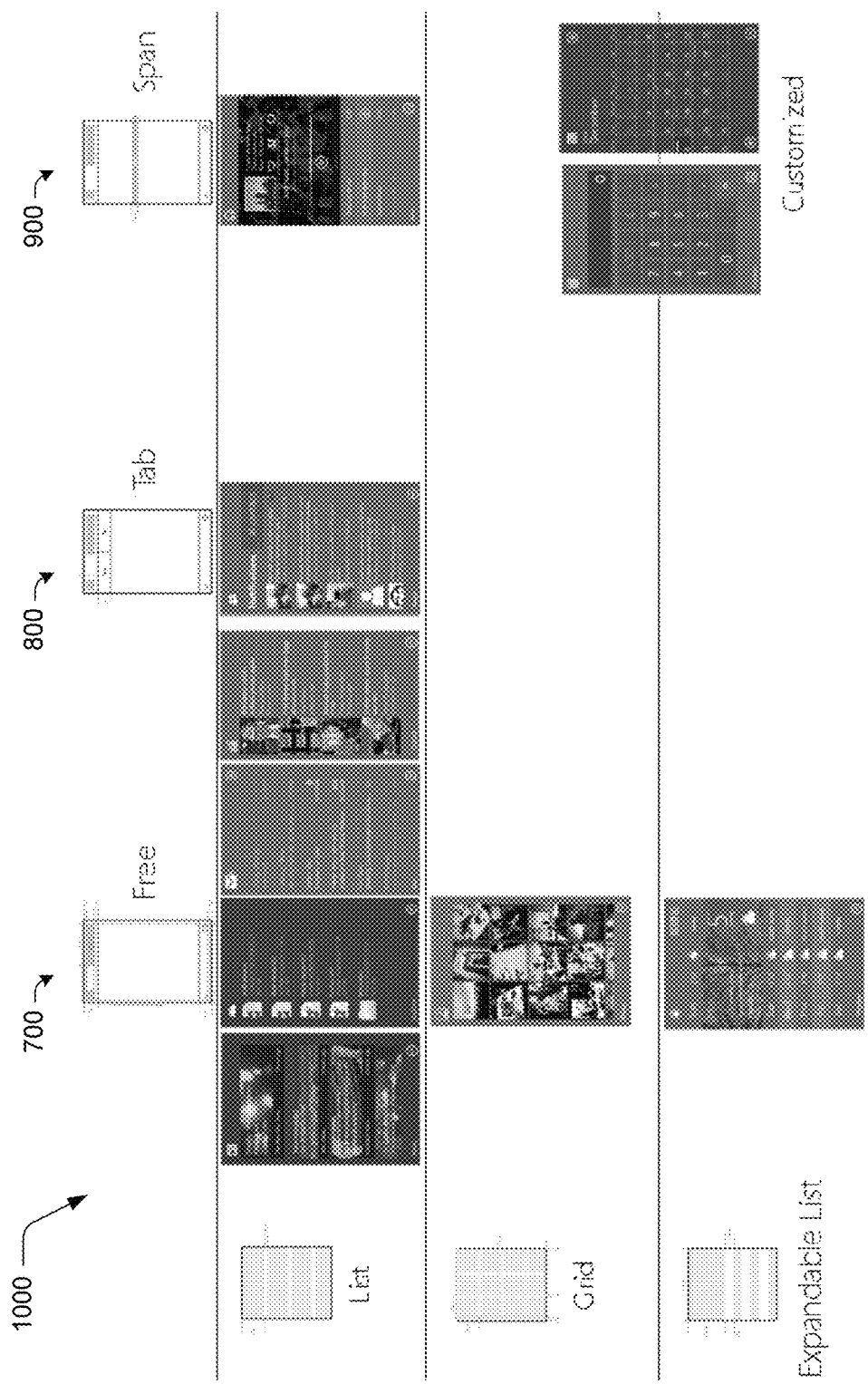
FIG. 10 depicts free, tabbed, and span arrangements that may leverage one or more of the list, grid, and expandable list layouts.

The free, tabbed, and span arrangements 700, 800, 900 may be configured with a variety of different layouts. As shown in the example implementation 1000 of FIG. 10, for instance, the free, tabbed, and span arrangements 700, 800, 900 may leverage one or more of the list, grid, expandable list, and customizable layouts. Thus, an expanded representation may be configured to accept a variety of different content, examples of which are described as follows and shown in corresponding figures.

FIG. 11 is an example implementation 1100 showing representations and expanded representations of calculator and music applications. A calculator application may be represented in a first display mode as previously described using an unexpanded representation 1102. The representation 1102 may then be expanded responsive to a user input such as through the down arrow icon or any other displayed or user interface or un-displayed user input gesture. The expanded representation then displays in the root mode as an expanded representation 1104 of the calculator application that is configured to accept inputs (e.g., a "press" of the keys) to interact with the application.

Likewise, a music application may be represented in the first display mode using a representation 1106 such as a tile or icon that is not expanded. In this example, the representation 1106 may still be configured to output notifications as previously described without causing execution of the music application. The representation 1106 may then be expanded within the root mode responsive to a user input to display an expanded representation 1108 of the music application that is configured to accept inputs to interact with the application. For example, a user may navigate through an output of media using the expanded representation, select a different music item to play using the music application, and so on. The expanded representation 1108 also includes album art as a background image in this example.

Figure 12:
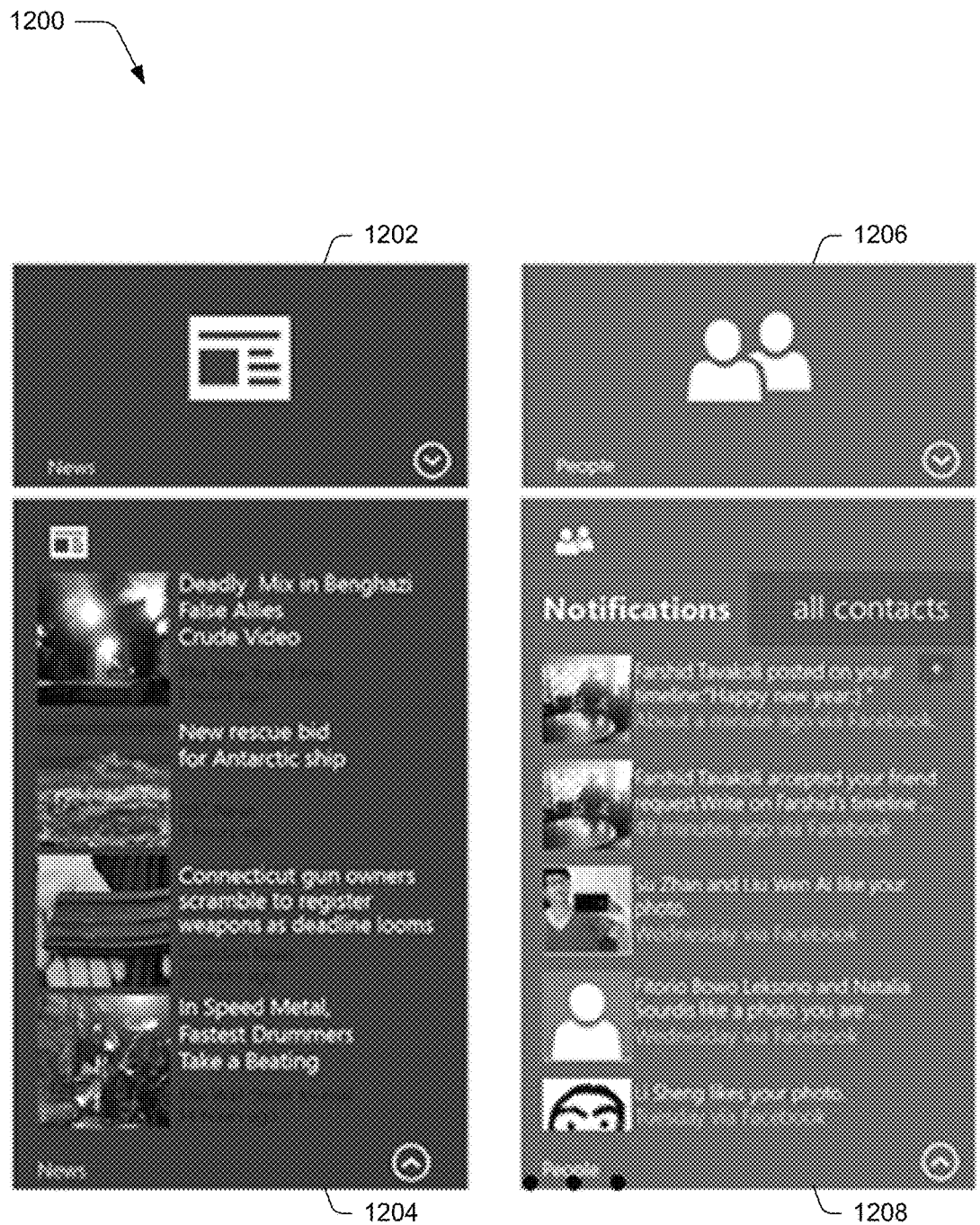
FIG. 12 is an example implementation showing representations and expanded representations of news and contacts applications.

FIG. 12 is an example implementation 1200 showing representations and expanded representations of news and contacts applications. The news application may have a representation 1202 configured for display in the first display mode as above. The representation 1202 may then be expanded to display an expanded representation 1204 that includes content related to the news application, which in this instance is displayed as headlines and corresponding images.

As previously described, navigation between the representation 1202 and the expanded representation 1204 may be performed responsive to a user input, e.g., a cursor control device, gesture, spoken command, and so forth. Other implementations are also contemplated in which the transition from the representation 1202 to the expanded representation 1204 may be performed automatically and without user intervention. In this example, a notification may be received by the notification module 114 of subject matter flagged by a user, subject matter flagged by a provider of the notification, and so on. Responsive to this flag (e.g., an Amber alert), the representation 1202 may be expanded to form the expanded representation 1204 to provide addition information related to the notification. A variety of other examples are also contemplated. Further expansions may be activated and displayed to provide limited functionality such as search, filter, display of articles, and so forth.

The contact application representation may be further expanded to allow limited functionality. The expansion may be in a horizontal or vertical direction. For example, in some aspects, the application representation may be expanded in the vertical direction to display a text entry area for response to a message and/or expand to left to include an activation icon to initiate a call with the associated contact. These are just two examples of limited functionality or interaction with a contracts application and any suitable expansions of the representation and/or subset and limited set of functionality may be used as appropriate.

For the representation 1206 of the contact application, for instance, a user may indicate particular contacts that are to cause an automatic display of the expanded representation 1208, particular posted content in a shared network resource (e.g., a social network service), and so on. Similarly, a sender of a notification may include an urgency flag for a particular communication (voicemail, text, email, etc.) that may additionally or alternatively be used by the operating system 108 to trigger an automatic display of the expanded representation. Receipt of corresponding notifications by the notification module 114 may then also cause automatic display of the expanded representation 1208.

Figure 13:
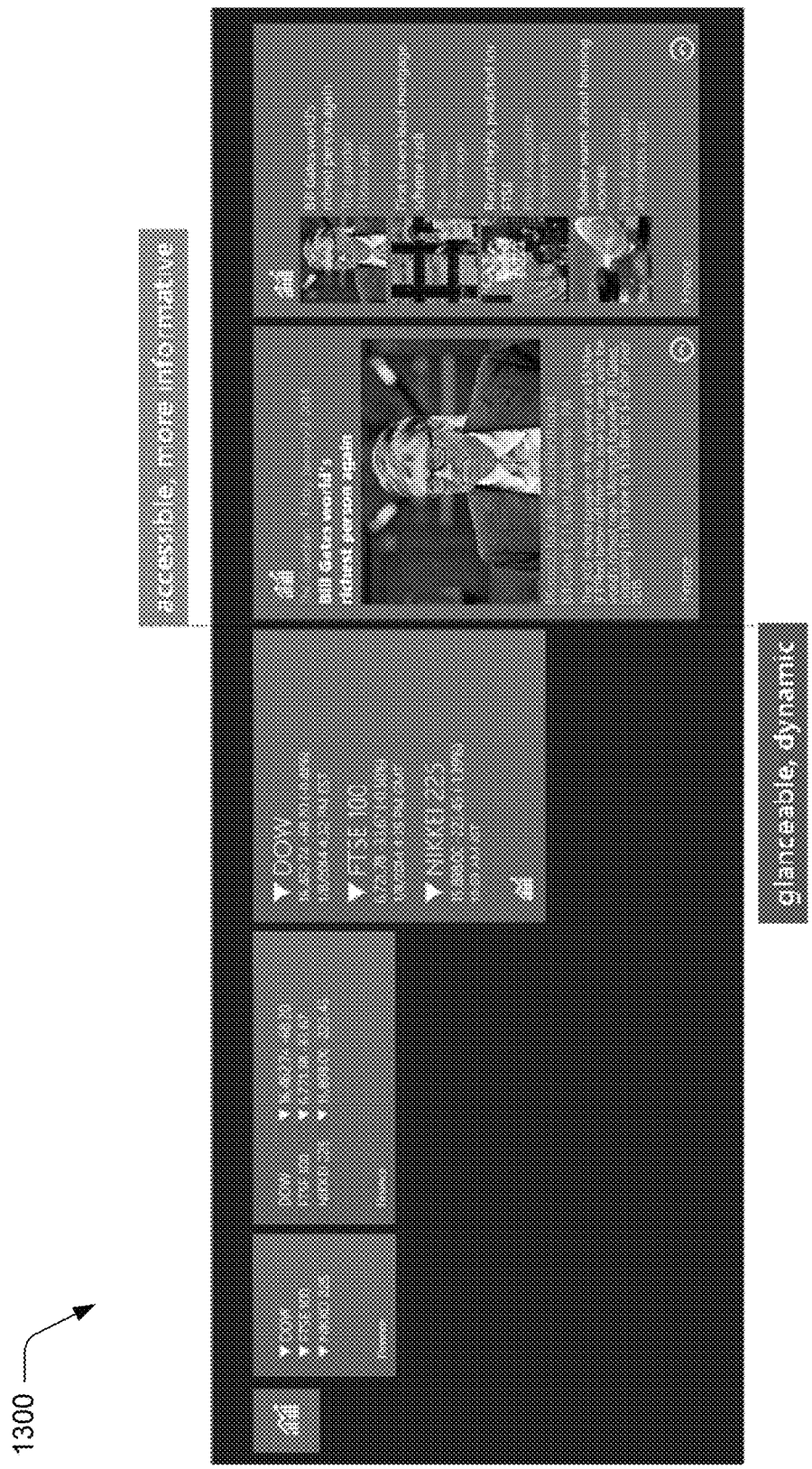
FIG. 13 depicts an example implementation illustrating a glance-able nature of representations and notifications and increased content available via an expanded representation.

FIG. 13 depicts an example implementation 1300 illustrating a glance-able nature of representations and notifications and increased content available via an expanded representation. As shown in the four left examples, a representation may have a variety of sizes that are dedicated to output of notifications, which involves stock market notifications in this instance.

To obtain additional information, an expanded representation may be employed as shown in the two right examples that may include content that is not part of the notifications. For example, the expanded representation may involve execution of a represented application whereas an unexpanded version does not. Other implementations are also contemplated as previously described in which the expanded representation does not involve execution of a corresponding application 110.

FIG. 14 depicts an example implementation 1400 showing a user interface of an application store that is configured to provide users access to applications for download and use. As described in the background, application stores have become increasingly viewed as a primary source to obtain applications 110 by a user. As such, applications that support expandable representations may support a dedicated application category in the application store such that users may choose applications that are configured to support interaction within a root level (e.g., start screen) of the operating system 108. As illustrated, for instance, a Sudoku puzzle application may support an expanded representation 1402 that may be purchased by a user to play Sudoku within the expanded representation 1402. A variety of other examples are also contemplated without departing from the spirit and scope thereof.

Figure 15:
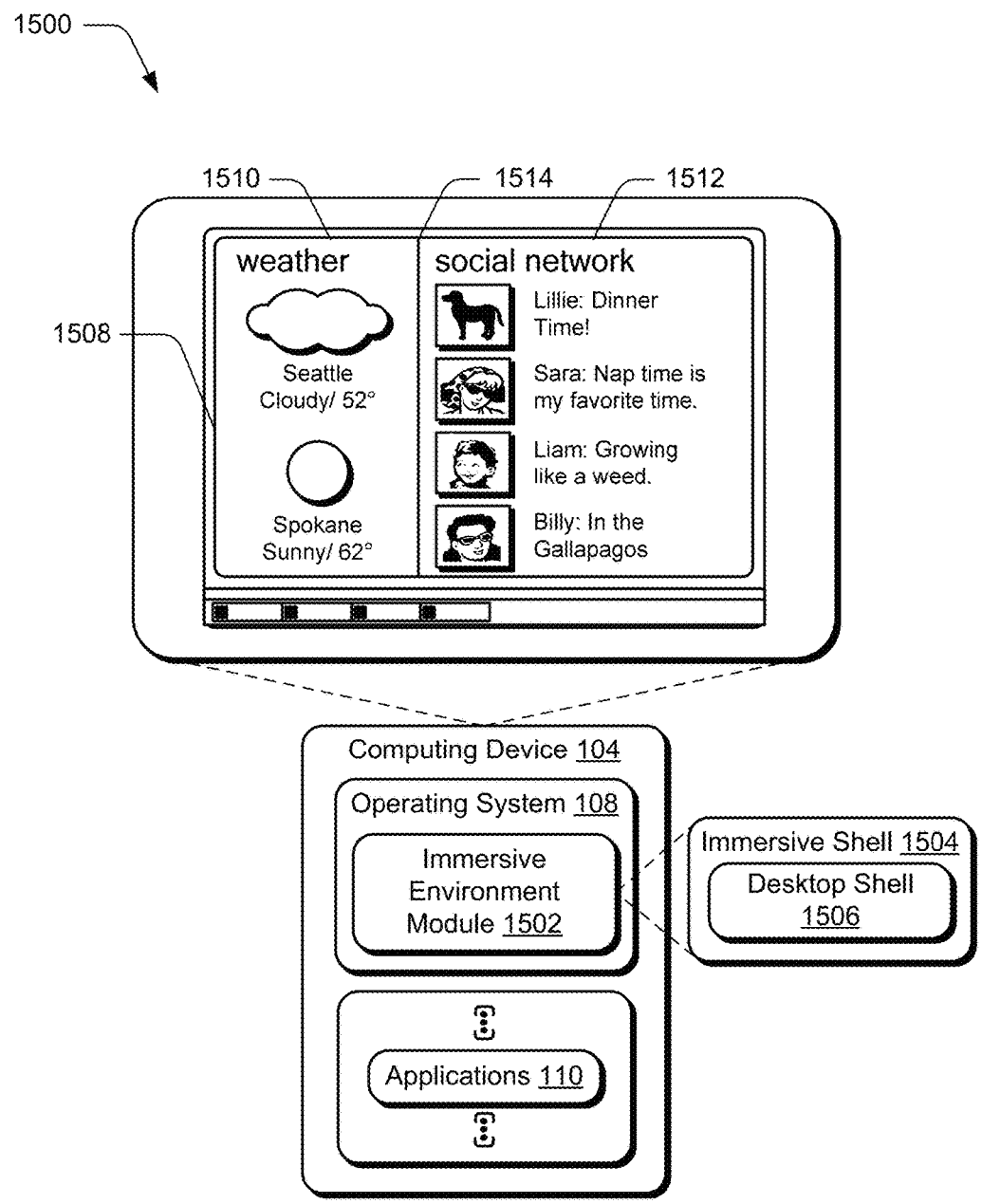
FIG. 15 is an illustration of an environment in an example implementation that is operable to support desktop and immersive shells of the operating system of FIG. 1.

FIG. 15 is an illustration of an environment 1500 in an example implementation that is operable to support desktop and immersive shells of the operating system 108. The illustrated environment 1500 includes a computing device 104 having the operating system 108 and application 110 as previously described in relation to FIG. 1.

The operating system 108 is also illustrated as including an immersive environment module 1502 which is representative of functionality of the computing device 102 to provide an immersive shell 1504 via which a user may interact with the applications 110 and other data of the computing device 102, both local to the device as well as remotely via a network. The immersive shell 1504 is configured to accept inputs to interact with the operating system 108 and applications 110 of the computing device 102 to access functionality of the computing device 102, such as the abstracted functionality described above. The immersive shell 1504 may also be configured to support a desktop shell 1506 as further described below.

The immersive shell 1504 may be configured to support interaction with the applications 110 with little to no window frame. Additionally, the immersive shell 1504 may support interaction with the applications 110 without requiring the user to manage a corresponding window frame's layout, primacy of the window with respect to other windows (e.g., whether a window is active, in front of behind other windows, an order of the windows, and so on). Although illustrated as part of the operating system 108, the immersive environment module 1502 may be implemented in a variety of other ways, such as a stand-alone module, remotely via a network, and so forth.

In one or more implementations, the immersive shell 1504 of the operating system 108 is configured such that it is not closeable or capable of being uninstalled apart from the operating system 108. Additionally, the immersive shell 1504 may be configured to consume a significant portion of an available display area of a display device 1508 of the computing device 104. A user may interact with the immersive shell 1504 in a variety of ways, such as via a cursor control device, using one or more gestures, using speech recognition, capture using one or more depth-sensing cameras, and so on.

Thus, the immersive environment module 1502 may manage the immersive shell 116 in which content of applications 110 may be presented and the presentation may be performed without requiring a user to manage size, location, primacy, and so on of windows used to display the content of the applications 110.

For example, as shown on a user interface displayed by the display device 1508, a user interface is shown that is configured to display data 1510, 1512 from two applications in a "snapped" configuration. In this example, both of the applications that correspond to the data are enabled to actively execute by the computing device 102 while execution is suspended for other of the applications 110 that do not currently display data. A gutter 1514 is disposed between the displays of the data 1510, 1512 that may be moveable to change an amount of display area consumed by applications on the display device 1508, respectively.

The immersive shell 1504 may support a wide variety of functionality to provide an immersive experience for a user to access the applications 110. In the following discussion, this functionality is discussed in relation to leveraging these techniques to enable interaction with a desktop shell 1506. It should be readily apparent, however, that these techniques may be employed for managing interaction with the applications 110 themselves without departing from the spirit and scope thereof.

The desktop shell 1506 is representative of another configuration of a user interface output by the operating system 108 when in this example is to interact with the applications 110 and other data. For example, the desktop shell 1506 may be configured to present applications and corresponding data through windows having frames. These frames may provide controls through which a user may interact with an application as well as controls enabling a user to move and size the window. The desktop shell 1506 may also support techniques to navigate through a hierarchical file structure through the use of folders and represent the data and applications through use of icons. In one or more implementations, the desktop shell 1506 may also be utilized to access applications 110 that are configured specifically for interaction via the desktop shell 1506 and not configured for access via the immersive shell 1504, although other implementations are also contemplated.

In one or more of the techniques described herein, the immersive shell 1504 provides access to the desktop shell 1506 as if the desktop shell 1506 was another application that was executed on the computing device 104. In this way, a user may utilize the functionality of the immersive shell 1504 yet still access the desktop shell 1506 for more traditional functionality. Examples of implementation of the desktop as an immersive application within the immersive shell include use of the expandable representation techniques described herein which is described as follows and shown in a corresponding figure.

Figure 16:
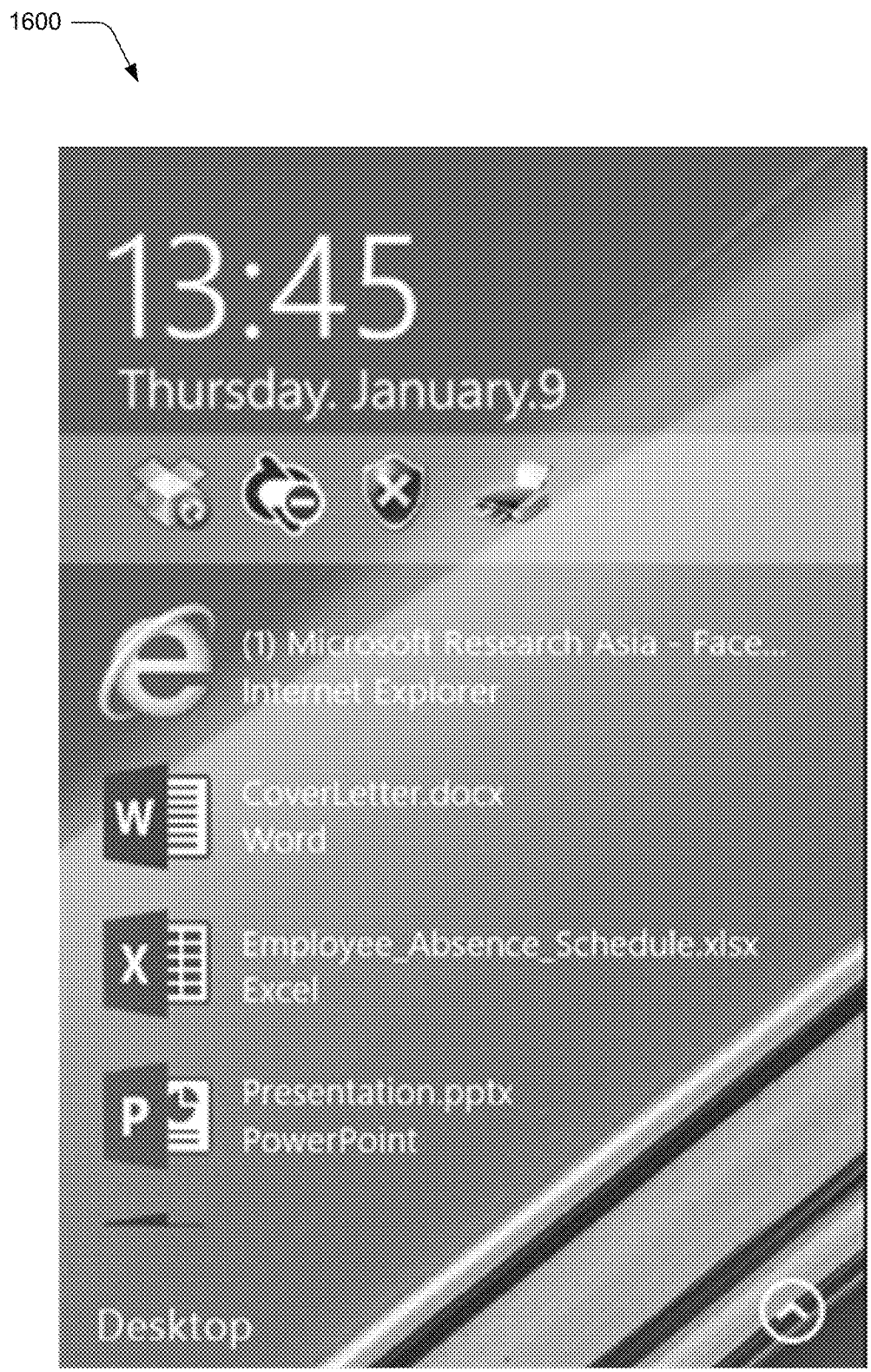
FIG. 16 depicts an example implementation of an expanded representation of a desktop shell of FIG. 15.

FIG. 16 depicts an example implementation of an expanded representation 1600 of the desktop shell 1506 of FIG. 15. The expanded representation 1600 as previously described treats the desktop shell 1506 as an application. Accordingly, the expanded representation 1600 of the desktop shell is configured to include content associated with the desktop shell.

In the illustrated example, this content describes applications 110 that are "open" within the desktop shell 1506, which include a browser, word processing application, spreadsheet application, and presentation application. Each of the content items are selectable to navigate directly to a corresponding application within the desktop shell 1506 from the root level display. Although running applications may be displayed in the desktop application representation as shown in FIG. 16, any suitable number and or types of states of applications may be shown in the desktop application representation such as a most frequently used list of application, applications pinned in the a desktop application representation by the user, any or all of which may be shown in the an first or further hierarchical expanded view of the desktop application representation in the root mode display.

The expanded representation 1600 may include icons received from a taskbar of the desktop shell 1506, which include a file sharing application, antivirus utility, and a representation of a printer which are also selectable to navigate to corresponding functionality within the desktop shell 1506. Thus, the expended representation 1600 may operate as a portal (e.g., a "wormhole") between the shells of the operating system 108 by supporting interaction between the shells without requiring output of both shells. The inclusion and supported interaction with content displayed within the expanded representation 1600 may also be leveraged for a variety of other functionality, such as to send content to a device or application from the desktop shell 1506 or other expanded representation as further described below.

Figure 17:
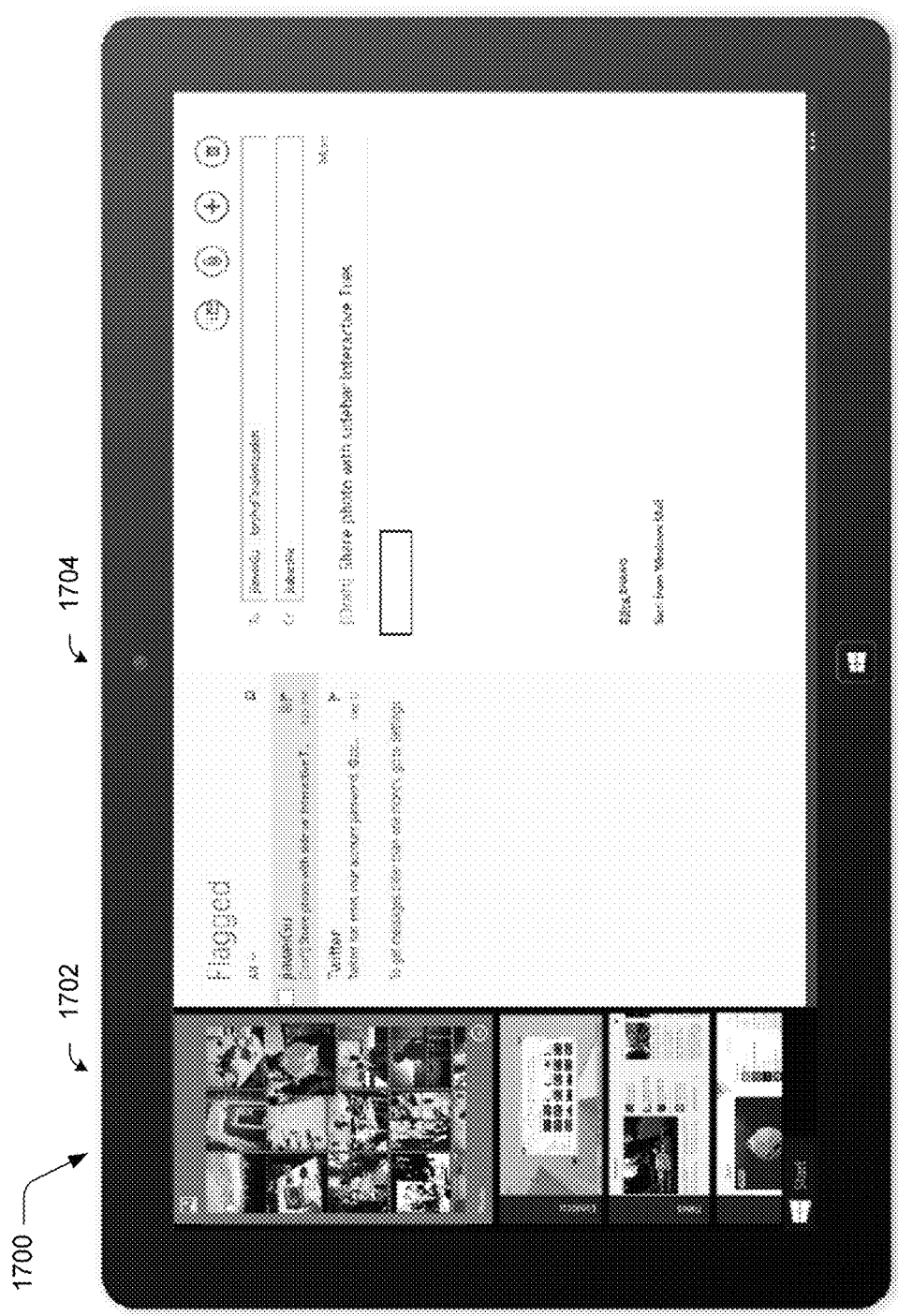
FIG. 17 depicts a system in an example implementation in which the expanded representation is included in a taskbar configured as a back stack of the operating system of FIG. 1.

FIG. 17 depicts a system 1700 in an example implementation in which the expanded representation is included in a taskbar configured as a back stack of the operating system 108 of FIG. 1. As previously described in relation to FIG. 15, the operating system 108 may maintain an immersive environment in which a display of one or more applications may substantially consume a display environment of one or more display devices.

However, applications may also "remain available" by the operating system 108 through use of a taskbar 1702 operating as a "back stack" in which execution of the application is suspended until it appears on the display device 1508. A user, for instance, may make a swipe gesture through one or more fingers of the users hand, a "click and drag" gesture, and so on to replace one or more of the applications currently being displayed with an application from the back stack. Other examples are also contemplated in which the taskbar 1702 is not associated with "back stack" functionality, e.g., the applications represented in the taskbar are actively executing, were "pinned" to the taskbar, and so on.

In the illustrated example, the taskbar 1702 includes representations that are selectable to navigate to user interfaces of the applications, e.g., to a third display state "full screen" view in an immersive shell. The representations in the taskbar also include an expanded representation as previously described, which in this instance is an expanded representation for a photo application. The expanded representation may be included in the taskbar in a variety of different ways. For example, the photo application may be in a suspended state in a back stack and thus included automatically and without user intervention through selection of execution of the application. The expanded representation may also be "pinned" to the taskbar using one or more commands by a user (e.g., a "right click" menu), and so on.

The expanded representation of FIG. 17 includes content of photos that are accessible via the represented application (e.g., the third display mode) as well as via the "portal" provided by the expanded representation. Although a photo application is shown in the expanded content expanded application representation, it is to be appreciated that any suitable application type with content expanded view, and/or limited functionality expanded application representation may be used in the embodiment of the task bar in addition to or alternative to application representations in the root level display. This portal of the task bar with expandable application representations may thus support non-modal interaction to the content included in the expanded representation, which may be leveraged to support a variety of different functionality.

In the illustrated instance, a user interface 1704 of an email application is displayed within an immersive shell, although display within a desktop shell is also contemplated. The user interface of the fully running email application includes a display of flagged emails as well as a portion to compose and send an email. A user in this example is composing an email and wishes to attach a photo. To do so, the user may access the expanded representation of the photo application and select content from the expanded representation for inclusion in the email application. Thus, this selection may be made without entering the third display state of the application.

For instance, the user may cause display of the taskbar in a variety of different ways. This may include use of a bezel gesture involving a swipe of the side of the display device 112 that is to display the taskbar 1702, use a cursor control device to place a cursor proximate to the edge to cause the display of the taskbar 1702, use of a key command or icon, speech command, and so on.

Regardless of how the output is initiated, once the taskbar 1702 is displayed as illustrated in FIG. 17, a user may then select one or more items of content that are included within the expanded representation, such as a desired photo. This may be performed in a variety of ways, such as through a "drag and drop" gesture to drag content from the expanded representation to the email in the user interface, use of a cursor control device to select (e.g., "check") an item of content, and so on. Thus, in this example a user may compose an email and select items for inclusion in the email that are accessible via other applications through use of expanded representations of those applications. In this way, a user may send content from an expanded representation to a desired application through use of the expanded representation as a portal to enable interaction with the application. The expanded representation may also be utilized to support similar techniques to send content from an expanded representation to a device, further description of which is discussed as follows and shown in corresponding figures.

Figure 18:
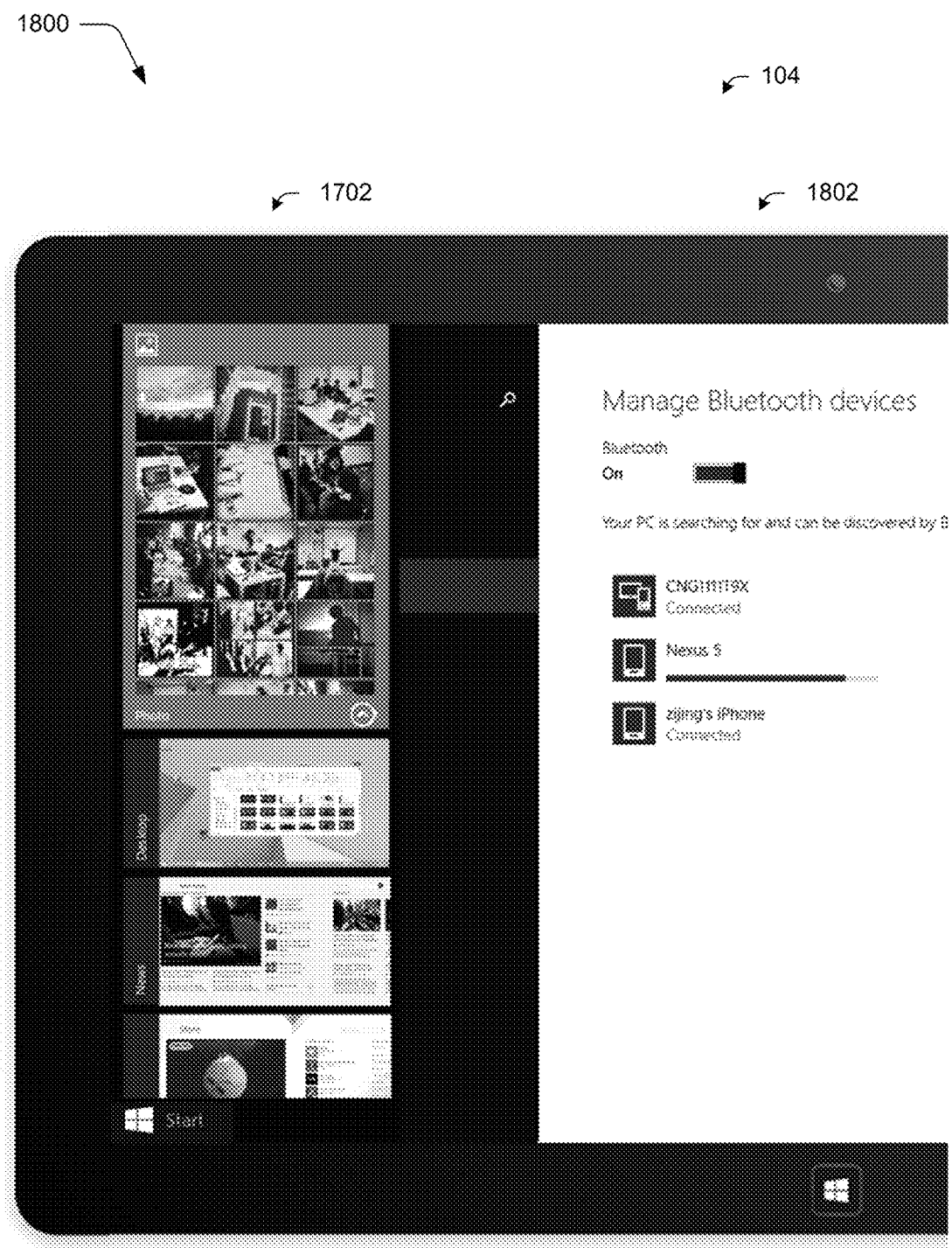
FIG. 18 depicts a system in an example implementation in which an expanded representation is included in a taskbar to send items of content included in the representation to a device.

FIG. 18 depicts a system 1800 in an example implementation in which the expanded representation is included in a taskbar to send items of content included in the representation to a device. In this example, a user interface is output by the computing device 104 as in the previous example. The user interface also includes an output 1802 of a wireless device manager application that is usable to manage which devices are communicatively coupled to the computing device 104. This may include peripheral devices as well as communicative couplings to other computing devices, e.g., mobile computing devices such as phones and tablets, and so forth. A variety of different communicative couplings may be supported, such as a Bluetooth® wireless communicative coupling as illustrated, Wi-Fi®, and other wireless communicative techniques, as well as physical (e.g., wired) communication techniques.

The sending of content from the expanded representation to a device may be performed in a manner that is similar to that previously described in relation to FIG. 17 for sending to an application. For example, a user may cause output of the taskbar 1702 having the expanded representation of the photos application (or any other suitable content from any expanded application) as previously described. A user may then select an item of content from the expanded representation (e.g., via a gesture, cursor control device, etc.) and then select a representation of a device to which the item of content is to be sent, e.g., a drag-and-drop gesture, successive clicks, and so forth. The operating system 108 may then cause the item of content to be sent to the device, e.g., loaded via a wireless communicative connection, and so on.

Thus, as described the expanded representation may support new interaction techniques to send content to desired destinations. For example, rather than navigate to an application via which the item is available and then specify a desired destination for the item (e.g., first selecting "what" and then "where") a user may first navigate to a desired destination for the item of content (e.g., "where") and then select the items of content to be sent to that destination, e.g., the "what". The expanded representation may also support usage scenarios to manage interaction with remote content, an example of which is further described in the following and shown in a corresponding figure.

Figure 19:
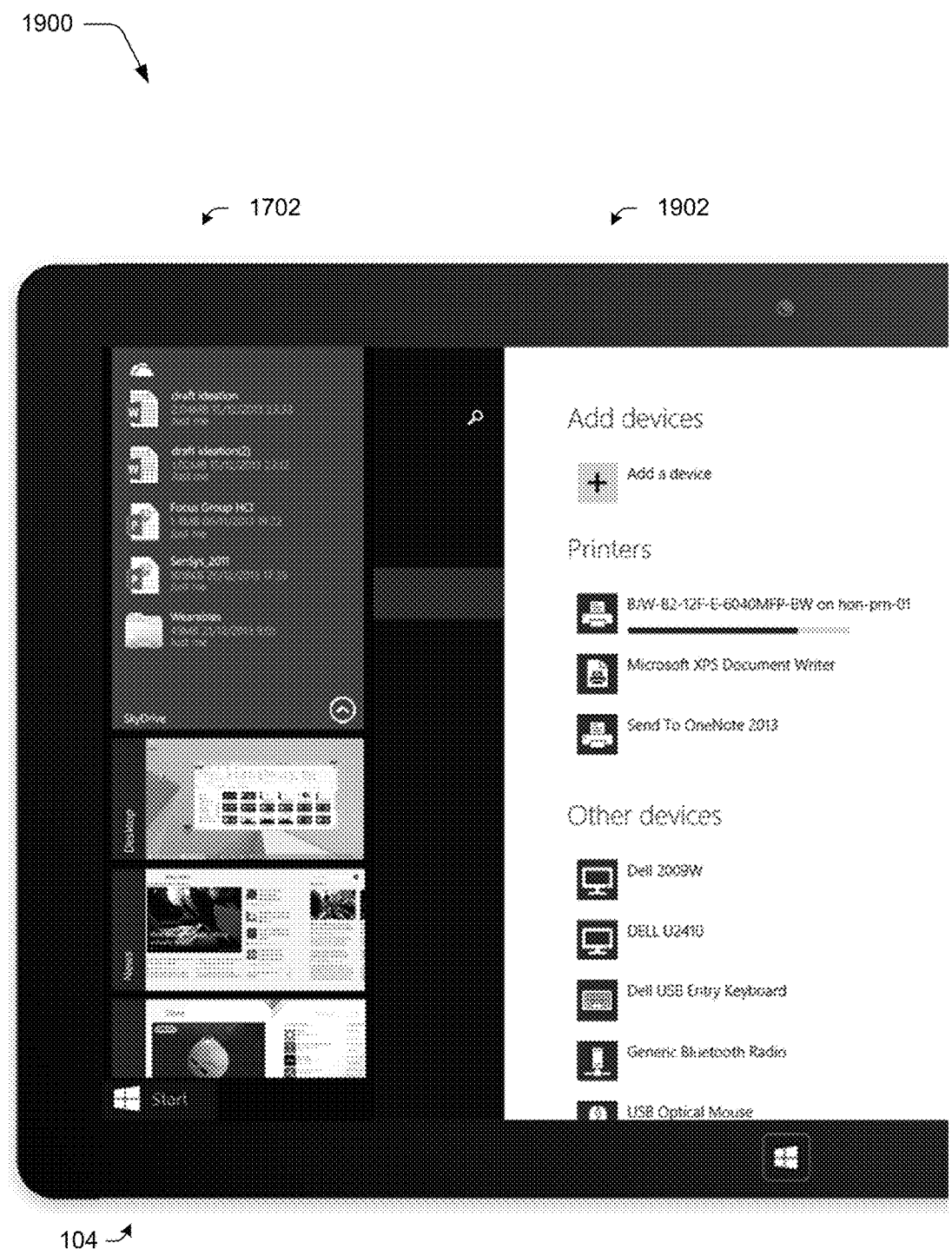
FIG. 19 depicts a system in an example implementation in which the expanded representations are included in a taskbar to send items of content included in the representation of a file sharing service to a device accessible by the computing device.

FIG. 19 depicts a system 1900 in an example implementation in which the expanded representation is included in a taskbar to send items of content included in the representation of a file sharing service to a device accessible by the computing device 104. The taskbar 1702 is illustrated as including an expanded representation of a file sharing environment application. As such, the expanded representation includes items of content that are available via the file sharing service, e.g., presentations, documents, and folders in the illustrated example.

Thus, like the previous example items of content may be sent to desired interactions through interaction with the expanded representation, such as desired applications, devices, a printer as illustrated, and so on. Further, as this is a file sharing environment in this example, the item of content may be streamed to an indicated destination without first specifically saving a version of the document locally on the computing device 104.

Although these transfer techniques describe sending content from an expanded representation to a desired destination as including the expanded representation in the taskbar 1702, other examples are also contemplated. For example, these techniques may also be applied using the expanded representation from the root level (e.g., start screen) of the operating system 108 to transfer content to represented applications, devices, and even between expanded representations, e.g., from a file sharing service expanded representation to a device manager application including content represented as devices in the expanded representation.

Figure 20:
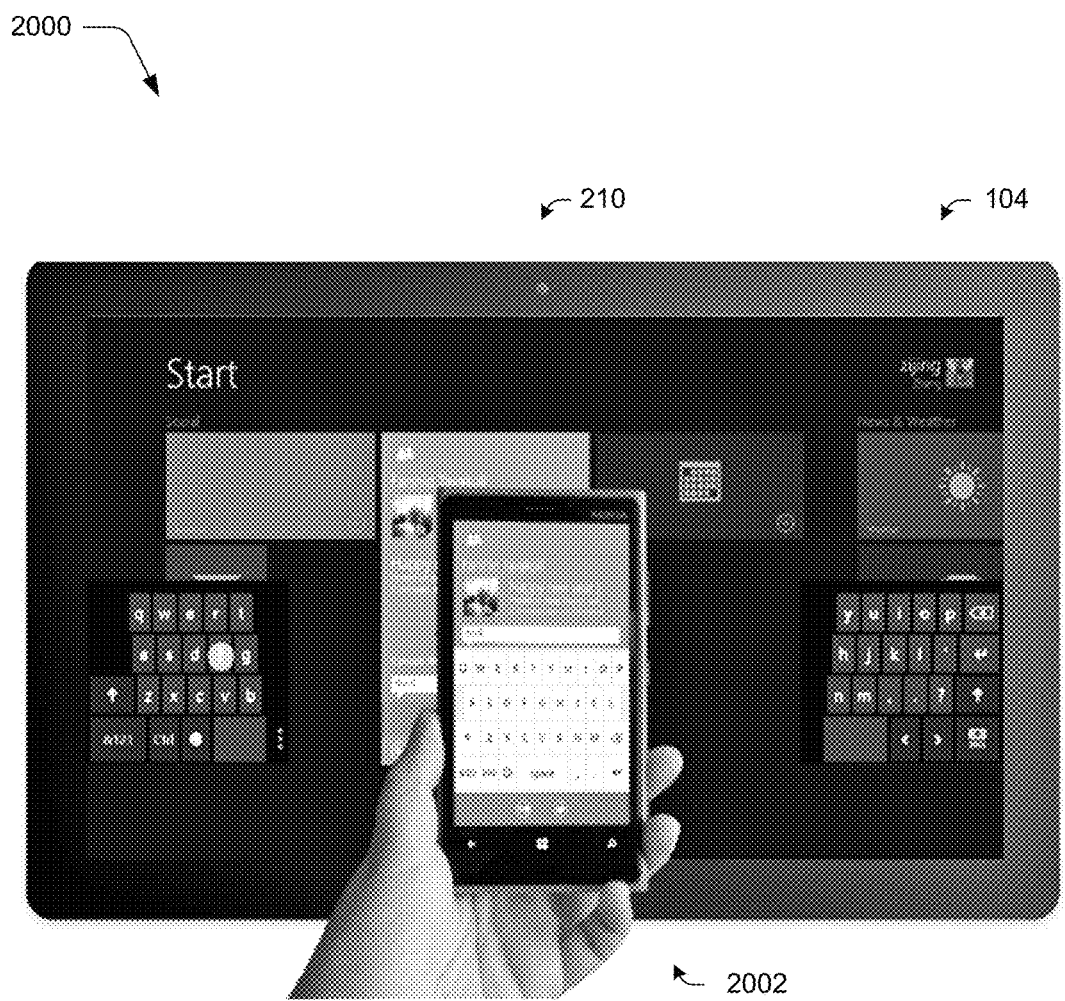
FIG. 20 depicts an example implementation showing another example of transfer of content between devices involving transfer of execution between computing devices that involves an expanded representation.

FIG. 20 depicts an example implementation 2000 showing another example of transfer of content between devices involving transfer of execution between computing devices that involves an expanded representation. As previously described in relation to FIG. 6, an expanded representation 210 may support receipt of inputs, such as text entry for a status update for a social network service.

As shown in FIG. 20, the expanded representation 210 may have an aspect ratio and resolution that approximates that of a display device of a mobile computing device 2002. Accordingly, this similarity may be leveraged to transfer a result of execution of applications between devices in an efficient manner without recoding the applications. A user, for instance, may begin entry of text for a status update through interaction with the expanded representation 210. The user may then desire to continue this interaction with the mobile computing device 2002 such as a wearable computing device, laptop, tablet, mobile phone, and so on.

Accordingly, an associated application 110 and/or operating system 108 may recognize an input to transfer a result of this execution. The input may take a variety of different forms, such as recognition of a "tap" of the mobile computing device 2002 against the computing device 104, use of a command, gesture on either device, and so on. In response, a result of this execution (e.g., inputs received and associated application, a rendered screen, and so on) may be transferred between the devices using suitable technologies such as near field communications. In the illustrated instance this transfer of the result of execution permits a user to continue the status update on another device and/or transfer the data to a mobile device for reference later (such as an address or map, etc. discussed further below).

Figure 21:
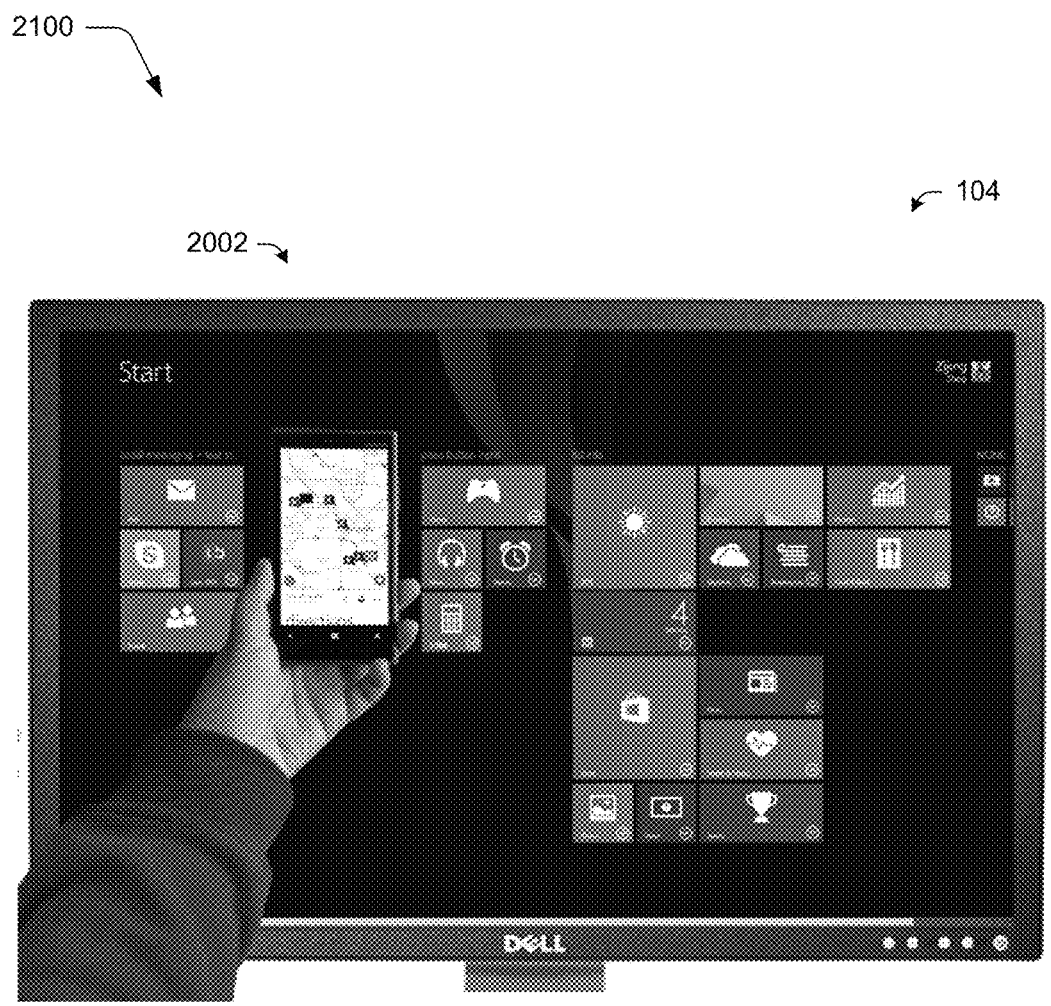
FIG. 21 depicts an example implementation in which a user may interact with the computing device to generate directions for a map.

In the example implementation 2100 of FIG. 21, a user may interact with the computing device 104 to generate directions for a map. The result of the execution in the instance (e.g., the directions) may then be transferred from the computing device 104 to the mobile computing device 2002. In this instance, a user of the mobile computing device 2002 may "grab" the expanded representation by placing the mobile computing device 2002 over a display of the expanded representation.

This proximity may be detected in a variety of ways, such as via near field communication (NFC), use of a sensor-in-pixel configuration of a display device of the computing device 104, a camera of the mobile computing device 2002, and so on. The result of the execution may then permit continued interaction via a corresponding application on the mobile computing device 2002. The reverse operation may also be performed, such as to transfer from the mobile computing device 2002 to an expanded representation of the computing device 104. In this way, a user may seamlessly interact with a plurality of different computing devices in an efficient manner.

Figure 22:
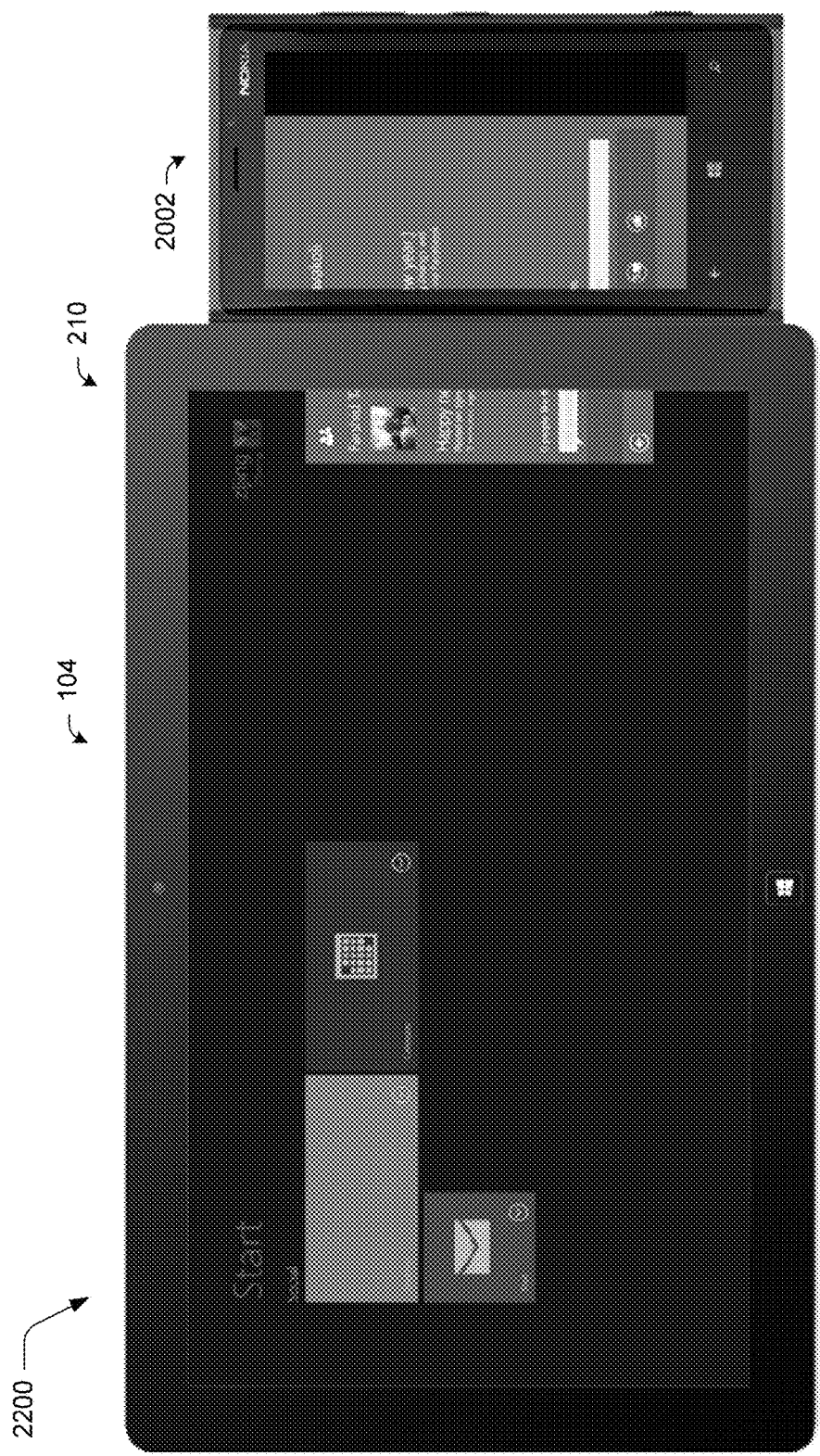
FIG. 22 depicts another example implementation of transfer of a result of execution associated with an expanded representation between devices.

FIG. 22 depicts another example implementation 2200 of transfer of a result of execution associated with an expanded representation between devices. In this example, a gesture or other input is detected to transfer the result of execution between devices. In this example, an animation is utilized to give an appearance that the expanded representation is partially displayed on both devices to indicate this transfer. Other animations are also contemplated to indicate the transfer.

FIG. 23 depicts an example implementation 2300 in which expanded representations are leveraged to indicate activity levels of content in relation to a shared network environment. Shared network environments may be implemented by a web service to support remote interaction and collaboration between a variety of different users remotely via a network. Examples of shared network environments include file hosting services in which content such as documents and presentations are made available for users to edit and view, social network services for sharing status updates and images, and so on. Thus, content associated with the shared network environment may support activities associated with that content, e.g., the sharing, viewing, "liking," and so on.

In this example, expanded representations 2302, 2304 are configured to indicate relative activity levels of content included in the expanded representation. For example, expanded representation 2302 includes content that is available via a file hosting service, i.e., "in the cloud." Each of the items of content includes an indication, illustrated as a strength bar, which indicates an amount of activity that is associated with a respective item of content within the shared network environment, e.g., the file sharing service.

Any suitable displayed indication may be used to indicate activity level and/or strength of activity such as icons, highlight, color coding, texture, etc. The level of activity or strength may be based on a number of times accessed, editing of the content, how recently the content was accessed, and so forth.

Further, the items of content are arranged within the expanded representation 2302 based on the relative levels of activity to each other. In this way, the expanded representation 2302 may act as a portal to support interaction and include items of content that have an increased likelihood of being of interest to a user, thus further supporting a likelihood that a user need not "navigate away" from a start screen, support use in a taskbar, and so forth.

The expanded representation 2304 includes content involving notifications received from a social network service. In this too, activities levels of content are indicated and arranged within the representation, which in this instance are status posts, "likes," and so forth. Other examples are also contemplated, such as articles for news applications and so on. Content displayed within the expanded representation and associated levels may be obtained in a variety of ways, such as part of the notification system as previously described in relation to FIG. 1. Thus, in this example a user may readily be kept "up-to-date" regarding content involved in a shared network environment through use of the expanded representations. It should be readily apparent that these activity level techniques may be included in any of the previously described scenarios without departing from the spirit and scope thereof.

Example Procedures

The following discussion describes expandable application representation techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the example environment.

Figure 24:
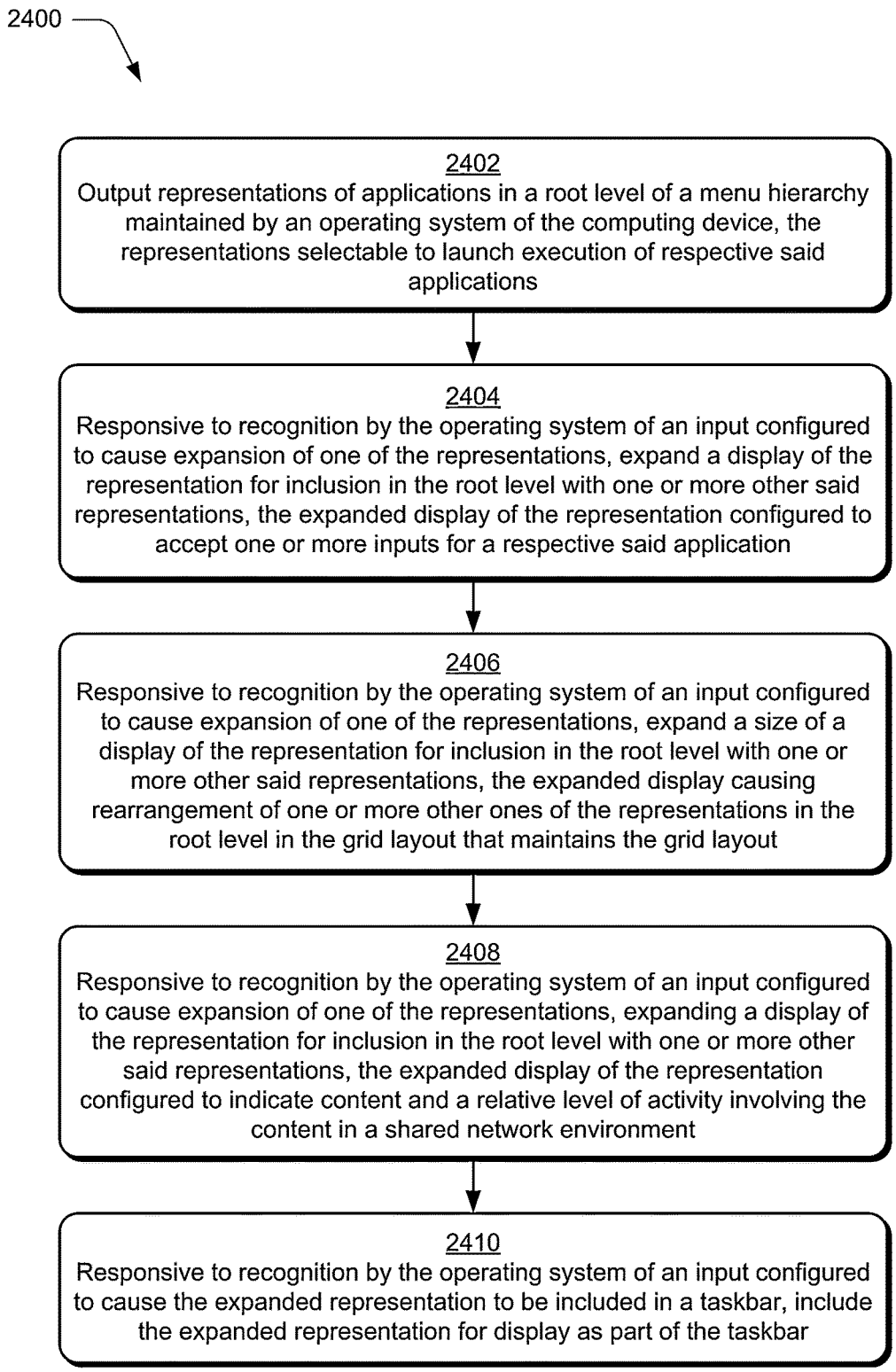
FIG. 24 is a flow diagram depicting a procedure in an example implementation in which a representation is expanded in a root level of a file hierarchy of an operating system.

FIG. 24 depicts a procedure 2400 in an example implementation in which a representation is expanded in a root level of a file hierarchy of an operating system. Representations are output of applications in a root level of a file hierarchy maintained by an operating system of the computing device, the representations selectable to launch execution of respective applications (block 2402). The representations, for instance, may be displayed in a first display mode that is configured to output notifications within the representations and without execution of the represented application, e.g., through leveraging the notification system of FIG. 1.

Responsive to recognition by the operating system of an input configured to cause expansion of one of the representations, a display is expanded of the representation for inclusion in the root level with one or more other representations, the expanded display of the representation configured to accept one or more inputs for a respective application (block 2404). A user, for instance, may make a gesture that is recognized by the operating system 108 to cause expansion of a representation displayed in the first display mode to an expanded display in the second display mode. When in the second display mode, inputs may be received to interact with content included within the expanded representation, such as to select a photo, input text, print a document, and so forth.

Responsive to recognition by the operating system of an input configured to cause expansion of one of the representations, a size is expanded of a display of the representation for inclusion in the root level with one or more other representations, the expanded display causing rearrangement of one or more other ones of the representations in the root level in the grid layout that maintains the grid layout (block 2406). Continuing with the previous example, receipt of the input may cause both expansion of the representation as well as rearrangement of other representations as shown in FIG. 3.

Responsive to recognition by the operating system of an input configured to cause expansion of one of the representations, a display is expanded of the representation for inclusion in the root level with one or more other representations, the expanded display of the representation configured to indicate content and a relative level of activity involving the content in a shared network environment (block 2408). As shown in FIG. 23, relative levels of activity within a shared network environment may be included through indications (e.g., as a "heat map", strength bars, etc.), order of arrangement of the content itself, and so forth.

Responsive to recognition by the operating system of an input configured to cause the expanded representation to be included in a taskbar, the expanded representation is included for display as part of the taskbar (block 2410). A user, for instance, may "right click" on an expanded representation and select an option to pin the expanded representation to the taskbar. In another instance, a user may select the expanded representation from the root level and drag it toward an edge of a user interface associated with an output of the taskbar, e.g., via a drag-and-drop gesture or through use of a cursor control device. A variety of other examples are also contemplated.

Figure 25:
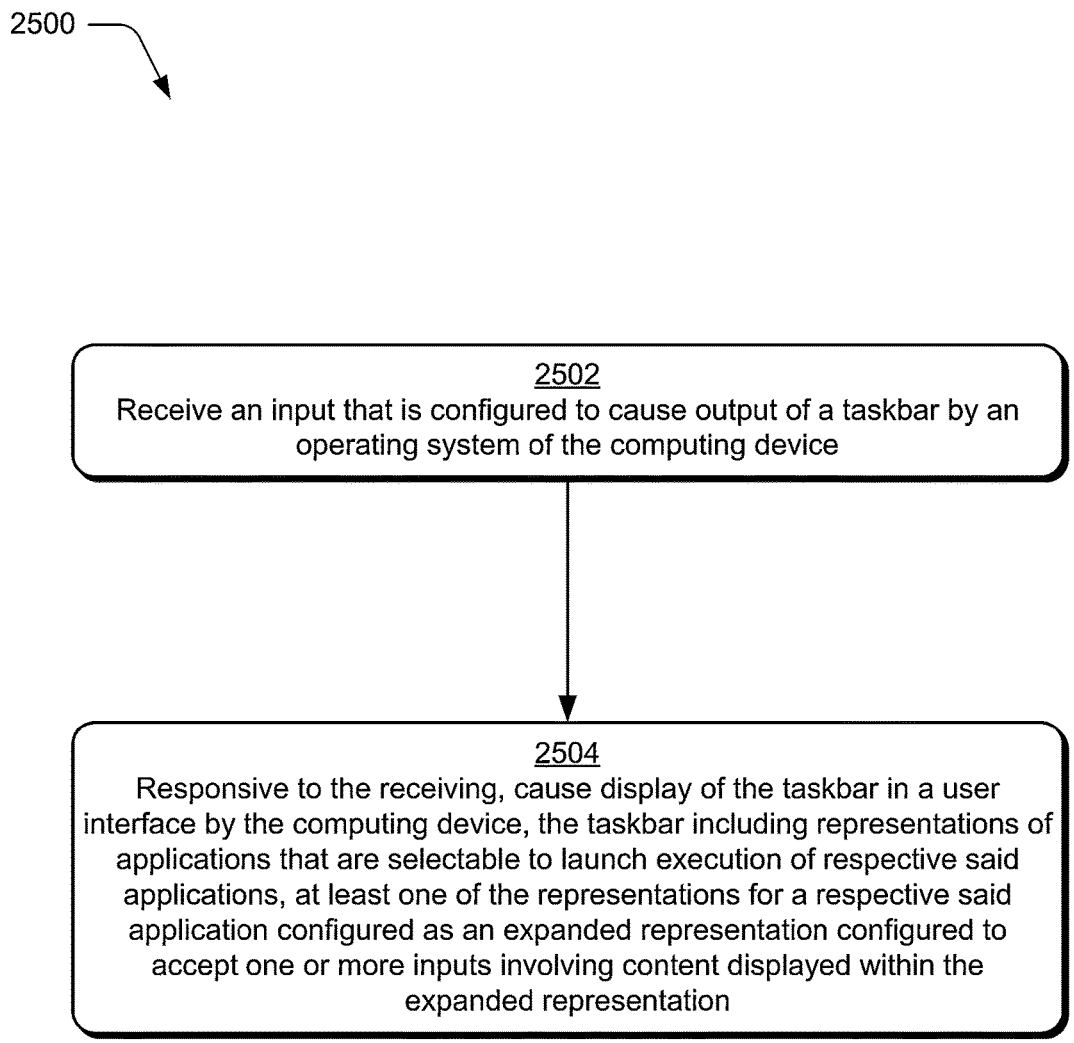
FIG. 25 is a flow diagram depicting a procedure in an example implementation in which a taskbar including an expanded representation is displayed.

FIG. 25 depicts a procedure 2500 in an example implementation in which a taskbar including an expanded representation is displayed. An input is received that is configured to cause output of a taskbar by an operating system of the computing device (block 2502). This may include a bezel gesture that involves a "swipe" from an edge of a display device, use of a "right-click" of a cursor control device, positioning of a cursor proximate an edge of the display device, and so forth.

Responsive to the receiving, display is caused of the taskbar in a user interface by the computing device, the taskbar including representations of applications that are selectable to launch execution of respective applications, at least one of the representations for a respective application configured as an expanded representation configured to accept one or more inputs involving content displayed within the expanded representation (block 2504). A variety of different inputs may be received, such as to enter text, interact with content included within the expanded representation, and so on.

Figure 26:
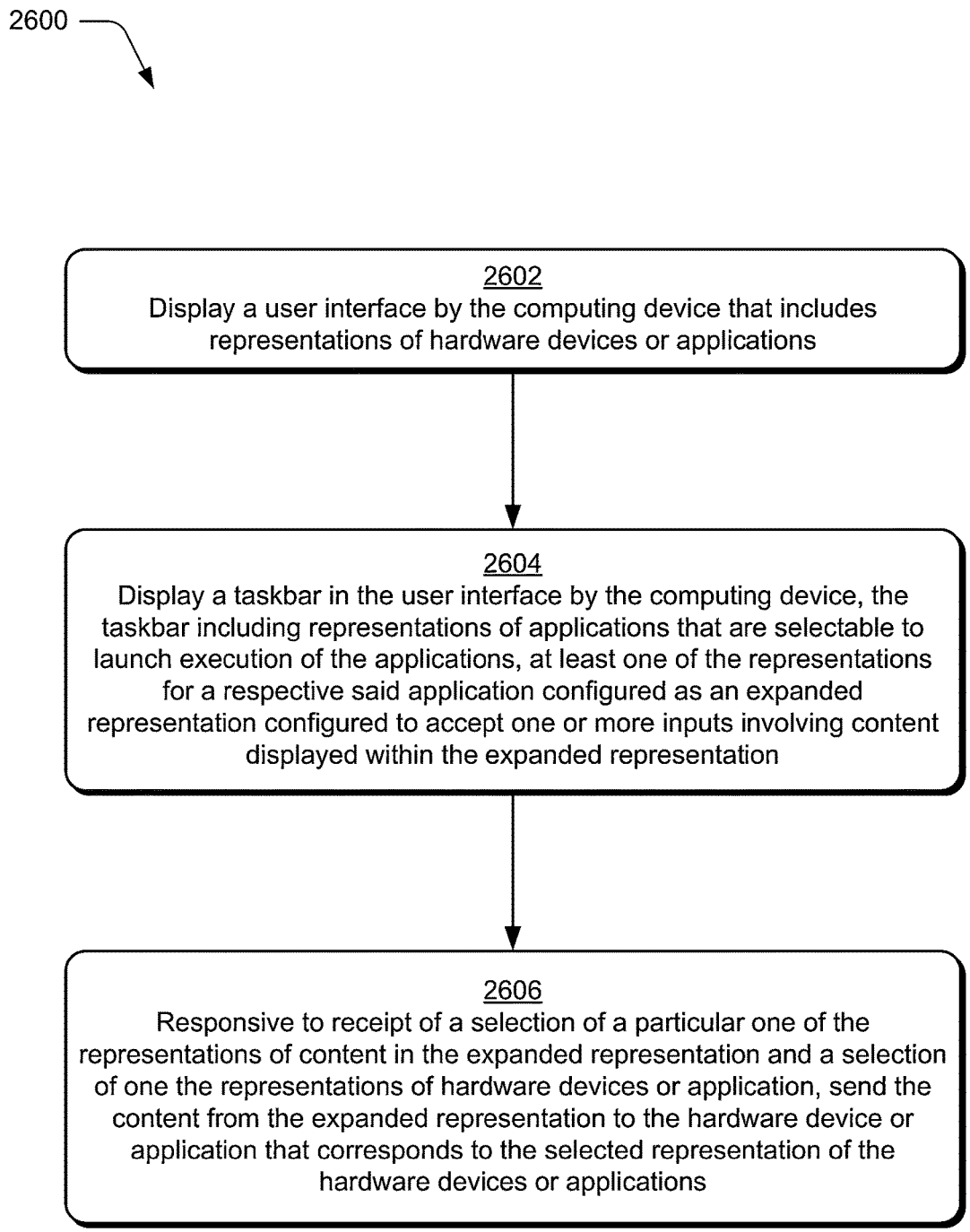
FIG. 26 is a flow diagram depicting a procedure in an example implementation in which content included within an expanded representation is sent to an application or device.

FIG. 26 depicts a procedure 2600 in an example implementation in which content included within an expanded representation is sent to an application or device. A user interface is displayed by the computing device that includes representations of hardware devices or applications (block 2602). As shown in FIG. 18, for instance, a user interface may include representations of devices, such as peripheral devices or other computing devices. The user interface may also include representations of applications, which may include the first display mode (e.g., a tile) or a second display mode (e.g., an expanded tile). In one or more implementations, the third display mode (e.g., a full screen mode in an immersive shell) is also contemplated as shown in FIG. 17.

A taskbar is displayed in the user interface by the computing device, the taskbar including representations of applications that are selectable to launch execution of the applications, at least one of the representations for a respective application configured as an expanded representation configured to accept one or more inputs involving content displayed within the expanded representation (block 2604). The taskbar may be output responsive to a variety of inputs, such as gestures, commands, and so on as previously described.

Responsive to receipt of a selection of a particular one of the representations of content in the expanded representation and a selection of one the representations of hardware devices or application, the content is sent from the expanded representation to the hardware device or application that corresponds to the selected representation of the hardware devices or applications (block 2606). As shown in FIG. 18, for instance, a user may select content (e.g., a photo) from the expanded representation of the photo application and drag it to a representation of another computing device to send the photo to that device wirelessly. As shown in FIG. 19, the user may select a document from the expanded representation and select a device that is to print the document. A variety of other examples are also contemplated as previously described.

FIG. 27 depicts a procedure 2700 in an example implementation in which a result of execution of an application associated with an expanded representation is transferred between computing devices. Representations of applications are displayed, selectable to launch execution of respective applications, in a root level of a file hierarchy maintained by an operating system of the computing device, at least one of the representations having an expanded display having a result of execution of the respective application (block 2702). The expanded representation, for instance, may include inputs received from a user and thus the result includes those inputs as shown in FIG. 20. The result may also include processing that has occurred and thus may include data involving an execution state of the application, e.g., directions in a map generated responsive to a user input as shown in FIG. 21.

Responsive to receipt of an input from a mobile computing device that is associated with the at least one representation having the expanded display, the result of the execution of the respective application is transferred to the mobile computing device (block 2704). Continuing with the previous example, an input may be received to cause this transfer, either by the computing device 104 or the other computing device, e.g., computing device 2002, which may take a variety of forms as described in relation to FIG. 20. In response, the result (e.g., inputs, state and configuration data of an application, and so on) may be transferred between the devices in an efficient and intuitive manner.

Figure 28:
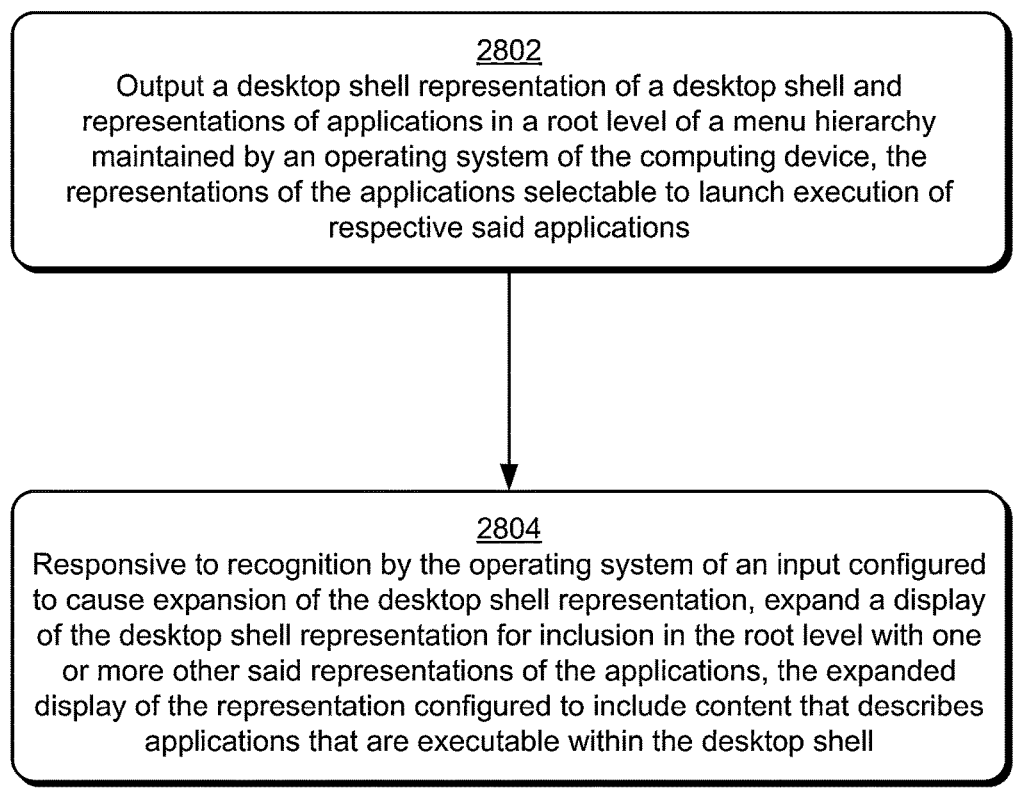
FIG. 28 is a flow diagram depicting a procedure in an example implementation in which an expanded representation is configured for a desktop shell.

FIG. 28 depicts a procedure 2800 in an example implementation in which an expanded representation is configured for a desktop shell. A desktop shell representation is output of a desktop shell along with representations of applications in a root level of a file hierarchy maintained by an operating system of the computing device, the representations of the applications selectable to launch execution of respective said applications (block 2802). The representation of the desktop shell may be included with representations of other applications with a root level of a file system in a first display mode as previously described.

Responsive to recognition by the operating system of an input configured to cause expansion of the desktop shell representation, a display of the desktop shell representation is expanded for inclusion in the root level with one or more other representations of the applications, the expanded display of the representation configured to include content that describes applications that are executable within the desktop shell (block 2804). As shown in FIG. 16, for instance, the expanded representation includes content that describes applications that are available for execution in the desktop shell, e.g., actively, in a suspended-state, and so forth. The representations are selectable to launch the applications within the desktop shell, e.g., to automatically cause a transition between an immersive and desktop shell. Thus, the expanded representation of the desktop shell may act as a portal to support interaction between the shells of the operating system 108.

Example System and Device

Figure 29:
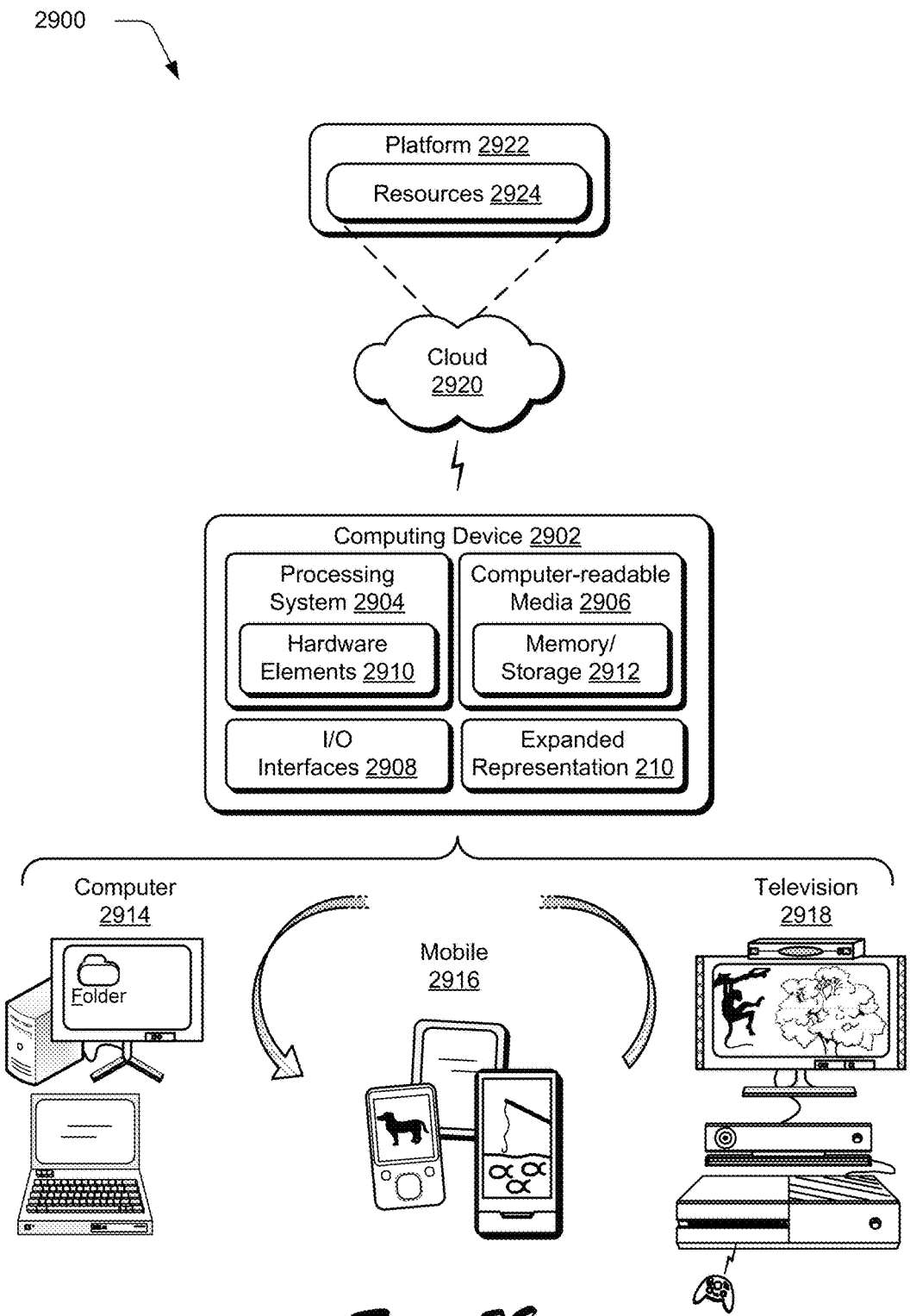
FIG. 29 illustrates various components of an example device that can be implemented as any type of computing device as described with reference to FIGS. 1-28 to implement embodiments of the techniques described herein.

FIG. 29 illustrates an example system generally at 2900 that includes an example computing device 2902 that is representative of one or more computing systems and/or devices that may implement the various techniques described herein, which is illustrated through inclusion of the expanded representation 210. The computing device 2902 may be, for example, a server of a service provider, a device associated with a client (e.g., a client device), an on-chip system, and/or any other suitable computing device or computing system.

The example computing device 2902 as illustrated includes a processing system 2904, one or more computer-readable media 2906, and one or more I/O interface 2908 that are communicatively coupled, one to another. Although not shown, the computing device 2902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 2904 is representative of functionality to perform one or more operations using hardware. Accordingly, the processing system 2904 is illustrated as including hardware element 2910 that may be configured as processors, functional blocks, and so forth. This may include implementation in hardware as an application specific integrated circuit or other logic device formed using one or more semiconductors. The hardware elements 2910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 2906 is illustrated as including memory/storage 2912. The memory/storage 2912 represents memory/storage capacity associated with one or more computer-readable media. The memory/storage component 2912 may include volatile media (such as random access memory (RAM)) and/or nonvolatile media (such as read only memory (ROM), Flash memory, optical disks, magnetic disks, and so forth). The memory/storage component 2912 may include fixed media (e.g., RAM, ROM, a fixed hard drive, and so on) as well as removable media (e.g., Flash memory, a removable hard drive, an optical disc, and so forth). The computer-readable media 2906 may be configured in a variety of other ways as further described below.

Input/output interface(s) 2908 are representative of functionality to allow a user to enter commands and information to computing device 2902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 2902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 2902. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 2902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 2910 and computer-readable media 2906 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 2910. The computing device 2902 may be configured to implement particular instructions and/or functions corresponding to the software and/or hardware modules. Accordingly, implementation of a module that is executable by the computing device 2902 as software may be achieved at least partially in hardware, e.g., through use of computer-readable storage media and/or hardware elements 2910 of the processing system 2904. The instructions and/or functions may be executable/operable by one or more articles of manufacture (for example, one or more computing devices 2902 and/or processing systems 2904) to implement techniques, modules, and examples described herein.

As further illustrated in FIG. 29, the example system 2900 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 2900, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 2902 may assume a variety of different configurations, such as for computer 2914, mobile 2916, and television 2918 uses. Each of these configurations includes devices that may have generally different constructs and capabilities, and thus the computing device 2902 may be configured according to one or more of the different device classes. For instance, the computing device 2902 may be implemented as the computer 2914 class of a device that includes a personal computer, desktop computer, a multi-screen computer, laptop computer, netbook, and so on.

The computing device 2902 may also be implemented as the mobile 2916 class of device that includes mobile devices, such as a mobile phone, portable music player, portable gaming device, a tablet computer, a multi-screen computer, and so on. The computing device 2902 may also be implemented as the television 2918 class of device that includes devices having or connected to generally larger screens in casual viewing environments. These devices include televisions, set-top boxes, gaming consoles, and so on.

The techniques described herein may be supported by these various configurations of the computing device 2902 and are not limited to the specific examples of the techniques described herein. This functionality may also be implemented all or in part through use of a distributed system, such as over a "cloud" 2920 via a platform 2922 as described below.

The cloud 2920 includes and/or is representative of a platform 2922 for resources 2924. The platform 2922 abstracts underlying functionality of hardware (e.g., servers) and software resources of the cloud 2920. The resources 2924 may include applications and/or data that can be utilized while computer processing is executed on servers that are remote from the computing device 2902. Resources 2924 can also include services provided over the Internet and/or through a subscriber network, such as a cellular or Wi-Fi network.

The platform 2922 may abstract resources and functions to connect the computing device 2902 with other computing devices. The platform 2922 may also serve to abstract scaling of resources to provide a corresponding level of scale to encountered demand for the resources 2924 that are implemented via the platform 2922. Accordingly, in an interconnected device embodiment, implementation of functionality described herein may be distributed throughout the system 2900. For example, the functionality may be implemented in part on the computing device 2902 as well as via the platform 2922 that abstracts the functionality of the cloud 2920.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by a computing device, the method comprising:

outputting representations of applications in a root level of a file hierarchy maintained by an operating system of the computing device, the representations selectable to launch execution of respective said applications, each of the representations comprising an application icon or an application tile as opposed to a folder; and responsive to recognition by the operating system of an input configured to cause expansion of one of the representations of respective said applications, expanding a display of the representation of the respective application for inclusion in the root level with one or more other said representations of respective said applications, the expanded display of the representation of respective said application configured to accept one or more inputs for the respective application.

2. A method as described in claim 1, wherein the expanded display of the representation is configured to accept one or more inputs other than the launching of the execution of the respective application.

3. A method as described in claim 1, wherein the expanded display of the representation of respective said application is configured to accept one or more inputs of textual characters entered by a user that are displayed as part of the representation.

4. A method as described in claim 1, wherein the expanded display of the representation of respective said application is configured to accept one or more inputs involving content represented within the expanded display.

5. A method as described in claim 4, wherein the content represented within the expanded display is consumable as part of execution of the respective application.

6. A method as described in claim 1, further comprising causing execution of the respective application responsive to selection of the expanded display of the representation.

7. A method as described in claim 1, further comprising causing execution of the respective application in an immersive shell of the operating system responsive to a selection received from a user.

8. A method as described in claim 1, wherein the representations of the application are configured to output notifications as part of the respective said applications without executing the respective said applications.

9. A method as described in claim 1, wherein the expanded display of the representation is displayable using a plurality of different sub-modes that provide different levels of functionality in relation to the respective application.

10. A method as described in claim 9, wherein the plurality of sub-modes include a first said sub-mode in which the expanded display includes additional information regarding a notification included in the representation, a second said sub-mode in which the expanded display supports user inputs, and a third said sub-mode in which full functionality of the respective application is accessible in the root level.

11. A method as described in claim 1, further comprising rearranging one or more other representations of respective said applications in the root level responsive to the expanding of the display.

12. A method as described in claim 11, wherein the rearranging is performed using a grid layout.

13. A method as described in claim 1, wherein the expanding the display of the representation includes use of an animation showing a successively expanding transition from the representation to the expanded representation within the root level.

14. A system comprising:
one or more modules implemented at least partially in hardware, the one or more modules configured to implement an operating system of a computing device that is configured to support a plurality of display modes, the plurality of display modes including:
a first said display mode in which representations are output of applications in a root level of a file hierarchy of the operating system, the representations of the applications selectable to launch execution of respective said applications, each of the representations comprising an application icon or an application tile as opposed to a folder;
a second said display mode in which at least one of the representations is expandable for display in the root level, the expanded display of the at least one representation configured to accept one or more inputs for a respective one of said applications; and
a third said display mode entered through selection of the at least one representation or the expanded display of the at least one representation to cause a full screen view of a respective application.

15. A system as described in claim 14, wherein the second said display mode includes one or more of the representations of the first said display mode and is entered through interaction with the at least one said representation.

16. A system as described in claim 15, wherein the interaction is a gesture.

17. A system as described in claim 14, wherein the second said display mode and the third said display mode are enterable via interaction with different parts of the at least one representation displayed in the first said display mode.

18. A method implemented by a computing device, the method comprising:
outputting representations of applications in a grid layout in a root level of a file hierarchy maintained by an operating system of the computing device, the representations selectable to launch execution of respective said applications, each of the representations comprising an application icon or an application tile as opposed to a folder; and
responsive to recognition by the operating system of an input configured to cause expansion of one of the representations, expanding a size of a display of the representation for inclusion in the root level with one or more other said representations, the expanded display causing rearrangement of one or more other ones of the representations in the root level in the grid layout that maintains the grid layout.

19. A method as described in claim 18, wherein the expanded display of the representation is configured to receive one or more inputs involving input of text within the expanded representation.

20. A method as described in claim 18, wherein the expanded display of the representation is configured to accept one or more inputs involving content represented within the expanded display.

* * * * *